US012073784B2

(12) United States Patent
Li et al.

(10) Patent No.: US 12,073,784 B2
(45) Date of Patent: Aug. 27, 2024

(54) LINE DRIVE SIGNAL ENHANCEMENT CIRCUIT, SHIFT REGISTER UNIT AND DISPLAY PANEL

(71) Applicant: BOE TECHNOLOGY GROUP CO., LTD., Beijing (CN)

(72) Inventors: Dongsheng Li, Beijing (CN); Longfei Fan, Beijing (CN); Qian Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/918,590

(22) PCT Filed: May 31, 2021

(86) PCT No.: PCT/CN2021/097403
§ 371 (c)(1),
(2) Date: Oct. 13, 2022

(87) PCT Pub. No.: WO2022/252053
PCT Pub. Date: Dec. 8, 2022

(65) Prior Publication Data

US 2024/0221643 A1 Jul. 4, 2024

(51) Int. Cl.
*G09G 3/3233* (2016.01)

(52) U.S. Cl.
CPC ..................... *G09G 3/3233* (2013.01); *G09G 2300/0426* (2013.01); *G09G 2300/0842* (2013.01); *G09G 2310/0286* (2013.01); *G09G 2330/021* (2013.01)

(58) Field of Classification Search
CPC ......... G09G 3/3233; G09G 2300/0426; G09G 2300/0842; G09G 2310/0286; G09G 2330/021
See application file for complete search history.

(56) References Cited

U.S. PATENT DOCUMENTS

| | | | | |
|---|---|---|---|---|
| 8,106,861 B2 * | 1/2012 | Lee | H01J 9/241 345/84 |
| 10,140,917 B2 * | 11/2018 | Zhang | G09G 3/3225 |
| 10,490,150 B2 * | 11/2019 | Ma | G11C 19/28 |
| 10,775,925 B2 * | 9/2020 | Yang | G09G 3/20 |
| 10,930,360 B2 * | 2/2021 | Liu | G09G 3/20 |
| 11,074,844 B2 * | 7/2021 | Zou | G09G 3/3677 |
| 2008/0218496 A1 * | 9/2008 | Song | G09G 3/3688 345/204 |
| 2009/0051632 A1 * | 2/2009 | Lee | H01J 9/241 445/24 |

(Continued)

*Primary Examiner* — Michael Pervan
(74) *Attorney, Agent, or Firm* — Calfee, Halter & Griswold LLP

(57) ABSTRACT

The line drive signal enhancement circuit includes a first control unit, a second control unit, a first output unit and a second output unit. The first control unit is used for outputting the first power supply voltage to the first node or the second node under the control of the first control terminal and the second control terminal. The second control unit is used for outputting the second power supply voltage to the second node in response to the first power supply voltage on the first node, and is further used for outputting the second power supply voltage to the first node in response to the first power supply voltage on the second node.

20 Claims, 22 Drawing Sheets

(56) References Cited

U.S. PATENT DOCUMENTS

| | | | | |
|---|---|---|---|---|
| 2017/0243534 | A1* | 8/2017 | Zhang | G09G 3/3225 |
| 2019/0130857 | A1* | 5/2019 | Ma | G11C 19/28 |
| 2019/0333597 | A1* | 10/2019 | Liu | G11C 19/287 |
| 2020/0042153 | A1* | 2/2020 | Yang | G06F 3/0412 |
| 2021/0035480 | A1* | 2/2021 | Zou | G11C 19/28 |

* cited by examiner

LINE DRIVE SIGNAL ENHANCEMENT CIRCUIT, SHIFT REGISTER UNIT AND DISPLAY PANEL

CROSS REFERENCE TO RELATED APPLICATION

The present application is a 35 U.S.C. 371 national phase application of PCT International Application No. PCT/CN2021/097403 filed on May 31, 2021, the entire content of which is incorporated herein by reference in its entirety.

TECHNICAL FIELD

The present disclosure relates to the field of display technology, and in particular, to a line drive signal enhancement circuit, a shift register unit and a display panel.

BACKGROUND

In a display panel, a scan signal may be loaded to the pixel driving circuit through the gate lead. Due to the load and impedance on the gate lead, a certain delay and voltage loss often occur when the scan signal reaches the pixel driving circuit. In a silicon-based Organic Light-Emitting Diode (OLED) display, due to the large pixel resolution, the delay and voltage drop loss of the scan signal on the gate lead are large. This results in different data voltages written by different pixel driving circuits, thereby reducing the display uniformity of the silicon-based OLED display.

It should be noted that the information disclosed in the above Background section is only for enhancement of understanding of the background of the present disclosure, and therefore may contain information that does not constitute the prior art that is already known to a person of ordinary skills in the art.

SUMMARY

The purpose of the present disclosure is to overcome the above-mentioned deficiencies of the prior art, and to provide a line drive signal enhancement circuit, a shift register unit and a display panel.

According to an aspect of the present disclosure, there is provided a line drive signal enhancement circuit, comprising:

- a control unit, having a first control terminal and a second control terminal, for inputting a first power supply voltage to one of the first node and the second node, and inputting the second power supply voltage to the other of the first node and the second node, under the control of the first control terminal and the second control terminal;
- a first output unit, connected to the first node and the first output terminal, for outputting one of the first power supply voltage and the second power supply voltage to the first output terminal under the control of the first node; and
- a second output unit, connected to the second node and the second output terminal, for outputting the other of the first power supply voltage and the second power supply voltage to the second output terminal under the control of the second node.

According to an embodiment of the present disclosure, the control unit includes:

- a first control unit, having the first control terminal and the second control terminal, for outputting the first power supply voltage to the first node or the second node under the control of the first control terminal and the second control terminal; and
- a second control unit, connected to the first node and the second node, for outputting the second power supply voltage to the second node in response to the first power supply voltage loaded to the first node, and for outputting the second power supply voltage to the first node in response to the first power supply voltage loaded to the second node.

According to an embodiment of the present disclosure, the second control unit has at least four transistors.

According to an embodiment of the present disclosure, the first control unit includes:

- a first transistor, having a first terminal for loading the first power supply voltage, a second terminal connected to the first node, and a control terminal serving as the first control terminal, where the first transistor is used for outputting the first power supply voltage to the first node under the control of the control terminal of the first transistor; and
- a second transistor, having a first terminal for loading the first power supply voltage, a second terminal connected to the second node, and a control terminal serving as the second control terminal, where the second transistor is used for outputting the first power supply voltage to the second node under the control of the control terminal of the second transistor.

The first transistor and the second transistor are of the same type.

According to an embodiment of the present disclosure, the second control unit includes:

- a third transistor, having a control terminal connected to the first node, a first terminal for loading the second power supply voltage, and a second terminal connected to the second node, where the third transistor is used for outputting the second power supply voltage to the second node under the control of the first power supply voltage loaded to the first node;
- a fourth transistor, having a control terminal connected to the first node, a first terminal for loading the second power supply voltage, and a second terminal connected to the second node, where the fourth transistor is used for outputting the second power supply voltage to the second node under the control of the first power supply voltage loading to the first node;
- a fifth transistor, having a control terminal connected to the second node, a first terminal for loading the second power supply voltage, and a second terminal connected to the first node, where the fifth transistor is used for outputting the second power supply voltage to the first node under the control of the first power supply voltage loading to the second node; and
- a sixth transistor, having a control terminal connected to the second node, a first terminal for loading the second power supply voltage, and a second terminal connected to the first node, where the sixth transistor is used for outputting the second power supply voltage to the first node under the control of the first power supply voltage loaded to the second node.

The third to sixth transistors are of the same type.

According to an embodiment of the present disclosure, the first output unit includes:

- a seventh transistor, having a control terminal connected to the first node, a first terminal for loading the first power supply voltage, and a second terminal serving as the first output terminal;

an eighth transistor, having a control terminal connected to the first node, a first terminal for loading the first power supply voltage, and a second terminal connected to the first output terminal;

a ninth transistor, having a control terminal connected to the first node, a first terminal for loading the second power supply voltage, and a second terminal connected to the first output terminal; and a tenth transistor, having a control terminal connected to the first node, a first terminal for loading the second power supply voltage, and a second terminal connected to the first output terminal.

The second output unit includes:

an eleventh transistor, having a control terminal connected to the second node, a first terminal for loading the second power supply voltage, and a second terminal serving as the first output terminal;

a twelfth transistor, having a control terminal connected to the second node, a first terminal for loading the second power supply voltage, and a second terminal connected to the second output terminal;

a thirteenth transistor, having a control terminal connected to the second node, a first terminal for loading the first power supply voltage, and a second terminal connected to the second output terminal;

a fourteenth transistor, having a control terminal connected to the second node, a first terminal for loading the first power supply voltage, and a second terminal connected to the second output terminal.

Each of the seventh transistor, the eighth transistor, the thirteenth transistor, and the fourteenth transistor is turned on in response to one of the first power supply voltage and the second power supply voltage applied to the control terminal thereof.

Each of the ninth transistor to the twelfth transistor is turned on in response to the other one of the first power supply voltage and the second power supply voltage applied to the control terminal thereof.

According to another aspect of the present disclosure, a shift register unit is provided, comprising a shift register, an inverter and the above-mentioned line drive signal enhancement circuit.

The shift register is used for outputting the initial scan signal to the input terminal of the inverter and the first control terminal of the line drive signal enhancement circuit. The output terminal of the inverter is connected to the second control terminal of the line drive signal enhancement circuit.

According to another aspect of the present disclosure, there is provided a display panel including the above-mentioned shift register unit.

According to another aspect of the present disclosure, a display panel is provided. The display panel includes a driving backplane and a display layer stacked on the driving backplane. The driving backplane includes a semiconductor substrate, a gate insulation layer, a gate layer, an insulation medium layer and a metal wiring layer stacked in sequence. The display panel includes a display area and a peripheral area surrounding the display area. A plurality of line drive signal enhancement areas is arranged in the peripheral area.

In each of the line drive signal enhancement areas, the driving backplane is provided with a line drive signal enhancement circuit including a first transistor to a fourteenth transistor. The first transistor and the second transistor are of the same type. The seventh transistor, the eighth transistor, the thirteenth transistor, and the fourteenth transistor are of the same type. The ninth transistor to the twelfth transistor are of the same type which is opposite to the type of the seven transistor. The types of the third transistor to the sixth transistor are the same. The semiconductor substrate is formed with an active region of each transistor. The active region of each transistor includes a channel region, a source and a drain on both sides of the channel region. The gate layer is formed with the gate of each transistor. The gate insulation layer isolates the gate and the channel region of each transistor. The insulation medium layer covers the gate layer.

In one of the line drive signal enhancement areas, the metal wiring layer is provided with a connection lead, a first power supply lead, a second power supply lead, a first control lead, a second control lead, a first output lead and a second output lead. The connection lead is electrically connected to the source, drain and gate of each transistor through a conductive pillar located in the insulation medium layer. The connection lead causes the gate of the first transistor to be electrically connected with the first control lead. The connection lead further causes the gate of the second transistor to be electrically connected with the second control lead. The connection lead further causes the source of the first transistor, the source of the second transistor, the source of the seventh transistor, the source of the eighth transistor, the source of the thirteenth transistor, and the source of the fourteenth transistor to be electrically connected with the first power supply lead. The connection lead further causes the sources of the third transistor to the sixth transistor, and the sources of the ninth to twelfth transistors to be electrically connected with the second power supply lead. The connection lead further causes the drains of the seventh to tenth transistors to be electrically connected with the first output lead. The connection lead further causes the drains of the eleventh to fourteenth transistors to be electrically connected with the second output lead. The connection lead further causes the drain of the first transistor, the drain of the fifth transistor, the drain of the sixth transistor, the gate of the third transistor, the gate of the fourth transistor, and the gates of the seventh to tenth transistors to be electrically connected with each other. The connection lead further causes the drain of the second transistor, the drain of the third transistor, the drain of the fourth transistor, the gate of the fifth transistor, the gate of the sixth transistor, and the gates of the eleventh to fourteenth transistors to be electrically connected with each other.

According to an embodiment of the present disclosure, the first transistor, the second transistor, the seventh transistor, the eighth transistor, the thirteenth transistor, and the fourteenth transistor are all N-type transistors. The third transistor to the sixth transistor, and the ninth transistor to the twelfth transistor are all P-type transistors.

According to an embodiment of the present disclosure, each of the line drive signal enhancement areas includes a P-type substrate region and an N-type substrate region. The P-type substrate region is located at a side in a first direction of the N-type substrate region. The first direction is a direction away from the display area. The N-type transistor is formed in the P-type substrate region, and the P-type transistor is formed in the N-type substrate region.

According to an embodiment of the present disclosure, the N-type substrate region includes an N-type auxiliary doped region, and further includes a first active region and a second active region surrounded by the N-type auxiliary doped region, respectively. The second active region is located at a side in the first direction of the first active region.

The first active region includes a first sub-active region and a second sub-active region arranged in sequence along the first direction. The ninth transistor and the eleventh transistor are located in the first sub-active region. The tenth transistor and the twelfth transistor are located in the second sub-active region.

The second active region includes a third sub-active region and a fourth sub-active region arranged in sequence along a second direction. The second direction is perpendicular to the first direction and parallel to the plane where the semiconductor substrate is located. The fifth transistor and the sixth transistor are located in the third sub-active region. The third transistor and the fourth transistor are located in the fourth sub-active region.

According to an embodiment of the present disclosure, the P-type substrate region includes a P-type auxiliary doped region, a third active region and a fourth active region. The fourth active region is located at a side in the first direction of the third active region.

The third active region is surrounded by the P-type auxiliary doped region, and includes a fifth sub-active region and a sixth sub-active region arranged in sequence along the first direction. The seventh transistor and the thirteenth transistor are located in the fifth sub-active region. The eighth transistor and the fourteenth transistor are located in the sixth sub-active region.

The fourth active region includes a seventh sub-active region and an eighth sub-active region which are arranged in sequence along the second direction and are respectively surrounded by the P-type auxiliary doped region. The first transistor is located in the seventh sub-active region, and the second transistor is located in the eighth sub-active region.

According to an embodiment of the present disclosure, the insulation medium layer includes a first dielectric layer, a second dielectric layer, and a third dielectric layer sequentially stacked on the gate layer. The metal wiring layer includes a first metal wiring layer located between the first dielectric layer and the second dielectric layer, a second metal wiring layer located between the second dielectric layer and the third dielectric layer, and a third metal wiring layer located on a surface of the third dielectric layer away from the semiconductor substrate.

The conductive pillar includes a first conductive pillar penetrating the first dielectric layer, a second conductive pillar penetrating the second dielectric layer, and a third conductive pillar penetrating the third dielectric layer. The first metal wiring layer is connected with the semiconductor substrate and the gate layer through the first conductive pillar. The second metal wiring layer is connected with the first metal wiring layer through the second conductive pillar. The third metal wiring layer is connected to the second metal wiring layer through the third conductive pillar.

The first metal wiring layer includes part of the connection leads. The connection lead located on the first metal wiring layer includes the first connection lead to the sixth connection lead, and further includes the gate connection line, the source connection line and the drain connection line corresponding to each of the first transistor to the fourteenth transistor. The gate connection line corresponding to each transistor is connected to the gate of the transistor. The source connection line corresponding to each transistor is connected to the source of the transistor. The drain connection line corresponding to each transistor is connected to the drain of the transistor.

The source connection line corresponding to the ninth transistor and the source connection line corresponding to the eleventh transistor are connected to the first connection lead.

The source connection line corresponding to the tenth transistor includes a first sub-connection line and a second sub-connection line. The source connection line corresponding to the twelfth transistor includes a first sub-connection line and a second sub-connection line. The first sub-connection line of the source connection line corresponding to the tenth transistor, the first sub-connection line of the source connection line corresponding to the twelfth transistor, the source connection line corresponding to the fifth transistor, and the source connection line corresponding to the fourth transistor are connected to the second connection lead.

The drain connection line corresponding to the third transistor, the drain connection line corresponding to the fourth transistor, the gate connection line corresponding to the fifth transistor, and the gate connection line corresponding to the sixth transistor are connected to the third connection lead.

The drain connection line corresponding to the fifth transistor, the drain connection line corresponding to the sixth transistor, the gate connection line corresponding to the third transistor, and the gate connection line corresponding to the fourth transistor are connected to the fourth connection lead.

The source connection line corresponding to the eighth transistor includes a first sub-connection line and a second sub-connection line. The source connection line corresponding to the fourteenth transistor includes a first sub-connection line and a second sub-connection line. The first sub-connection line of the source connection line corresponding to the eighth transistor, the first sub-connection line of the source connection line corresponding to the fourteenth transistor, the source connection line corresponding to the seventh transistor, the source connection line corresponding to the thirteenth transistor, the source connection line corresponding to the first transistor, and the source connection line corresponding to the second transistor are connected to the fifth connection lead.

The source connection line corresponding to the third transistor and the source connection line corresponding to the sixth transistor are connected to the sixth connection lead.

The second metal wiring layer includes a first control lead, a second control lead, a first output lead, a second output lead and part of the connection lead. The connection lead located on the second metal wiring layer includes a seventh connection lead to the fifteenth connection lead.

The first connection lead and the second connection lead are connected to the seventh connection lead. The first connection lead and the second connection lead are connected to the eighth connection lead.

The fifth connection lead is connected to the ninth connection lead and the tenth connection lead.

The gate connection line corresponding to the ninth transistor, the gate connection line corresponding to the tenth transistor, the drain connection line corresponding to the fifth transistor, the drain connection line corresponding to the sixth transistor, the gate connection line corresponding to the seventh transistor, the gate connection line corresponding to the eighth transistor, and the drain connection line corresponding to the first transistor are connected to the eleventh connection lead.

The gate connection line corresponding to the eleventh transistor, the gate connection line corresponding to the twelfth transistor, the drain connection line corresponding to the third transistor, the drain connection line corresponding to the fourth transistor, the gate connection line corresponding to the thirteenth transistor, the gate connection line corresponding to the fourteenth transistor, and the drain connection line corresponding to the second transistor are connected to the twelfth connection lead.

The first connection lead, the source connection line corresponding to the ninth transistor, the source connection line corresponding to the eleventh transistor, the second sub-connection line of the source connection line corresponding to the tenth transistor, the second sub-connection line of the source connection line corresponding to the twelfth transistor, and the sixth connection lead are connected to the thirteenth connection lead.

The source connection line corresponding to the seventh transistor, the second sub-connection line of the source connection line corresponding to the eighth transistor, the source connection line corresponding to the thirteenth transistor, and the second sub-connection line of the source connection line corresponding to the fourteenth transistor, and the fifth connection lead are connected to the fourteenth connection lead.

The fifth connection lead is connected to the fifteenth connection lead.

The drain connection line corresponding to the seventh transistor, the drain connection line corresponding to the eighth transistor, the drain connection line corresponding to the ninth transistor, and the drain connection line corresponding to the tenth transistor are connected to the first output lead.

The drain connection line corresponding to the eleventh transistor, the drain connection line corresponding to the twelfth transistor, the drain connection line corresponding to the thirteenth transistor, and the drain connection line corresponding to the fourteenth transistor are connected to the second output lead.

The gate connection line corresponding to the first transistor is connected to the first control lead, and the gate connection line corresponding to the second transistor is connected to the second control lead.

The third metal wiring layer includes a first power supply lead for loading a first power supply voltage, and a second power supply lead for loading a second power supply voltage. The ninth connection lead, the tenth connection lead, the fourteenth connection lead, and the fifteenth connection lead are connected to the first power supply lead. The seventh connection lead, the eighth connection lead, and the thirteenth connection lead are connected to the second power supply lead.

According to an embodiment of the present disclosure, in any one of the line drive signal enhancement areas, the source connection line and the drain connection line corresponding to each transistor extend along the first direction, and the gate of each transistor extends along the first direction.

According to an embodiment of the present disclosure, the first connection lead includes a first sub-lead, a second sub-lead and a third sub-lead connected in sequence. The first sub-lead of the first connection lead and the third sub-lead of the first connection lead extend along the first direction and at least partially overlap with the N-type auxiliary doped region. The second sub-lead of the first connection lead extends along the second direction and at least partially overlaps with the N-type auxiliary doped region. The first sub-lead of the first connection lead, the second sub-lead of the first connection lead, and the third sub-lead of the first connection lead are all connected to the N-type auxiliary doped region. The first sub-active region is located in a space surrounded by the first connection lead.

The source connection line corresponding to the ninth transistor includes a first sub-connection line and a second sub-connection line respectively located at both sides of the gate corresponding to the ninth transistor and extending along the first direction. The source connection line corresponding to the eleventh transistor includes a first sub-connection line and a second sub-connection line respectively located at both sides of the gate corresponding to the eleventh transistor and extending along the first direction. A side in a direction opposite to the second direction of the first sub-connection line of the source connection line corresponding to the ninth transistor is connected to the first sub-lead of the first connection lead. A side in the second direction of the first sub-connection line of the source connection line corresponding to the eleventh transistor is connected to the third sub-lead of the first connecting lead. The second sub-connection line of the source connection line corresponding to the ninth transistor and the second sub-connection line of the source connection line corresponding to the eleventh transistor are the same lead, and extend along a direction opposite to the first direction to connect with the second sub-lead of the first connection lead.

The seventh connection lead is connected to the first sub-lead of the first connection lead. The eighth connection lead is connected to the third sub-lead of the first connection lead. The thirteenth connection lead is connected to the second sub-lead of the first connection lead.

According to an embodiment of the present disclosure, the second connection lead includes a first sub-lead, a third sub-lead and a fourth sub-lead which are connected in sequence, and further includes a second sub-lead. The first sub-lead of the second connection lead and the fourth sub-lead of the second connection lead extend along the first direction, and at least partially overlap with the N-type auxiliary doped region. The second sub-lead of the second connection lead and the third sub-lead of the second connection lead extend along the second direction, and at least partially overlap with the N-type auxiliary doped region. The first to fourth sub-leads of the second connection lead are all connected to the N-type auxiliary doped region.

The second sub-active region is located in a space surrounded by the first sub-lead of the second connection lead, the second sub-lead of the second connection lead and the fourth sub-lead of the second connection lead. The second active region is located in a space surrounded by the first sub-lead of the second connection lead, the second sub-lead of the second connection lead, the third sub-lead of the second connection lead, and the fourth sub-lead of the second connection lead.

The first sub-connection line of the source connection line corresponding to the tenth transistor extends along the first direction, and has a side in a direction opposite to the first direction connected to the first sub-lead of the second connection line. The first sub-connection line of the source connection line corresponding to the twelfth transistor extends along the first direction, and has a side in the first direction connected to the fourth sub-lead of the second connection line. The second sub-connection line of the source connection line corresponding to the tenth transistor and the second sub-connection line of the source connection line corresponding to the twelfth transistor are the same lead, and extend along the first direction.

According to an embodiment of the present disclosure, the fifth connection lead includes a first sub-lead, a second sub-lead, a third sub-lead and a fourth sub-lead connected in sequence, and further includes a fifth sub-lead and a sixth sub-lead.

The first sub-lead, the third sub-lead and the sixth sub-lead of the fifth connection lead all extend along the first direction, and all at least partially overlap with the P-type auxiliary doped region. The sixth sub-lead of the fifth connection lead is located between the first sub-lead and the third sub-lead, and has two ends respectively connected to the fifth sub-lead and the fourth sub-lead.

The second sub-lead, the fourth sub-lead, and the fifth sub-lead of the fifth connection lead all extend along the second direction, and at least partially overlap with the P-type auxiliary doped region. The fifth sub-lead of the fifth connection lead is located between the second sub-lead and the fourth sub-lead, and has two ends respectively connected to the first sub-lead and the third sub-lead. The first sub-lead to the sixth sub-lead of the fifth connection lead are all connected to the P-type auxiliary doped region.

The third active region is located in a space surrounded by the first sub-lead, the second sub-lead, the third sub-lead and the fifth sub-lead of the fifth connection lead. The seventh sub-active region is located in a space surrounded by the first sub-lead, the fifth sub-lead, the sixth sub-lead and the fourth sub-lead of the fifth connection lead. The eighth sub-active region is located in a space surrounded by the sixth sub-lead, the fifth sub-lead, the third sub-lead and the fourth sub-lead of the fifth connection lead.

The source connection line corresponding to the seventh transistor includes a first sub-connection line and a second sub-connection line respectively located at both sides of the gate corresponding to the seventh transistor and extending along the first direction. The source connection line corresponding to the thirteenth transistor includes a first sub-connection line and a second sub-connection line respectively located at both sides of the gate corresponding to the thirteenth transistor and extending along the first direction. A side in a direction opposite to the second direction of the first sub-connection line of the source connection line corresponding to the seventh transistor is connected to the first sub-lead of the fifth connection line. A side in the second direction of the first sub-connection line of the source connection line corresponding to the thirteenth transistor is connected to the third sub-lead of the fifth connection lead. The second sub-connection line of the source connection line corresponding to the seventh transistor and the second sub-connection line of the source connection line corresponding to the thirteenth transistor are the same lead, and extend along the first direction to connect with the second sub-lead of the fifth connection lead. A side in a direction opposite to the second direction of the first sub-connection line of the source connection line corresponding to the eighth transistor is connected to the first sub-lead of the fifth connection line. A side in the second direction of the first sub-connection line of the source connection line corresponding to the fourteenth transistor is connected with the third sub-lead of the fifth connection line. The second sub-connection line of the source connection line corresponding to the eighth transistor and the second sub-connection line of the source connection line corresponding to the fourteenth transistor are the same lead.

The source connection line corresponding to the first transistor includes a first sub-connection line and a second sub-connection line respectively located at both sides of the gate corresponding to the first transistor and extending along the first direction. A side in a direction opposite to the second direction of the first sub-connection line of the source connection line corresponding to the first transistor is connected to the first sub-lead of the fifth connection lead. A side in the second direction of the second sub-connection line of the source connection line corresponding to the first transistor is connected to the sixth sub-lead of the fifth connection lead.

The source connection line corresponding to the second transistor includes a first sub-connection line and a second sub-connection line respectively located at both sides of the gate corresponding to the second transistor and extending along the first direction. A side in the second direction of the first sub-connection line of the source connection line corresponding to the second transistor is connected to the third sub-lead of the fifth connection line. A side in the second direction of the second sub-connection line of the source connection line corresponding to the second transistor is connected to the sixth sub-lead of the fifth connection lead.

According to an embodiment of the present disclosure, the third connection lead, the fourth connection lead and the sixth connection lead are located in a space surrounded by the first sub-lead of the second connection lead, the second sub-lead of the second connection lead, the third sub-lead of the second connection lead, and the fourth sub-lead of the second connection lead. The third connection lead and the fourth connection lead extend along the second direction. The sixth connection lead extends along the first direction.

A side in the second direction of the source connection line corresponding to the sixth transistor is connected to the sixth connection lead. A side in a direction opposite to the second direction of the source connection line corresponding to the third transistor is connected to the sixth connection lead.

The drain connection line corresponding to the fifth transistor and the drain connection line corresponding to the sixth transistor are the same lead, and have an end connected to an end of the fourth connection lead. The gate connection line corresponding to the third transistor and the gate connection line corresponding to the fourth transistor are the same lead, and have an end connected to the other end of the fourth connection lead.

The drain connection line corresponding to the third transistor and the drain connection line corresponding to the fourth transistor are the same lead, and have an end connected to an end of the third connection lead. The gate connection line corresponding to the fifth transistor and the gate connection line corresponding to the sixth transistor are the same lead, and have an end connected to the other end of the third connection lead.

According to an embodiment of the present disclosure, the seventh connection lead extends along the first direction, and is connected to the first sub-lead of the first connection lead and the first sub-lead of the second connection lead.

The eighth connection lead extends along the first direction, and is connected to the third sub-lead of the first connection lead and the fourth sub-lead of the second connection lead.

The ninth connection lead extends along the first direction, and is electrically connected with the first sub-lead of the fifth connection lead.

The tenth connection lead extends along the first direction, and is connected with the third sub-lead of the fifth connection lead.

The drain connection line corresponding to the fifth transistor and the drain connection line corresponding to the first transistor are located on the same straight line, and the orthographic projection on the semiconductor substrate of the extension axis thereof coincides with the orthographic projection on the semiconductor substrate of the extension axis of the eleventh connection lead.

The drain connection line corresponding to the third transistor and the drain connection line corresponding to the second transistor are located on the same straight line, and the orthographic projection on the semiconductor substrate of the extension axis thereof coincides with the orthographic projection on the semiconductor substrate of the extension axis of the twelfth connection lead.

The orthographic projection on the semiconductor substrate of the extension axis of the thirteenth connection lead, the orthographic projection on the semiconductor substrate of the extension axis of the second sub-connection line of the source connection line corresponding to the ninth transistor, the orthographic projection on the semiconductor substrate of the extension axis of the second sub-connection line of the source connection line corresponding to the tenth transistor, and the orthographic projection on the semiconductor substrate of the extension axis of the sixth connection lead coincide with each other.

The orthographic projection on the semiconductor substrate of the extension axis of the second sub-connection line of the source connection line corresponding to the seventh transistor, the orthographic projection on the semiconductor substrate of the extension axis of the second sub-connection line of the source connection line corresponding to the eighth transistor, the orthographic projection on the semiconductor substrate of the extension axis of the sixth sub-lead of the fifth connection lead, the orthographic projection on the semiconductor substrate of the extension axis of the fourteenth connection lead, and the orthographic projection on the semiconductor substrate of the extension axis of the fifteenth connection lead coincide with each other.

According to an embodiment of the present disclosure, the first power supply lead covers the third active region and the fourth active region; and the second power supply lead covers the first active region and the second active region.

According to an embodiment of the present disclosure, the display panel is further provided with a pixel driving circuit in the display area, and the pixel driving circuit includes a data writing unit, a storage capacitor and a driving transistor.

The data writing unit has a first control electrode and a second control electrode. The first control electrode of the data writing unit is connected to the first output lead, and the second control electrode of the data writing unit is connected to the second output lead. The input terminal of the data writing unit is connected with the data line of the display panel, and the output terminal of the data writing unit is connected with the third node.

The first electrode plate of the storage capacitor is connected to the third node, and the second electrode plate of the storage capacitor is used for loading the first driving voltage.

The control terminal of the driving transistor is connected to the third node, the output terminal of the driving transistor is connected to the light-emitting element of the display panel, and the input terminal of the driving transistor can be loaded with a second driving voltage.

According to an embodiment of the present disclosure, the first power supply lead is used for loading the first driving voltage, and the second power supply lead is used for loading the second driving voltage.

According to an embodiment of the present disclosure, the display panel is further provided with a plurality of shift registers and a plurality of inverters arranged in a one-to-one correspondence with each of the line drive signal enhancement circuits in the peripheral area.

Among the line drive signal enhancement circuit, the shift register and the inverter corresponding to each other, the output terminal of the shift register is connected to the input terminal of the inverter and the first control lead of the line drive signal enhancement circuit, and the output terminal of the inverter is connected to the second control lead of the line drive signal enhancement circuit.

It should be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the present specification, illustrate embodiments consistent with the present disclosure and together with the present description serve to explain the principle of the present disclosure. Obviously, the drawings in the following description are only some embodiments of the present disclosure, and for those of ordinary skill in the art, other drawings may also be obtained from these drawings without creative effort.

LISTS OF REFERENCE NUMBERS

Figure 1:
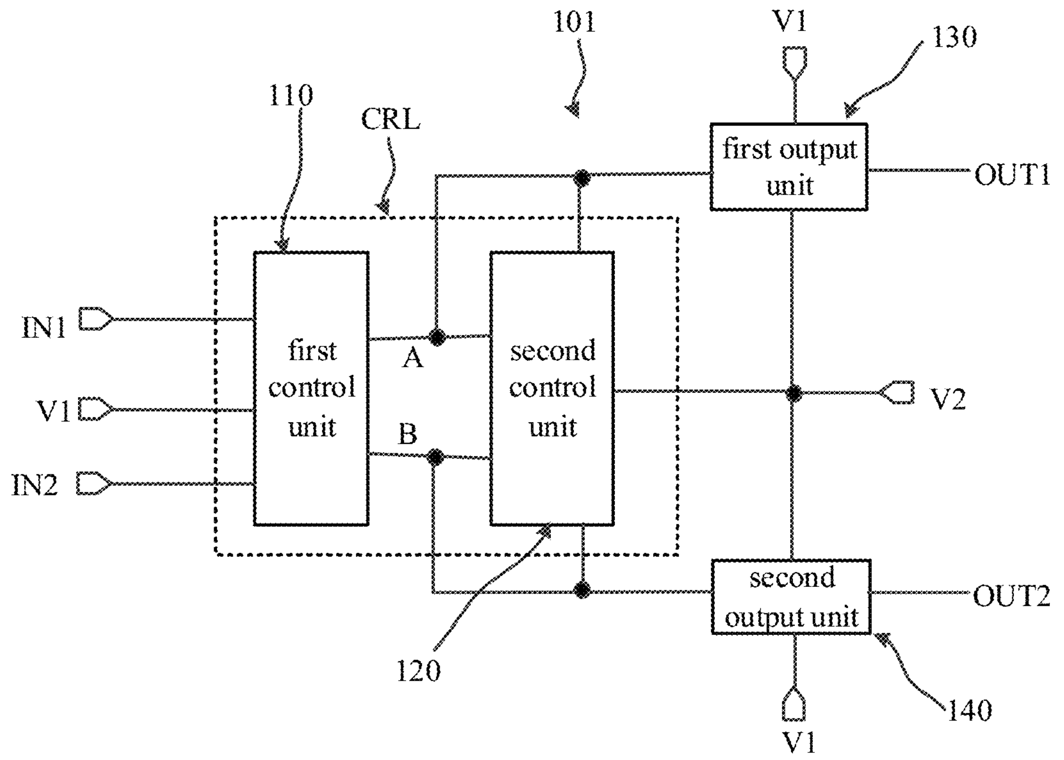
FIG. 1 is a schematic structural diagram of a line drive signal enhancement circuit according to an embodiment of the present disclosure.

101, line drive signal enhancement circuit; 102, shift register; 103, inverter; 104, pixel driving circuit; CRL, control unit; 110, first control unit; 120, second control unit; 130, first output unit; 140, second output unit; 250, data writing unit; M01, first switch transistor; M02, second switch transistor; Cst, storage capacitor; M03, driving transistor; 310, semiconductor substrate; 320, gate insulation layer; 330, gate layer; 340, insulation medium layer; 341, first dielectric layer; 342, second dielectric layer; 343, third dielectric layer; 351, first conductive pillar; 352, second conductive pillar; 353, third conductive pillar; 360, metal wiring layer; 361, first metal wiring layer; 362, second metal wiring layer; 363, third metal wiring layer; 411, first power supply lead; 412, second power supply lead; 421, first control lead; 422, second control lead; 431, first output lead; 432, second output lead; M1, first transistor; M2, second transistor; M3, third transistor; M4, fourth transistor; M5, fifth transistor; M6, sixth transistor; M7, seventh transistor; M8, eighth transistor; M9, ninth transistor; M10, tenth transistor; M11, eleventh transistor; M12, twelfth transistor; M13, thirteenth transistor; M14, fourteenth transistor; V1, first power supply voltage; V2, second power supply voltage; A, first node; B, second node; C, third node; IN1, first control terminal; IN2, second control terminal; OUT1, first output terminal; OUT2, second output terminal; D, display area; E, peripheral area; F, line drive signal enhancement area; G, first direction; H, second direction; Act1, first active region; Act2, second active region; Act3, third active region; Act4, fourth active region; Act_sub1, first sub-active region; Act_sub2, second sub-active region; Act_sub3, third sub-active region; Act_sub4, fourth sub-active region; Act_sub5, fifth sub-active region; Act_sub6, sixth sub-active region; Act_sub7, seventh sub-active region; Act_sub8, eighth sub-active region; F_Pdop, P-type substrate region; F_Pdummy, P-type auxiliary doped region; F_Psub1, first P-type doped sub-region; F_Psub2, second P-type doped sub-region; F_Psub3, third P-type doped sub-region; F_Psub4, fourth P-type doped sub-region; F_Psub5, fifth P-type doped sub-region; F_Psub6, sixth P-type doped sub-region; F_Psub7, seventh P-type doped sub-region; F_Psub8, eighth P-type doped sub-region; F_Ndop, N-type substrate region; F_Ndummy, N-type auxiliary doped region; F_Nsub1, first N-type doped sub-region; F_Nsub2, second N-type doped sub-region; F_Nsub3, third N-type doped sub-region; F_Nsub4, fourth N-type doped sub-region; F_Nsub5, fifth N-type doped sub-region; F_Nsub6, sixth N-type doped sub-region; F_Nsub7, seventh N-type doped sub-region; MIS1, first source of first transistor; MIS2, second source of first transistor; MID, drain of first transistor; MIG, gate of first transistor; MIG1, first gate of first transistor; MIG2, second gate of first transistor; M1SL1, first sub-connection line of source connection line corresponding to first transistor; M1SL2, second sub-connection line of the source connection line corresponding to first transistor; MIDL, drain connection line corresponding to first transistor; MIGL, gate connection line corresponding to first transistor; M2S1, first source of second transistor; M2S2, second source of second transistor; M2D, drain of second transistor; M2G, gate of second transistor; M2G1, first gate of second transistor; M2G2, second gate of second transistor; M2SL1, first sub-connection line of source connection line corresponding to second transistor; M2SL2, second sub-connection line of source connection line corresponding to second transistor; M2DL, drain connection line corresponding to second transistor; M2GL, gate connection line corresponding to second transistor; M3S, second source of third transistor; M3D, drain of third transistor; M3G, gate of third transistor; M3SL, source connection line corresponding to third transistor; M3DL, drain connection line corresponding to third transistor; M3GL, gate connection line corresponding to third transistor; M4S, second source of fourth transistor; M4D, drain of fourth transistor; M4G, gate of fourth transistor; M4SL, source connection line corresponding to fourth transistor;

M4DL, drain connection line corresponding to fourth transistor; M4GL, gate connection line corresponding to fourth transistor; M5S, second source of fifth transistor; M5D, drain of fifth transistor; M5G, gate of fifth transistor; M5SL, source connection line corresponding to fifth transistor; M5DL, drain connection line corresponding to fifth transistor; M5GL, gate connection line corresponding to fifth transistor; M6S, second source of sixth transistor; M6D, drain of sixth transistor; M6G, gate of sixth transistor; M6SL, source connection line corresponding to sixth transistor; M6DL, drain connection line corresponding to sixth transistor; M6GL, gate connection line corresponding to sixth transistor; M7S1, first source of seventh transistor; M7S2, second source of seventh transistor; M7D, drain of seventh transistor; M7G, gate of seventh transistor; M7G1, first gate of seventh transistor; M7G2, second gate of seventh transistor; M7SL1, first sub-connection line of source connection line corresponding to seventh transistor; M7SL2, second sub-connection line of source connection line corresponding to seventh transistor; M7DL, drain connection line corresponding to seventh transistor; M7GL, gate connection line corresponding to seventh transistor; M8S1, first source of eighth transistor; M8S2, second source of eighth transistor; M8D, drain of eighth transistor; M8G, gate of eighth transistor; M8G1, first gate of eighth transistor; M8G2, second gate of eighth transistor; M8SL1, first sub-connection line of source connection line corresponding to eighth transistor; M8SL2, second sub-connection line of source connection line corresponding to eighth transistor; M8DL, drain connection line corresponding to eighth transistor; M8GL, gate connection line corresponding to eighth transistor; M9S1, first source of ninth transistor; M9S2, second source of ninth transistor; M9D, drain of ninth transistor; M9G, gate of ninth transistor; M9G1, first gate of ninth transistor; M9G2, second gate of ninth transistor; M9SL1, first sub-connection line of source connection line corresponding to ninth transistor; M9SL2, second sub-connection line of source connection line corresponding to ninth transistor; M9DL, drain connection line corresponding to ninth transistor; M9GL, gate connection line corresponding to ninth transistor; M10S1, first source of tenth transistor; M10S2, second source of tenth transistor; M10D, drain of tenth transistor; M10G, gate of tenth transistor; M10G1, first gate of tenth transistor; M10G2, second gate of tenth transistor; M10SL1, first sub-connection line of source connection line corresponding to tenth transistor; M10SL2, second sub-connection line of source connection line corresponding to tenth transistor; M10DL, drain connection line corresponding to tenth transistor; M10GL, gate connection line corresponding to tenth transistor; M11S1, first source of eleventh transistor; M11S2, second source of eleventh transistor; M11D, drain of eleventh transistor; M11G, gate of eleventh transistor; M11G1, first gate of eleventh transistor; M11G2, second gate of eleventh transistor; M11SL1, first sub-connection line of source connection line corresponding to eleventh transistor; M11SL2, second sub-connection line of source connection line corresponding to eleventh transistor; M11DL, drain connection line corresponding to eleventh transistor; M11GL, gate connection line corresponding to eleventh transistor; M12S1, first source of twelfth transistor; M12S2, second source of twelfth transistor; M12D, drain of twelfth transistor; M12G, gate of twelfth transistor; M12G1, first gate of twelfth transistor; M12G2, second gate of twelfth transistor; M12SL1, first sub-connection line of source connection line corresponding to twelfth transistor; M12SL2, second sub-connection line of source connection line corresponding to twelfth transistor; M12DL, drain connection line corresponding to twelfth transistor; M12GL, gate connection line corresponding to twelfth transistor; M13S1, first source of thirteenth transistor; M13S2, second source of thirteenth transistor; M13D, drain of thirteenth transistor; M13G, gate of thirteenth transistor; M13G1, first gate of thirteenth transistor; M13G2, second gate of thirteenth transistor; M13SL1, first sub-connection line of source connection line corresponding to thirteenth transistor; M13SL2, second sub-connection line of source connection line corresponding to thirteenth transistor; M13DL, drain connection line corresponding to thirteenth transistor; M13GL, gate connection line corresponding to thirteenth transistor; M14S1, first source of fourteenth transistor; M14S2, second source of fourteenth transistor; M14D, drain of fourteenth transistor; M14G, gate of fourteenth transistor; M14G1, first gate of fourteenth transistor; M14G2, second gate of fourteenth transistor; M14SL1, first sub-connection line of source connection line corresponding to fourteenth transistor; M14SL2, second sub-connection line of source connection line corresponding to fourteenth transistor; M14DL, drain connection line corresponding to fourteenth transistor; M14GL, gate connection line corresponding to fourteenth transistor; L01, first connection lead; L011, first sub-lead of first connection lead; L012, second sub-lead of first connection lead; L013, third sub-lead of first connection lead; L02, second connection lead; L021, first sub-lead of second connection lead; L022, second sub-lead of second connection lead; L023, third sub-lead of second connection lead; L024, fourth sub-lead of second connection lead; L03, third connection lead; L04, fourth connection lead; L05, fifth connection lead; L051, first sub-lead of fifth connection lead; L052, second sub-lead of fifth connection lead; L053, third sub-lead of fifth connection lead; L054, fourth sub-lead of fifth connection lead; L055, fifth sub-lead of fifth connection lead; L056, sixth sub-lead of fifth connection lead; L07, seventh connection lead; L08, eighth connection lead; L09, ninth connection lead; L10, tenth connection lead; L11, eleventh connection lead; L12, twelfth connection lead; L13, thirteenth connection lead; L14, fourteenth connection lead; L15, fifteenth connection lead; L16, sixteenth connection lead; L17, seventeenth connection lead.

DETAILED DESCRIPTION OF THE EMBODIMENTS

Example embodiments will now be described more fully with reference to the accompanying drawings. Example embodiments, however, may be embodied in various forms and should not be construed as limited to embodiments set forth herein. Rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

Although relative terms such as “upper” and “lower” are used in the present specification to describe the relative relationship of one component represented by an icon to another component, these terms are used in the present specification only for convenience, such as according to the direction in the example shown in the figures. It will be appreciated that if the device represented by the icon is turned upside down, the components described as being “on” the device will become the components “below” the device. When a certain structure is “on” another structure, it may mean that the certain structure is integrally formed on the other structure, or that the certain structure is “directly” arranged on the other structure, or that the certain structure is “indirectly” arranged on the other structure through a third structure.

The terms “a”, “an”, “the”, “said” and “at least one” are used to indicate the presence of one or more elements or components, etc. The terms “include” and “have” are used to indicate an open-ended inclusion, which means that additional elements or components, etc. may be present in addition to the listed elements or components, etc. The terms “first”, “second” and “third” etc. are only used as a marker, not a limit on the number of objects accompanied thereby.

Throughout the present disclosure, a transistor refers to an element including at least three terminals, i.e., a gate, a drain, and a source. A transistor has a channel region between the drain (drain terminal, drain region or drain electrode) and the source (source terminal, source region or source electrode), and the current flows through the drain, the channel region and the source. The channel region refers to the region through which the current mainly flows. The functions of “source” and “drain” may be interchanged with each other when using transistors of an opposite type or when the direction of the current changes during circuit operation. Therefore, throughout the present disclosure, “source” and “drain” may be interchanged with each other. Structurally, a transistor may have a first terminal, a second terminal and a control terminal. The gate of the transistor may be used as the control terminal (or control electrode) of the transistor. One of the source and the drain of the transistor may be used as the first terminal of the transistor, and the other of the source and the drain of the transistor may be used as the second terminal of the transistor.

Throughout the present disclosure, the “on” state of a transistor refers to a state in which the source and the drain of the transistor are electrically connected. The “off” state of a transistor refers to a state in which the source and the drain of the transistor are electrically disconnected. It may be understood that when the transistor is turned off, leakage current may still exist.

Throughout the present disclosure, when it is described that two signals are inverted signals, it means that one of the two signals is a high-level signal and the other signal is a low-level signal.

Referring to FIG. 1, an embodiment of the present disclosure provides a line drive signal enhancement circuit, including a control unit CRL, a first output unit 130, and a second output unit 140.

The control unit CRL has a first control terminal IN1 and a second control terminal IN2, and is used for inputting a first power supply voltage V1 to one of the first node A and the second node B and inputting a second power supply voltage V2 to the other one of the first node A and the second node B under the control of the first control terminal IN1 and the second control terminal IN2.

The first output unit 130 is connected to the first node A and the first output terminal OUT1, and is used for outputting one of the first power supply voltage V1 and the second power supply voltage V2 to the first output terminal OUT1 under the control of the first node A.

The second output unit 140 is connected to the second node B and the second output terminal OUT2, and is used for outputting the other one of the first power supply voltage V1 and the second power supply voltage V2 to the second output terminal OUT2 under the control of the second node B.

Figure 4:
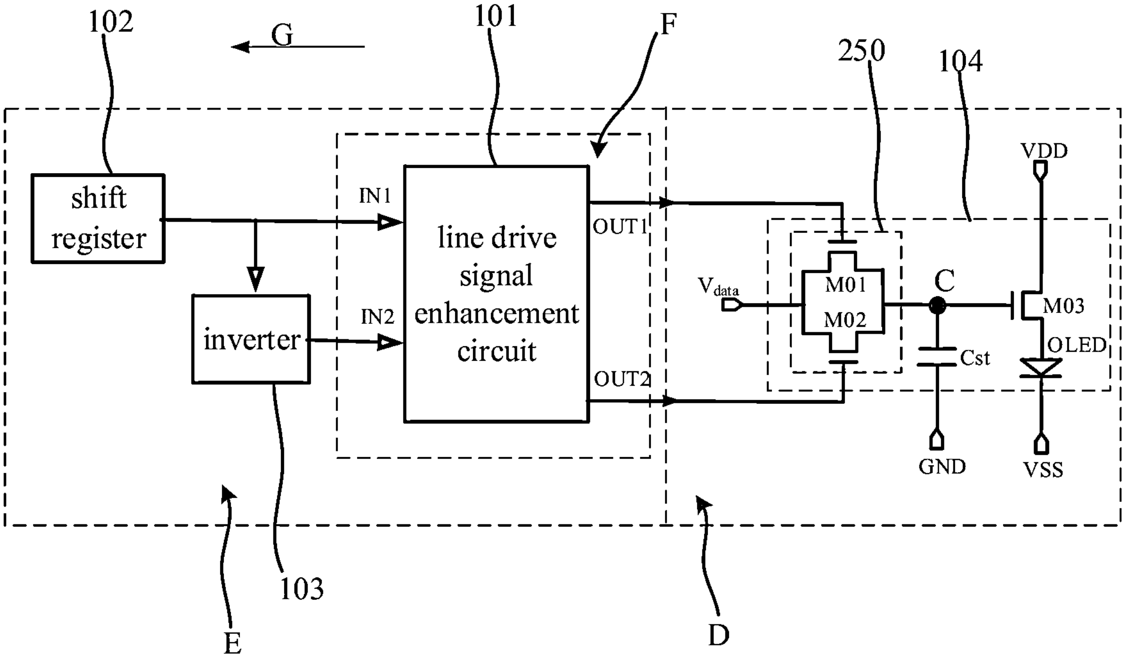
FIG. 4 is a schematic structural diagram of a display panel according to an embodiment of the present disclosure.

Referring to FIG. 4, the line drive signal enhancement circuit 101 provided by an embodiment of the present disclosure may form a shift register unit with a shift register 102 and an inverter 103. The shift register 102 is used for outputting an initial scan signal (i.e., a first initial scan signal) to the input terminal of the inverter 103 and the first control terminal IN1 of the line drive signal enhancement circuit 101. The output terminal of the inverter 103 is connected to the second control terminal IN2 of the line drive signal enhancement circuit 101, so that a second initial scan signal is generated according to the first initial scan signal, which second initial scan signal is inverted with respect to the first initial scan signal. In this way, the shift register 102 and the inverter 103 may respectively input two inverted initial scan signals (first and second initial scan signals) to the two control terminals (first control terminal IN1 and second control terminal IN2) of the control unit CRL of the line drive signal enhancement circuit 101. The line drive signal enhancement circuit 101 helps to enable the first output unit 130 and the second output unit 140 to output two different power supply voltages (first power supply voltage V1 and second power supply voltage V2), for severing as the scan signal of the display panel, according to the two inverted initial scan signals loaded on the first control terminal IN1 and the second control terminal IN2. That is, the scan signal formed by the first power supply voltage V1 and the second power supply voltage V2 is output. The scan signal formed by the two power supply voltages may replace the initial scan signal generated by the shift register 102 and the inverter 103 to control the data writing unit of the pixel driving circuit.

Therefore, with the line drive signal enhancement circuit 101 provided by an embodiment of the present disclosure, an initial scan signal with a weaker driving ability may be converted into a scan signal formed by a power supply voltage with a stronger driving ability. This helps to overcome problems such as large delay and voltage loss when the initial scan signal reaches the pixel driving circuit, thereby improving the display uniformity of the display panel, especially the display uniformity of the silicon-based organic light-emitting diode (OLED) display.

Hereinafter, the structure, principle and effect of the line drive signal enhancement circuit 101 according to an embodiment of the present disclosure will be further explained and described with reference to the accompanying drawings.

The line drive signal enhancement circuit 101 provided by an embodiment of the present disclosure is used to improve the line drive capability of the display panel, especially the line drive capability of the silicon-based OLED display. The line drive signal enhancement circuit 101 can generate two scan signals according to two initial scan signals of the display panel. The scan voltages of the two scan signals are different power supply voltages. On the one hand, a smaller voltage drop is introduced during the transmission process on the scan lead, and on the other hand, a larger signal transmission capacity is obtained to meet the requirements of various loads on the scan line, thereby reducing the turn-on delay of each data writing unit. Therefore, the scan signal generated by the line drive signal enhancement circuit 101 has stronger driving capability.

Optionally, in the line drive signal enhancement circuit 101, the control unit CRL may include a first control unit 110 and a second control unit 120.

The first control unit 110 has a first control terminal IN1 and a second control terminal IN2, and is used for outputting the first power supply voltage V1 to the first node A or the second node B under the control of the first control terminal IN1 and the second control terminal IN2.

The second control unit 120 is connected to the first node A and the second node B, and is used for outputting the second power supply voltage V2 to the second node B in response to the first power supply voltage V1 loaded on the first node A and for outputting the second power supply voltage V2 to the first node A in response to the first power supply voltage V1 loaded on the second node B.

Optionally, the first output unit 130 may further include a first input terminal and a second input terminal. The first input terminal of the first output unit 130 is loaded with the first power supply voltage V1, and the second input terminal of the first output unit 130 is loaded with the second power supply voltage V2. In other words, the first input terminal of the first output unit 130 is connected to the power source providing the first power supply voltage V1 through a lead, and the second input terminal of the first output unit 130 is connected to the power source providing the second power supply voltage V2 through a lead. In this way, the first output unit 130 can directly output any one of the loaded first power supply voltage V1 and second power supply voltage V2 to the first output terminal OUT1, without generating the first power supply voltage V1 and the second power supply voltage V2 by a voltage regulation method. This helps to ensure that the signal output by the first output terminal OUT1 is not only the first power supply voltage V1 or the second power supply voltage V2 in voltage, but also ensure that the scan signal output by the first output terminal OUT1 has stronger driving capability, thereby meeting the requirements of various load on various scan leads.

Optionally, in the line drive signal enhancement circuit 101, the second output unit 140 may further include a first input terminal and a second input terminal. The first input terminal of the second output unit 140 is loaded with the first power supply voltage V1, and the second input terminal of the second output unit 140 is loaded with the second power supply voltage V2. In other words, the first input terminal of the second output unit 140 is connected to the power source providing the first power supply voltage V1 through a lead, and the second input terminal of the second output unit 140 is connected to the power source providing the second power supply voltage V2 through a lead. In this way, the second output unit 140 can directly output any one of the loaded first power supply voltage V1 and second power supply voltage V2 to the second output terminal OUT2, without generating the first power supply voltage V1 and the second power supply voltage V1 by a voltage regulation method. This helps to ensure that the signal output by the second output terminal OUT2 is not only the first power supply voltage V1 or the second power supply voltage V2 in voltage, but also ensure that the scan signal output by the second output terminal OUT2 has stronger driving capability, thereby meeting the requirements of various loads on various scan leads.

Optionally, the second control unit 120 has at least two groups of transistors, and each group of transistors includes at least two transistors of the same type. That is, the second control unit 120 has at least four transistors. In a group of transistors, the transistors are connected in parallel. That is, the source of each transistor in the same group is electrically connected to each other, the drain of each transistor is electrically connected to each other, and the gate of each transistor is electrically connected to each other. In this way, the signal delay (RC delay) of each transistor is reduced, the turn-on speed of each group of transistors is improved, the driving capability of each group of transistors is ensured, and the signal delay of the second control unit 120 is reduced.

Throughout the present disclosure, the type of transistor means that the transistor is an N-type transistor or a P-type transistor. When two or more transistors are of the same type, it means that the two or more transistors are all N-type transistors, or P-type transistors.

Figure 2:
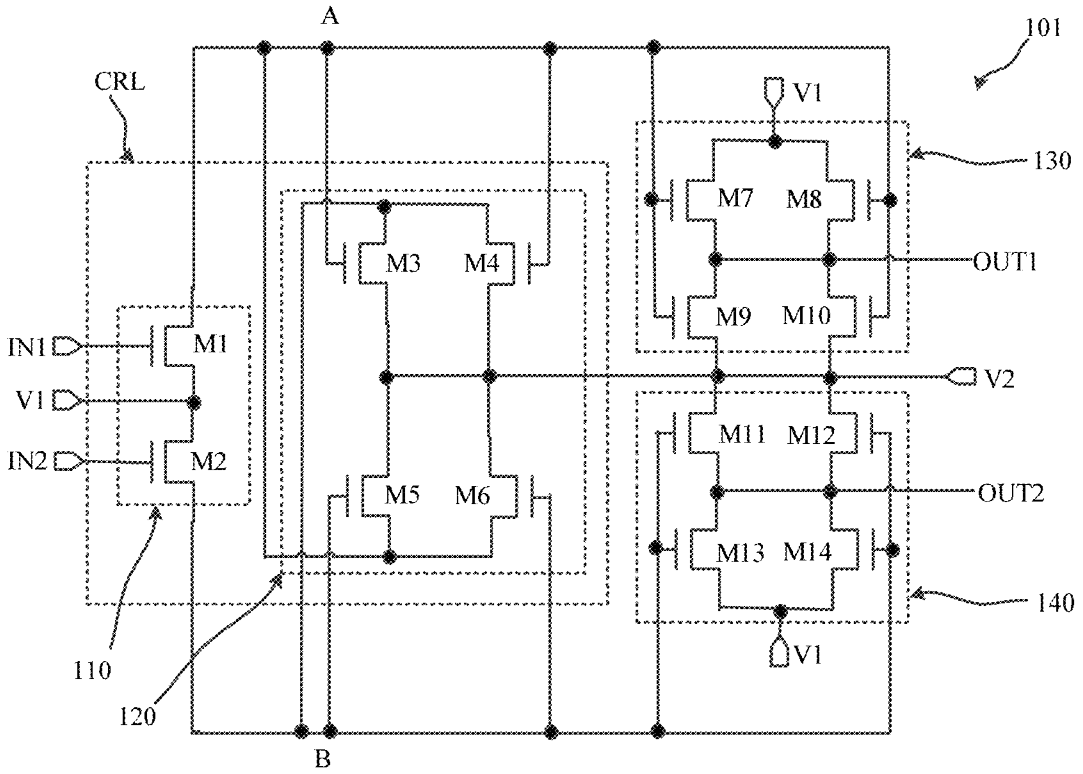
FIG. 2 is a schematic structural diagram of a line drive signal enhancement circuit according to an embodiment of the present disclosure.

Optionally, referring to FIG. 2, the first control unit 110 may include a first transistor M1 and a second transistor M2.

The first transistor M1 has a first terminal for loading the first power supply voltage V1, a second terminal connected to the first node A, and a control terminal serving as the first control terminal IN1. The first transistor M1 is used for outputting the first power supply voltage V1 to the first node A under the control of the control terminal of the first transistor M1.

The second transistor M2 has a first terminal for loading the first power supply voltage V1, a second terminal connected to the second node B, and a control terminal serving as the second control terminal IN2. The second transistor M2 is used for outputting the first power supply voltage V1 to the second node B under the control of the control terminal of the second transistor M2.

The first transistor M1 and the second transistor M2 are both N-type transistors or both P-type transistors.

Figure 3:
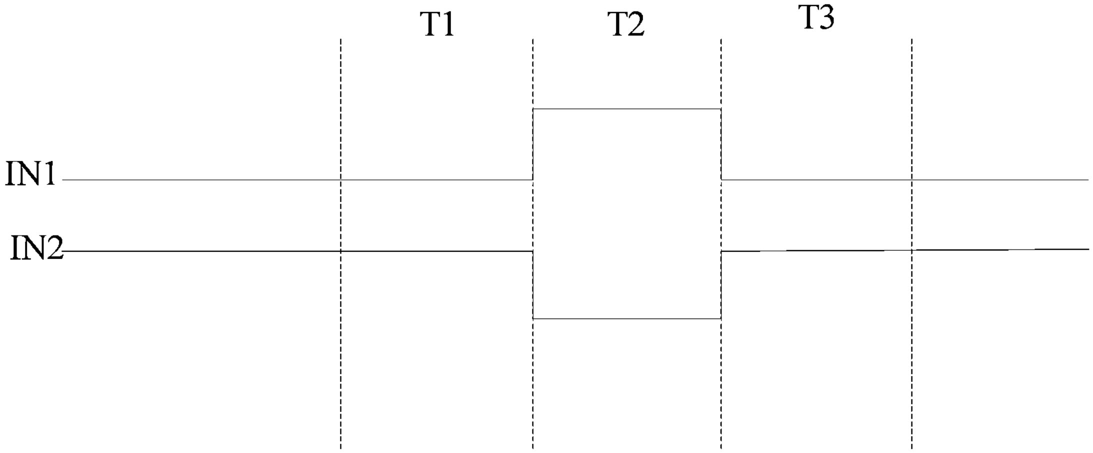
FIG. 3 is a timing diagram of signals applied to two control terminals of a line drive signal enhancement circuit according to an embodiment of the present disclosure.

Referring to FIG. 3, when the line drive signal enhancement circuit 101 according to an embodiment of the present disclosure is in operation, the first control terminal IN1 and the second control terminal IN2 of the first control unit 110 are respectively loaded with inverted first initial scan signal and second initial scan signal. Therefore, the control terminals of the first transistor M1 and the second transistor M2 are respectively loaded with two inverted initial scan signals. The first transistor M1 and the second transistor M2 are of the same type, for example, both being N-type transistors or both being P-type transistors. This not only facilitates the fabrication of transistors, but also enables the first transistor M1 and the second transistor M2 to be turned on alternatively, so that the first control unit 110 alternatively outputs the first power supply voltage V1 to the first node A or the second node B.

In the following, an example is used, where the first transistor M1 and the second transistor M2 are both N-type transistors, and the first initial scan signal output by the shift register unit is a high-level signal, for introducing the working process of the first control unit 110.

FIG. 3 is a timing diagram of two initial scan signals loaded on the first control terminal IN1 and the second control terminal IN2. Referring to FIG. 3, the first control terminal IN1 is loaded with a low-level base voltage during the T1 stage and the T3 stage, and is loaded with a high-level first initial scan signal during the T2 stage. The second control terminal IN2 is loaded with a high-level base voltage during the T1 stage and the T3 stage, and is loaded with a low-level second initial scan signal during the T2 stage.

Therefore, the signals on the first control terminal IN1 and the second control terminal IN2 are kept inverted, and one is at a high level while the other is at a low level.

During the T1 and T3 stages, the first control terminal IN1 is loaded with a low-level signal and the second control terminal IN2 is loaded with a high-level signal, so that the second transistor M2 is turned on while the first transistor M1 is turned off, and the first control unit 110 outputs the first power supply voltage V1 to the second node B. During the T2 stage, the first control terminal IN1 is loaded with a high-level signal and the second control terminal IN2 is loaded with a low-level signal, so that the first transistor M1 is turned on while the second transistor M2 is turned off, and the first control unit 110 outputs the first power supply voltage V1 to the first node A.

Optionally, referring to FIG. 2, the second control unit 120 may include a third transistor M3, a fourth transistor M4, a fifth transistor M5, and a sixth transistor M6.

The third transistor M3 has a control terminal connected to the first node A, a first terminal used for loading the second power supply voltage V2, and a second terminal connected to the second node B. The third transistor M3 is used for outputting the second power supply voltage V2 to the second node B under the control of the first power supply voltage V1 loaded on the first node A.

The fourth transistor M4 has a control terminal connected to the first node A, a first terminal used for loading the second power supply voltage V2, and a second terminal connected to the second node B. The fourth transistor M4 is used for outputting the second power supply voltage V2 to the second node B under the control of the first power supply voltage V1 loaded on the first node A.

The fifth transistor M5 has a control terminal connected to the second node B, a first terminal used for loading the second power supply voltage V2, and a second terminal connected to the first node A. The fifth transistor M5 is used for outputting the second power supply voltage V2 to the first node A under the control of the first power supply voltage V1 loaded on the second node B.

The sixth transistor M6 has a control terminal connected to the second node B, a first terminal used for loading the second power supply voltage V2, and a second terminal connected to the first node A. The sixth transistor M6 is used for outputting the second power supply voltage V2 to the first node A under the control of the first power supply voltage V1 loaded on the second node B.

The third transistor M3 to the sixth transistor M6 are of the same type, and are all N-type transistors or all P-type transistors.

Further, the first power supply voltage V1 is lower than the second power supply voltage V2, and the third transistor M3 to the sixth transistor M6 are P-type transistors. Alternatively, the first power supply voltage V1 is higher than the second power supply voltage V2, and the third transistor M3 to the sixth transistor M6 are N-type transistors. In other words, when the control terminal of any one of the third transistor M3 to the sixth transistor M6 is loaded with the first power supply voltage V1, the transistor can be turned on. When the control terminal of any one of the third transistor M3 to the sixth transistor M6 is loaded with the second power supply voltage V2, the transistor can be turned off.

Hereinafter, the operation process of the second control unit 120 will be explained and illustrated by taking an example where the first power supply voltage V1 is lower than the second power supply voltage V2, and the third transistor M3 to the sixth transistor M6 are P-type transistors. When the first control unit 110 loads the first power supply voltage V1 to the first node A, the first control unit 110 does not load any voltage to the second node B. Under the control of the first node A, the third transistor M3 and the fourth transistor M4 is turned on to output the second power supply voltage V2 to the second node B. In this way, the first node A is loaded with the first power supply voltage V1, and the second node B is loaded with the second power supply voltage V2. On the contrary, when the first control unit 110 loads the first power supply voltage V1 to the second node B, the first control unit 110 does not load any voltage to the first node A. Under the control of the second node B, the fifth transistor M5 and the sixth transistor M6 are turned on to output the second power supply voltage V2 to the first node A. In this way, the second node B is loaded with the first power supply voltage V1, and the first node A is loaded with the second power supply voltage V2. It can be seen from above that no matter what operation state the first control unit 110 and the second control unit 120 are in, the first node A and the second node B are respectively loaded with two different power supply voltages, which are the first power supply voltage V1 and the second power supply voltage V2 respectively.

Similarly, for the case where the first power supply voltage V1 is higher than the second power supply voltage V2, and the third transistor M3 to the sixth transistor M6 are N-type transistors, the first node A and the second node B may be loaded with two different power supply voltages respectively, and the principle and processes thereof will not be described in detail in the present disclosure.

Optionally, referring to FIG. 2, the first output unit 130 may include a seventh transistor M7, an eighth transistor M8, a ninth transistor M9, and a tenth transistor M10.

The seventh transistor M7 has a control terminal connected to the first node A, a first terminal used for loading the first power supply voltage V1, and a second terminal serving as the first output terminal OUT1.

The eighth transistor M8 has a control terminal connected to the first node A, a first terminal used for loading the first power supply voltage V1, and a second terminal connected to the first output terminal OUT1.

The ninth transistor M9 has a control terminal connected to the first node A, a first terminal used for loading the second power supply voltage V2, and a second terminal connected to the first output terminal OUT1.

The tenth transistor M10 has a control terminal connected to the first node A, a first terminal used for loading the second power supply voltage V2, and a second terminal connected to the first output terminal OUT1.

The second output unit 140 includes an eleventh transistor M11, a twelfth transistor M12, a thirteenth transistor M13, and a fourteenth transistor M14.

The eleventh transistor M11 has a control terminal connected to the second node B, a first terminal used for loading the second power supply voltage V2, and a second terminal serving as the first output terminal OUT1.

The twelfth transistor M12 has a control terminal connected to the second node B, a first terminal used for loading the second power supply voltage V2, and a second terminal connected to the second output terminal OUT2.

The thirteenth transistor M13 has a control terminal connected to the second node B, a first terminal used for loading the first power supply voltage V1, and a second terminal connected to the second output terminal OUT2.

The fourteenth transistor M14 has a control terminal connected to the second node B, a first terminal used for loading the first power supply voltage V1, and a second terminal connected to the second output terminal OUT2.

Any one of the seventh transistor M7, the eighth transistor M8, the thirteenth transistor M13, and the fourteenth transistor M14 is turned on in response to one of the first power supply voltage V1 and the second power supply voltage V2 loaded on the control terminal thereof. Any one of the ninth transistor M9 to the twelfth transistor M12 is turned on in response to the other one of the first power supply voltage V1 and the second power supply voltage V2 loaded to the control terminal thereof.

In other words, the seventh transistor M7, the eighth transistor M8, the thirteenth transistor M13, and the fourteenth transistor M14 are of the same type. The ninth transistor M9 to the twelfth transistor M12 are of the same type. Types of the seventh transistor M7, the eighth transistor M8, the thirteenth transistor M13 and the fourteenth transistor M14 are different from those of the ninth transistor M9 to the twelfth transistor M12. In this way, two different power supply voltages (i.e., the first power supply voltage V1 and the second power supply voltage V2) are respectively loaded on the first node A and the second node B. Then, the first output unit 130 and the second output unit 140 output two different power supply voltages respectively (i.e., the first power supply voltage V1 and the second power supply voltage V2).

In an embodiment, the seventh transistor M7 and the eighth transistor M8 of the first output unit 130 are arranged in parallel, and the ninth transistor M9 and the tenth transistor M10 are arranged in parallel. This helps to increase the magnitude of the current output by the first output unit 130, further ensure the driving capability of the first output unit 130, and reduce the RC delay of the first output unit 130. Similarly, the eleventh transistor M11 and the twelfth transistor M12 of the second output unit 140 are arranged in parallel, and the thirteenth transistor M13 and the fourteenth transistor M14 are arranged in parallel. This helps to increase the magnitude of the current output by the second output unit 140, further ensure the driving capability of the second output unit 140, and reduce the RC delay of the second output unit 140.

Exemplarily, in an embodiment of the present disclosure, the first power supply voltage V1 may be a low-level signal, and the second power supply voltage V2 may be a high-level signal. The seventh transistor M7, the eighth transistor M8, the thirteenth transistor M13 and the fourteenth transistor M14 may be N-type transistors, and the ninth transistor M9 to the twelfth transistor M12 may be P-type transistors.

When the first node A is loaded with the first power supply voltage V1, the seventh transistor M7 and the eighth transistor M8 are turned off while the ninth transistor M9 and the tenth transistor M10 are turned on, and the first output unit 130 outputs the second power supply voltage V2 through the first output terminal OUT1. At this time, B is loaded with the second power supply voltage V2, the eleventh transistor M11 and the twelfth transistor M12 are turned off while the thirteenth transistor M13 and the fourteenth transistor M14 are turned on, and the second output unit 140 outputs the first power supply voltage V1 through the second output terminal OUT2.

Similarly, when the first node A is loaded with the second power supply voltage V2, the seventh transistor M7 and the eighth transistor M8 are turned on, while the ninth transistor M9 and the tenth transistor M10 are turned off, and the first output unit 130 outputs the first power supply voltage V1 through the first output terminal OUT1. At this time, B is loaded with the first power supply voltage V1, the eleventh transistor M11 and the twelfth transistor M12 are turned on, while the thirteenth transistor M13 and the fourteenth transistor M14 are turned off, and the second output unit 140 outputs the second power supply voltage V2 through the second output terminal OUT2.

Optionally, the first transistor M1 to the fourteenth transistor M14 may be Metal Oxide Semiconductor (MOS) transistors.

In the following, a line drive signal enhancement circuit 101 and the working process thereof are exemplarily introduced, so as to further explain and illustrate the principle, structure and effect of the line drive signal enhancement circuit 101 according to an embodiment of the present disclosure.

Referring to FIG. 2, an exemplary line drive signal enhancement circuit 101 includes a first control unit 110, a second control unit 120, a first output unit 130 and a second output unit 140.

The first control unit 110 includes a first transistor M1 and a second transistor M2. Both the first transistor M1 and the second transistor M2 are N-type transistors. The first transistor M1 has a first terminal for loading the first power supply voltage V1, a second terminal connected to the first node A, and a control terminal serving as the first control terminal IN1. The second transistor M2 has a first terminal for loading the first power supply voltage V1, a second terminal connected to the second node B, and a control terminal serving as the second control terminal IN2. The first control terminal IN1 and the second control terminal IN2 of the line drive signal enhancement circuit 101 can load two inverted initial scan signals, of which one is a high-level signal and the other is a low-level signal. The first transistor M1 and the second transistor M2 can be turned on in response to a high-level signal loaded to the respective control terminal, and turned off in response to a low-level signal loaded to the respective control terminal.

The second control unit 120 includes a third transistor M3 to a sixth transistor M6, and the third transistor M3 to the sixth transistor M6 are all P-type transistors. The third transistor M3 has a control terminal connected to the first node A, a first terminal used for loading the second power supply voltage V2, and a second terminal connected to the second node B. The fourth transistor M4 has a control terminal connected to the first node A, a first terminal for loading the second power supply voltage V2, and a second terminal connected to the second node B. The fifth transistor M5 has a control terminal connected to the second node B, a first terminal for loading the second power supply voltage V2, and a second terminal connected to the first node A. The sixth transistor M6 has a control terminal connected to the second node B, a first terminal for loading the second power supply voltage V2, and a second terminal connected to the first node A. During the operation process of the line drive signal enhancement circuit 101, one of the first node A and the second node B is loaded with the first power supply voltage V1, and the other of the first node A and the second node B is loaded with the second power supply voltage V2. The first power supply voltage V1 may be low level and the second power supply voltage V2 may be high level, so that the third transistor M3 to the sixth transistor M6 can be turned on in response to the first power supply voltage V1 loaded to the respective control terminal and turned off in response to the second power supply voltage V2 loaded to the respective control terminal.

The first output unit 130 includes a seventh transistor M7 to a tenth transistor M10. The seventh transistor M7 and the eighth transistor M8 are N-type transistors, and the ninth transistor M9 and the tenth transistor M10 are P-type transistors. The seventh transistor M7 has a control terminal connected to the first node A, a first terminal for loading the first power supply voltage V1, and a second terminal serving as the first output terminal OUT1. The eighth transistor M8 has a control terminal connected to the first node A, a first terminal for loading the first power supply voltage V1, and a second terminal connected to the first output terminal OUT1. The ninth transistor M9 has a control terminal connected to the first node A, a first terminal for loading the second power supply voltage V2, and a second terminal connected to the first output terminal OUT1. The tenth transistor M10 has a control terminal connected to the first node A, a first terminal for loading the second power supply voltage V2, and a second terminal connected to the first output terminal OUT1.

The second output unit 140 includes the eleventh transistor M11 to the fourteenth transistor M14. The eleventh transistor M11 and the twelfth transistor M12 are P-type transistors, and the thirteenth transistor M13 and the fourteenth transistor M14 are N-type transistors. The eleventh transistor M11 has a control terminal connected to the second node B, a first terminal for loading the second power supply voltage V2, and a second terminal serving as the second output terminal OUT2. The twelfth transistor M12 has a control terminal connected to the second node B, a first terminal for loading the second power supply voltage V2, and a second terminal connected to the second output terminal OUT2. The thirteenth transistor M13 has a control terminal connected to the second node B, a first terminal for loading the first power supply voltage V1, and a second terminal connected to the second output terminal OUT2. The fourteenth transistor M14 has a control terminal connected to the second node B, a first terminal used for loading the first power supply voltage V1, and a second terminal connected to the second output terminal OUT2.

In an exemplary line drive signal enhancement circuit 101, the first power supply voltage V1 is at a low level, the second power supply voltage V2 is at a high level, and the first power supply voltage V1 and the second power supply voltage V2 are two inverted initial scan signals. When the control terminal of the N-type transistor is loaded with the first power supply voltage V1, the N-type transistor is turned off. When the control terminal of the N-type transistor is loaded with the second power supply voltage V2, the N-type transistor is turned on. When the control terminal of the P-type transistor is loaded with the first power supply voltage V1, the P-type transistor is turned on. When the control terminal of the P-type transistor is loaded with the second power supply voltage V2, the P-type transistor is turned off. In this way, under the control of the two inverted initial scan signals respectively loaded on the first control terminal IN1 and the second control terminal IN2, the first output terminal OUT1 and the second output terminal OUT2 output two inverted scan signals respectively.

Referring to FIG. 3, during the T1 time period, the first control terminal IN1 is loaded with the first power supply voltage V1 while the second control terminal IN2 is loaded with the second power supply voltage V2, and the first transistor M1 is turned off while the second transistor M2 is turned on, so that the first power supply voltage V1 is loaded to B through the second transistor M2. The fifth transistor M5 and the sixth transistor M6 are turned on in response to the first power supply voltage V1 loaded on B, so that the second power supply voltage V2 is loaded to A through the fifth transistor M5 and the sixth transistor M6. The third transistor M3 and the fourth transistor M4 are turned off in response to the second power supply voltage V2 loaded on A, so that the signal loaded on B is locked to be the first power supply voltage V1. The seventh transistor M7 and the eighth transistor M8 are turned on in response to the second power supply voltage V2 loaded on A, and the ninth transistor M9 and the tenth transistor M10 are turned off in response to the second power supply voltage V2 loaded on A, so that the first power supply voltage V1 is loaded to the first output terminal OUT1 through the seventh transistor M7 and the eighth transistor M8.

That is, the first output terminal OUT1 of the line drive signal enhancement circuit 101 outputs the first power supply voltage V1. The eleventh transistor M11 and the twelfth transistor M12 are turned on in response to the first power supply voltage V1 loaded to B, and the thirteenth transistor M13 and the fourteenth transistor M14 are turned off in response to the first power supply voltage V1 loaded to B, so that the second power supply voltage V2 is loaded to the second output terminal OUT2 through the eleventh transistor M11 and the twelfth transistor M12. That is, the second output terminal OUT2 of the line drive signal enhancement circuit 101 outputs the second power supply voltage V2.

Referring to FIG. 3, during the T2 time period, the first control terminal IN1 is loaded with the second power supply voltage V2 while the second control terminal IN2 is loaded with the first power supply voltage V1, and the first transistor M1 is turned on while the second transistor M2 is turned off, so that the first power supply voltage V1 is loaded to A through the first transistor M1. The third transistor M3 and the fourth transistor M4 are turned on in response to the first power supply voltage V1 loaded on A, so that the second power supply voltage V2 is loaded to B through the third transistor M3 and the fourth transistor M4. The fifth transistor M5 and the sixth transistor M6 are turned off in response to the second power supply voltage V2 loaded on B, so that the signal loaded on A is locked to be the first power supply voltage V1. The seventh transistor M7 and the eighth transistor M8 are turned off in response to the first power supply voltage V1 loaded on A, and the ninth transistor M9 and the tenth transistor M10 are turned on in response to the first power supply voltage V1 loaded on A, so that the second power supply voltage V2 is loaded to the first output terminal OUT1 through the ninth transistor M9 and the tenth transistor M10. That is, the first output terminal OUT1 of the line drive signal enhancement circuit 101 outputs the second power supply voltage V2. The eleventh transistor M11 and the twelfth transistor M12 are turned off in response to the second power supply voltage V2 loaded to B, and the thirteenth transistor M13 and the fourteenth transistor M14 are turned on in response to the second power supply voltage V2 loaded to B, so that the first power supply voltage V1 is loaded to the second output terminal OUT2 through the thirteenth transistor M13 and the fourteenth transistor M14. That is, the second output terminal OUT2 of the line drive signal enhancement circuit 101 outputs the first power supply voltage V1.

Optionally, in some embodiments, one of the first power supply voltage V1 and the second power supply voltage V2 may be a ground voltage (GND), that is, a reference voltage of the display panel. The other of the first power supply voltage V1 and the second power supply voltage V2 may be the voltage VDD loaded to the source of the driving transistor by the pixel driving circuit during the light emission phase.

Embodiments of the present disclosure further provide a shift register unit. Referring to FIG. 4, the shift register unit includes any one of the line drive signal enhancement circuits 101 described in the above implementations of the line drive signal enhancement circuit 101, and includes a shift register 102 and an inverter 103. The shift register 102 is used for outputting the first initial scan signal to the input terminal of the inverter 103 and the first control terminal IN1 of the line drive signal enhancement circuit 101. The output terminal of the inverter 103 is connected to the second control terminal IN2 of the line drive signal enhancement circuit 101. The shift register unit can generate an initial scan signal (including inverted first initial scan signal and second initial scan signal), and then use the power supply voltage (including the first power supply voltage V1 and the second power supply voltage V2) to convert the initial scan signal into a scan signal. The scan voltage and the base voltage of the scan signal are different power supply voltages (respectively, the first power supply voltage V1 and the second power supply voltage V2), thereby improving the driving ability of the scan signal, and overcoming defects such as large delay and large voltage drop on the scan lead.

Since the shift register unit has any one of the line drive signal enhancement circuits 101 described in the above implementations of the line drive signal enhancement circuit, it has the same beneficial effects, and details are not described herein again.

Embodiments of the present disclosure further provide a display panel. The display panel includes any of the shift register units described in the above-described implementations of the shift register unit. The display panel may be an Organic Light-Emitting Diode (OLED) display panel, a liquid crystal display panel, a Micro Light-Emitting Diode (Micro LED) display panel, or other types of display panels, especially a silicon-based OLED display panel, or a silicon-based liquid crystal display panel. Since the display panel has any of the shift register units described in the above-mentioned implementations of the shift register unit, it has the same beneficial effects, and details are not described here in the present disclosure.

The present disclosure also provides a display panel, which may include a driving backplane and a display layer stacked on the driving backplane.

Figure 23:
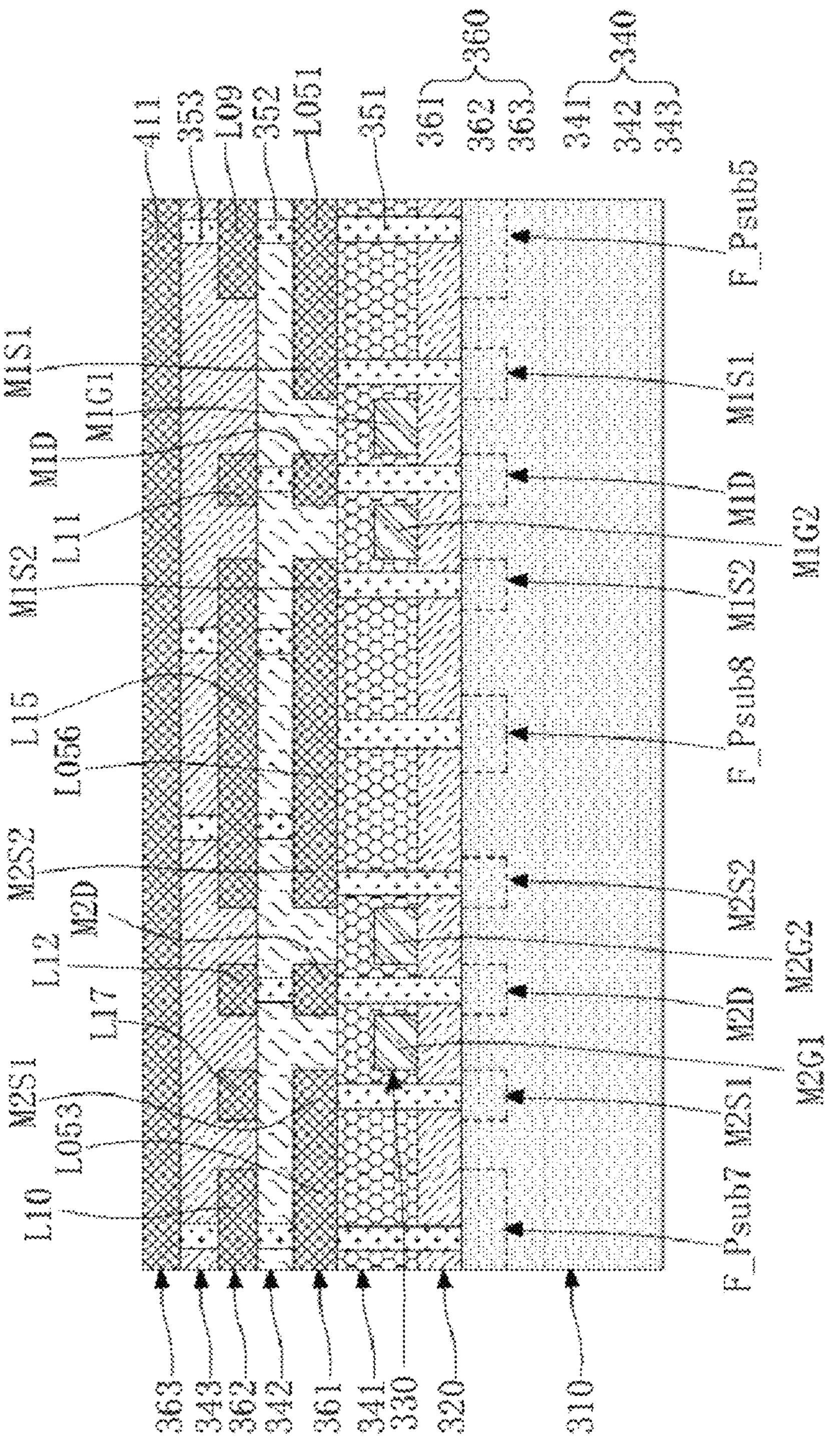
FIG. 23 is a schematic structural diagram of the driving backplane at the QQ' position of FIG. 22 according to an embodiment of the present disclosure.
Figure 24:
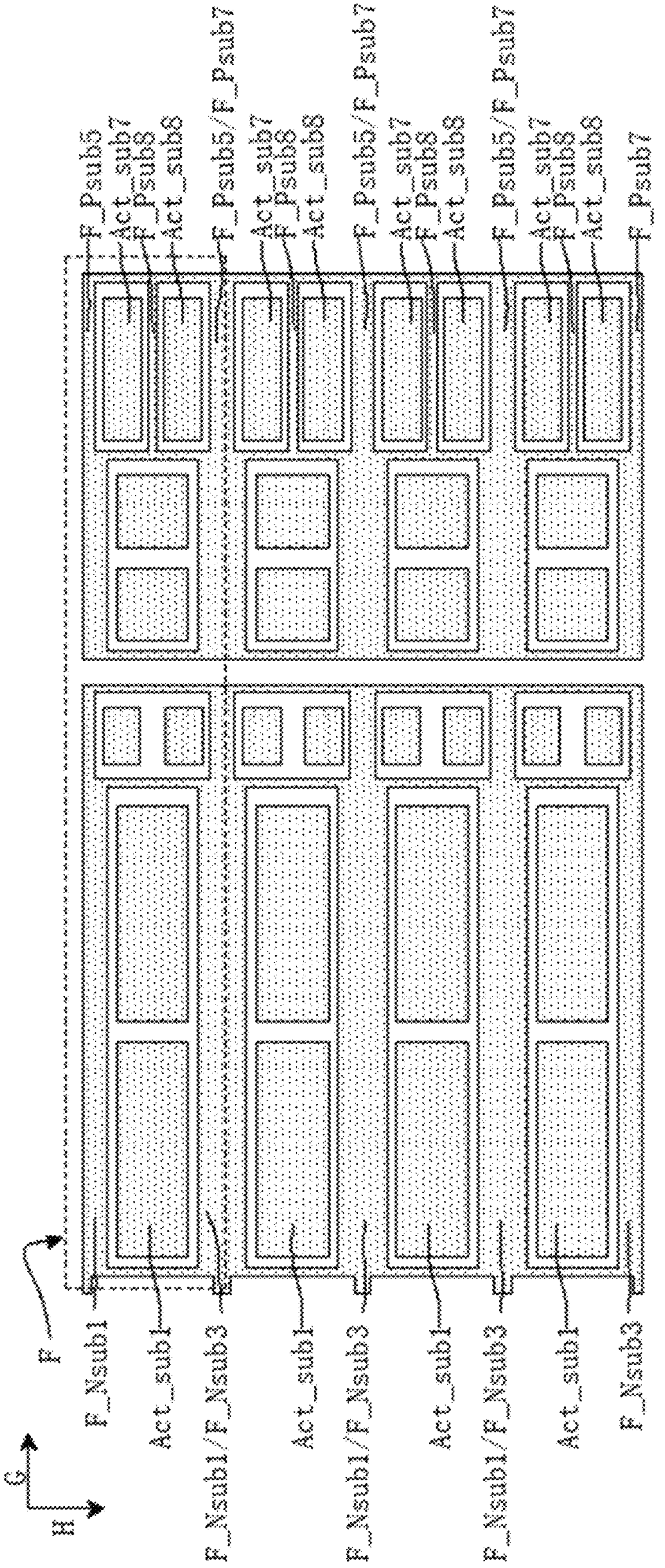
FIG. 24 is a schematic structural diagram of a plurality of line drive signal enhancement areas arranged in sequence on a semiconductor substrate according to an embodiment of the present disclosure.

Referring to FIG. 23, the driving backplane includes a semiconductor substrate 310, a gate insulation layer 320, a gate layer 330, an insulation medium layer 340 and a metal wiring layer 360 which are stacked in sequence. Referring to FIG. 4, the display panel includes a display area D and a peripheral area E located at at least one side of the display area D. Referring to FIG. 24, a plurality of line drive signal enhancement areas F are arranged in the peripheral area E. In an embodiment of the present disclosure, the peripheral area E surrounds the display area D.

Figure 5:
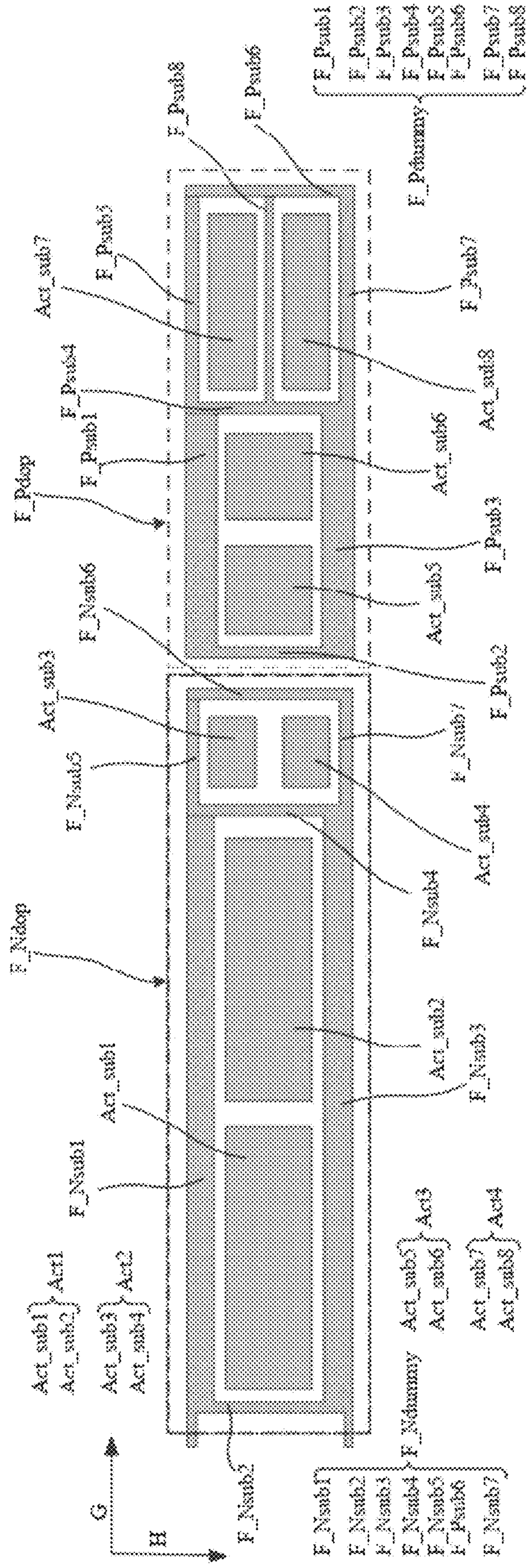
FIG. 5 is a schematic positional diagram of each active region and auxiliary doped region of the semiconductor substrate in the line drive signal enhancement area according to an embodiment of the present disclosure.

FIG. 5 is a schematic structural diagram of the semiconductor substrate 310 in the line drive signal enhancement area F. As shown in FIG. 5, only positions of the respective active regions, and positions of the N-type substrate region F_Ndop, the P-type substrate region F_Pdop etc. of the line drive signal enhancement area F are shown.

In any line drive signal enhancement area F, the display panel is provided with a line drive signal enhancement circuit 101 including a first transistor M1 to a fourteenth transistor M14. The first transistor M1 and the second transistor M2 are of the same type. The fifth transistor M5, the eighth transistor M8, the thirteenth transistor M13 and the fourteenth transistor M14 are of the same type. The ninth transistor M9 to the twelfth transistor M12 are of the same type which is opposite to the type of the fifth transistor M5. The third transistor M3 to the sixth transistor M6 are of the same type.

The semiconductor substrate 310 is formed with an active region of each transistor. The active region of each transistor includes a channel region, and a source and a drain at both sides of the channel region. The gate layer 330 is formed with the gate of each transistor. The gate insulation layer 320 isolates the gate and the channel region of each transistor. Referring to FIG. 23, the insulation medium layer 340 covers the gate layer 330.

In one line drive signal enhancement area F, the metal wiring layer 360 is provided with the connection lead, the first power supply lead 411, the second power supply lead 412, the first control lead 421, the second control lead 422, the first output lead 431 and the second output lead 432. The connection lead is electrically connected to the source, drain and gate of each transistor through the conductive pillar located in the insulation medium layer 340. The connection lead causes the gate M1G of the first transistor M1 to be electrically connected with the first control lead 421. The connection lead further causes the gate M2G of the second transistor M2 to be electrically connected with the second control lead 422. The connection lead further causes the source of the first transistor M1, the source of the second transistor M2, the source of the seventh transistor M7, the source of the eighth transistor M8, the source of the thirteenth transistor M13, and the source of the fourteenth transistor M14 to be electrically connected with the first power supply lead 411. The connection lead further causes the sources of the third transistor M3 to the sixth transistor M6, the sources of the ninth transistor M9 to the twelfth transistor M12 to be electrically connected with the second power supply lead 412. The connection lead further causes the drains of the seventh transistor M7 to the tenth transistor M10 to be electrically connected with the first output lead 431. The connection lead further causes the drains of the eleventh transistor M11 to the fourteenth transistor M14 to be electrically connected with the second output lead 432. The connection lead further causes the drain MID of the first transistor M1, the drain of the fifth transistor M5, the drain of the sixth transistor M6, the gate of the third transistor M3, the gate of the fourth transistor M4, and the gates of the seventh transistor M7 to the tenth transistor M10 to be electrically connected with each other. The connection lead further causes the drain M2D of the second transistor M2, the drain of the third transistor M3, the drain of the fourth transistor M4, the gate of the fifth transistors M5, the gate of the sixth transistor M6, and the gates of the eleventh transistor M11 to the fourteenth transistor M14 to be electrically connected with each other.

In this way, in the display panel according to an embodiment of the present disclosure, the equivalent circuit of the line drive signal enhancement circuit 101 is shown in FIG. 2. The operation process and effects of the line drive signal enhancement circuit 101 are described in detail in the above-mentioned implementations of the line drive signal enhancement circuit 101, and will not be repeated here. The display panel is provided with a line drive signal enhancement circuit 101, so that the line drive capability of the display panel can be improved, and the display uniformity of the display panel can be improved.

In the display panel provided by an embodiment of the present disclosure, the first power supply lead 411 may be loaded with the first power supply voltage V1, and the second power supply lead 412 may be loaded with the second power supply voltage V2. The first control lead 421 may be used as the first control terminal IN1 of the line drive signal enhancement circuit 101, and the second control lead 422 may be used as the second control terminal IN2 of the line drive signal enhancement circuit 101. The first output lead 431 may be used as the first output terminal OUT1 of the line drive signal enhancement circuit 101, and the second output lead 432 may be used as the second output terminal OUT2 of the line drive signal enhancement circuit 101.

In an embodiment of the present disclosure, the first transistor M1, the second transistor M2, the seventh transistor M7, the eighth transistor M8, the thirteenth transistor M13, and the fourteenth transistor M14 are N-type transistors. The third transistor M3, the fourth transistor M4, the fifth transistor M5, the sixth transistor M6, the ninth transistor M9, the tenth transistor M10, the eleventh transistor M11, and the twelfth transistor M12 are P-type transistors. In this way, each transistor may be formed by a Complementary Metal Oxide Semiconductor (CMOS) process, without introducing any additional process to increase cost of the display panel.

Optionally, the semiconductor substrate 310 may be a silicon-based semiconductor substrate, especially a single crystal silicon semiconductor substrate 310.

Optionally, referring to FIG. 5, each line drive signal enhancement area F includes a P-type substrate region F_Pdop and an N-type substrate region F_Ndop. The P-type substrate region F_Pdop is located at a side in the first direction G of the N-type substrate region F_Ndop. The first direction G is a direction away from the display area D. The N-type transistor is formed in the P-type substrate region F_Pdop, and the P-type transistor is formed in the N-type substrate region F_Ndop.

In some embodiments, referring to FIG. 5, the N-type substrate region F_Ndop includes an N-type auxiliary doped region F_Ndummy, and further includes a first active region Act1 and a second active region Act2 surrounded by the N-type auxiliary doped region F_Ndummy, respectively. The second active region Act2 is located at a side in the first direction G of the first active region Act1.

The first active region Act1 includes a first sub-active region Act_sub1 and a second sub-active region Act_sub2 arranged in sequence along the first direction G. The ninth transistor M9 and the eleventh transistor M11 are located in the first sub-active region Act_sub1. The tenth transistor M10 and the twelfth transistor M12 are located in the second sub-active region Act_sub2.

The second active region Act2 includes a third sub-active region Act_sub3 and a fourth sub-active region Act_sub4 arranged in sequence along the second direction H. The second direction H is perpendicular to the first direction G and parallel to the plane where the semiconductor substrate 310 is located. The fifth transistor M5 and the sixth transistor M6 are located in the third sub-active region Act_sub3, and the third transistor M3 and the fourth transistor M4 are located in the fourth sub-active region Act_sub4.

In this way, the arrangement of transistors helps to improve the compactness of the arrangement of transistors, reduce the area ratio of the line drive signal enhancement circuit 101 and the length of the connection lead, and reduce the power consumption of the line drive signal enhancement circuit 101. Furthermore, the N-type auxiliary doped region F_Ndummy helps to reduce the leakage of each transistor, and further reduce the power consumption of the line drive signal enhancement circuit 101.

In an embodiment of the present disclosure, referring to FIG. 5, the N-type auxiliary doped region F_Ndummy may include a first N-type doped sub-region F_Nsub1 to a seventh N-type doped sub-region F_Nsub7. The first N-type doped sub-region F_Nsub1, the third N-type doped sub-region F_Nsub3, the fifth N-type doped sub-region F_Nsub5 and the seventh N-type doped sub-region F_Nsub7 extend along the first direction G. The second N-type doped sub-region F_Nsub2, the fourth N-type doped sub-region F_Nsub4 and the sixth N-type doped sub-region F_Nsub6 extend along the second direction H. The first N-type doped sub-region F_Nsub1, the second N-type doped sub-region F_Nsub2, the third N-type doped sub-region F_Nsub3, and the fourth N-type doped sub-region F_Nsub4 are connected in sequence to form a closed ring. The first active region Act1 is located in a space surrounded by the first N-type doped sub-region F_Nsub1, the second N-type doped sub-region F_Nsub2, the third N-type doped sub-region F_Nsub3, and the fourth N-type doped sub-region F_Nsub4. The fourth N-type doped sub-region F_Nsub4, the fifth N-type doped sub-region F_Nsub5, the sixth N-type doped sub-region F_Nsub6, and the seventh N-type doped sub-region F_Nsub7 are connected in sequence to form a closed ring. The second active region Act2 is located in a space surrounded by the fourth N-type doped sub-region F_Nsub4, the fifth N-type doped sub-region F_Nsub5, the sixth N-type doped sub-region F_Nsub6 and the seventh N-type doped sub-region F_Nsub7. The fifth N-type doped sub-region F_Nsub5 is located at a side in the first direction G of the first N-type doped sub-region F_Nsub1, and is located on the extension line along the first direction G of the first N-type doped sub-region F_Nsub1. The seventh N-type doped sub-region F_Nsub7 is located at a side in the first direction G of the third N-type doped sub-region F_Nsub3, and is located on the extension line along the first direction G of the third N-type doped sub-region F_Nsub3. The second N-type doped sub-region F_Nsub2, the fourth N-type doped sub-region F_Nsub4 and the sixth N-type doped sub-region F_Nsub6 are sequentially arranged along the first direction G.

Optionally, referring to FIG. 5, the size in the second direction H of the fifth N-type doped sub-region F_Nsub5 is smaller than the size in the second direction H of the first N-type doped sub-region F_Nsub1, and the size in the second direction H of the seventh N-type doped sub-region F_Nsub7 is smaller than the size in the second direction H of the third N-type doped sub-region F_Nsub3. In this way, the size in the second direction H of the second active region Act2 can be increased, so that the third sub-active region Act_sub3 and the fourth sub-active region Act_sub4 arranged along the second direction H can be provided in the second active region Act2 easily.

Optionally, the size in the first direction G of the first sub-active region Act_sub1 is the same as the size in the first direction G of the second sub-active region Act_sub2. The size in the second direction H of the first sub-active region Act_sub1 is the same as the size in the second direction H of the second sub-active region Act_sub2. This is convenient to make the ninth transistor M9 and the tenth transistor M10 having the same size, and further convenient to make the eleventh transistor M11 and the twelfth transistor M12 having the same size.

Optionally, the size in the first direction G of the third sub-active region Act_sub3 is the same as the size in the first direction G of the fourth sub-active region Act_sub4. The size in the second direction H of the third sub-active region Act_sub3 is the same as the size in the second direction H of the fourth sub-active sub-region Act_sub4. This is convenient to make the sizes of the third transistor M3 to the sixth transistor M6 to be the same.

In an embodiment of the present disclosure, along the first direction G, the size of the first sub-active region Act_sub1 is 3 to 5 times the size of the third sub-active region Act_sub3, and the size of the second sub-active region Act_sub2 is 3 to 5 times the size of the third sub-active region Act_sub3. In this way, the channel regions of the ninth transistor M9 to the twelfth transistor M12 can have larger widths, the current output capability of the ninth transistor M9 to the twelfth transistor M12 can be improved, and the driving capability of the line drive signal enhancement circuit 101 can be improved. Accordingly, the third transistor M3 to the sixth transistor M6 may have smaller sizes, especially smaller channel regions. This helps to improve the turn-on speed or turn-off speed of the third transistor M3 to the sixth transistor M6, reduce the signal delay caused by the third transistor M3 to the sixth transistor M6, and further reduces the signal delay of the line drive signal enhancement circuit 101.

In some embodiments, referring to FIG. 5, the P-type substrate region F_Pdop includes a P-type auxiliary doped region F_Pdummy, a third active region Act3 and a fourth active region Act4. The fourth active region Act4 is located at a side in the first direction G of the third active region Act3. The third active region Act3 is surrounded by the P-type auxiliary doped region F_Pdummy, and includes a fifth sub-active region Act_sub5 and a sixth sub-active region Act_sub6 arranged in sequence along the first direction G. The seventh transistors M7 and the thirteenth transistor M13 are located in the fifth sub-active region Act_sub5. The eighth transistor M8 and the fourteenth transistor M14 are located in the sixth sub-active region Act_sub6. The fourth active region Act4 includes a seventh sub-active region Act_sub7 and an eighth sub-active region Act_sub8 which are arranged in sequence along the second direction H and are respectively surrounded by the P-type auxiliary doped region F_Pdummy. The first transistor M1 is located in the seventh sub-active region Act_sub7, and the second transistor M2 is located in the eighth sub-active region Act_sub8.

In this way, the arrangement of transistors helps to improve the compactness of the arrangement of transistors, reduce the area ratio of the line drive signal enhancement circuit 101 and the length of the connection lead, and reduce the power consumption of the line drive signal enhancement circuit 101. Furthermore, the P-type auxiliary doped region F_Pdummy helps to reduce the leakage of each transistor, and further reduce the power consumption of the line drive signal enhancement circuit 101.

In one embodiment of the present disclosure, the P-type auxiliary doped region F_Pdummy may include a first P-type doped sub-region F_Psub1 to an eighth P-type doped sub-region F_Psub8. The first P-type doped sub-region F_Psub1, the third P-type doped sub-region F_Psub3, the fifth P-type doped sub-region F_Psub5, the seventh P-type doped sub-region F_Psub7 and the eighth P-type doped sub-region F_Psub8 extend along the first direction G. The second P-type doped sub-region F_Psub2, the fourth P-type doped sub-region F_Psub4 and the sixth P-type doped sub-region F_Psub6 extend along the second direction H. Referring to FIG. 5, the first P-type doped sub-region F_Psub1, the second P-type doped sub-region F_Psub2, the third P-type doped sub-region F_Psub3 and the fourth P-type doped sub-region F_Psub4 are connected in sequence to form a closed ring. The third active region Act3 is located in a space surrounded by the first P-type doped sub-region F_Psub1, the second P-type doped sub-region F_Psub2, the third P-type doped sub-region F_Psub3 and the fourth P-type doped sub-region F_Psub4. The fifth P-type doped sub-region F_Psub5, the sixth P-type doped sub-region F_Psub6, the seventh P-type doped sub-region F_Psub7 and the fourth P-type doped sub-region F_Psub4 are connected in sequence to form a closed ring. The fourth active region Act4 is located in a space surrounded by the fifth P-type doped sub-region F_Psub5, the sixth P-type doped sub-region F_Psub6, the seventh P-type doped sub-region F_Psub7 and the fourth P-type doped sub-region F_Psub4. Two ends of the eighth P-type doped sub-region F_Psub8 are respectively connected to the fourth P-type doped sub-region F_Psub4 and the sixth P-type doped sub-region F_Psub6. The seventh sub-active region Act_sub7 is located in a space surrounded by the fifth P-type doped sub-region F_Psub5, the sixth P-type doped sub-region F_Psub6, the eighth P-type doped sub-region F_Psub8 and the fourth P-type doped sub-region F_Psub4. The eighth sub-active region Act_sub8 is located in a space surrounded by the eighth P-type doped sub-region F_Psub8, the sixth P-type doped sub-region F_Psub6, the seventh P-type doped sub-region F_Psub7 and the fourth P-type doped sub-region F_Psub4.

The fifth P-type doped sub-region F_Psub5 is located at a side in the first direction G of the first P-type doped sub-region F_Psub1, and is located on the extension line along the first direction G of the first P-type doped sub-region F_Psub1. The seventh P-type doped sub-region F_Psub7 is located at a side in the first direction G of the third P-type doped sub-region F_Psub3, and is located on the extension line along the first direction G of the third P-type doped sub-region F_Psub3. The second P-type doped sub-region F_Psub2, the fourth P-type doped sub-region F_Psub4 and the sixth P-type doped sub-region F_Psub6 are arranged in sequence along the first direction G. The fifth P-type doped sub-region F_Psub5, the eighth P-type doped sub-region F_Psub5, the eighth P-type doped sub-region F_Psub8, and the seventh P-type doped sub-region F_Psub7 are sequentially arranged along the second direction H.

Optionally, referring to FIG. 5, the size in the second direction H of the fifth P-type doped sub-region F_Psub5 is smaller than the size in the second direction H of the first P-type doped sub-region F_Psub1, and the size in the second direction H of the seventh P-type doped sub-region F_Psub7 is smaller than the size in the second direction H of the third P-type doped sub-region F_Psub3. In this way, the size in the second direction H of the fourth active region Act4 can be increased, thereby providing more space for setting the seventh sub-active region Act_sub7 and the eighth sub-active region Act_sub8, and also for setting the eighth P-type doped sub-region F_Psub8.

Optionally, the size in the first direction G of the fifth sub-active region Act_sub5 is the same as the size in the first direction G of the sixth sub-active region Act_sub6. The size in the second direction H of the sixth sub-active region Act_sub6 is the same as the size in the second direction H of the fifth sub-active region Act_sub5. This is convenient to make the sizes of the seventh transistor M7 and the eighth transistor M8 to be the same, and convenient to make the sizes of the thirteenth transistor M13 and the fourteenth transistor M14 to be the same.

Optionally, the size in the first direction G of the seventh sub-active region Act_sub7 is the same as the size in the first direction G of the eighth sub-active region Act_sub8. The size in the second direction H of the seventh sub-active region Act_sub7 is the same as the size in the second direction H of the eighth sub-active region Act_sub8. This facilitates the first transistor M1 and the second transistor M2 having the same size.

In an embodiment of the present disclosure, along the first direction G, the size of the seventh sub-active region Act_sub7 is 1.5 to 2.5 times the size of the fifth sub-active region Act_sub5; the size of the seventh sub-active region Act_sub7 is the same as the size of the eighth sub-active region Act_sub8; and the size of the fifth sub-active region Act_sub5 is the same as the size of the sixth sub-active region Act_sub6.

Figure 6:
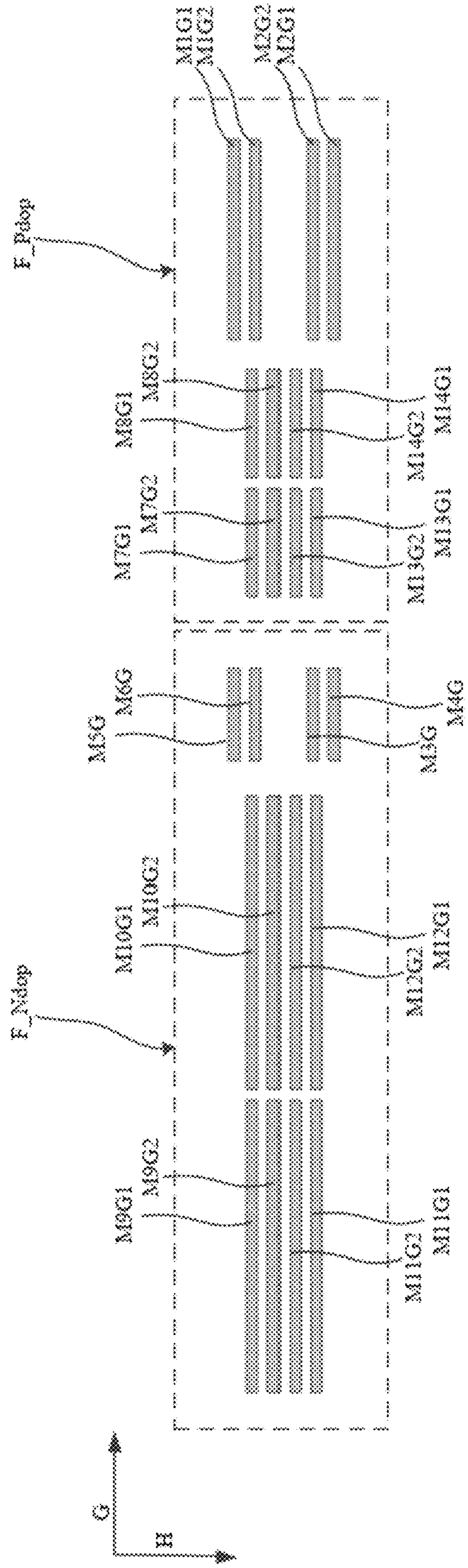
FIG. 6 is a schematic structural diagram of a gate layer in a line drive signal enhancement area according to an embodiment of the present disclosure.
Figure 11:
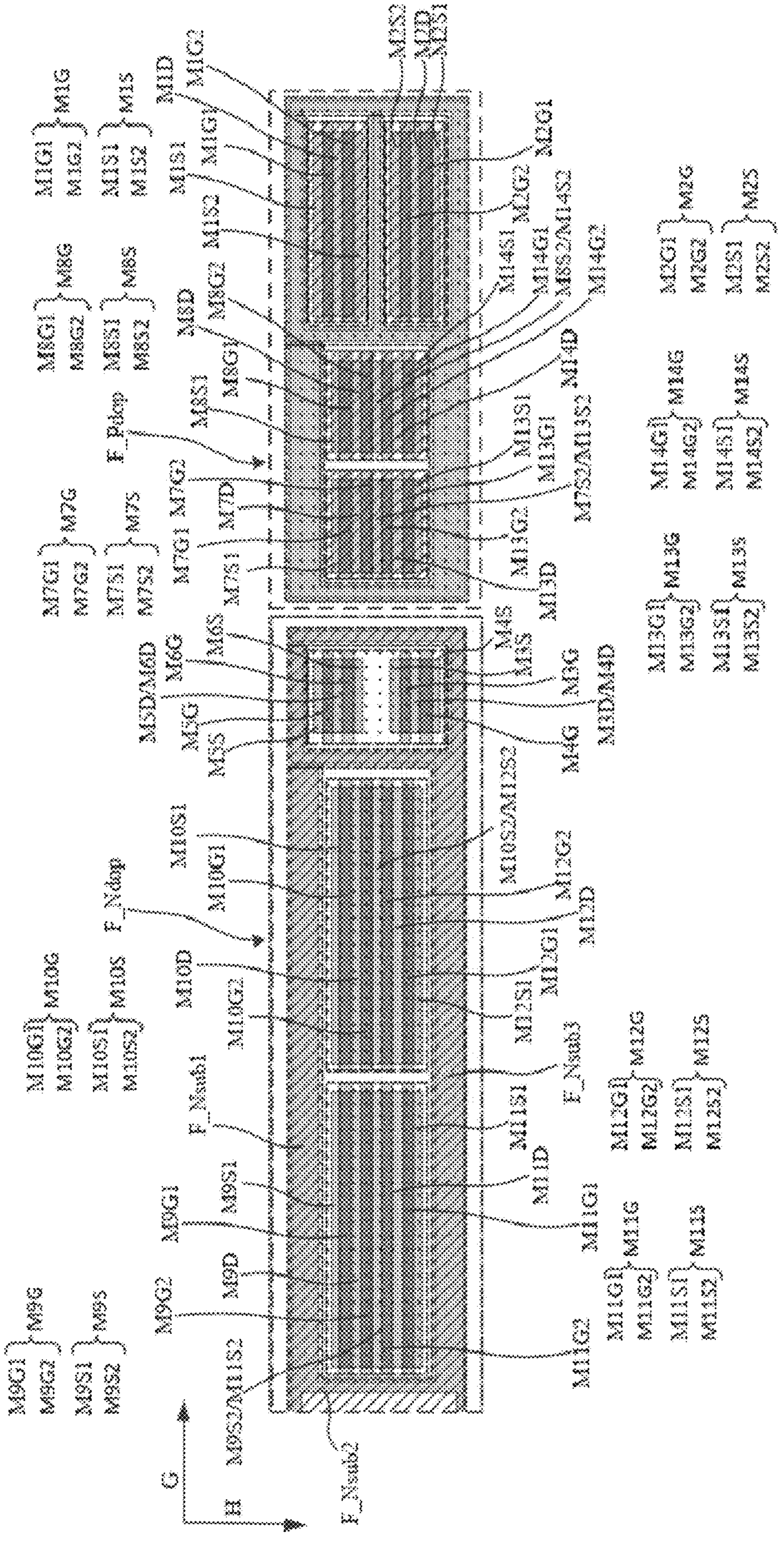
FIG. 11 is a schematic structural diagram of the P-type doped region, the N-type doped region, the gate layer and each active region in the line drive signal enhancement area according to an embodiment of the present disclosure.

Referring to FIGS. 6, 11, and 23, the gate layer 330 is formed with the gates of the first to fourteenth transistors M1 to M14, and the gate insulation layer 320 isolates the gate and the channel region of any one of the transistors. Optionally, the gates of the respective transistors extend along the first direction G.

In one embodiment of the present disclosure, each transistor may be fabricated using a CMOS process. Exemplarily, each transistor of the line drive signal enhancement circuit 101 may be formed in the line drive signal enhancement area F by the following method.

Referring to FIG. 5 and FIG. 23, a P-type semiconductor substrate 310 may be provided first, and the P-type semiconductor substrate 310 has a first region and a second region in the line drive signal enhancement area F. The first region may be used as a P-type substrate region F_Pdop, which has a P well. N-type ions may be implanted in the second region to form an N-well in the second region, serving as an N-type substrate region F_Ndop.

Then, referring to FIGS. 6 and 23, a gate insulation layer 320 (not shown in the drawings) and a gate layer 330 may be formed, such that the gate insulation layer 320 and the gate layer 330 cover the channel regions of the respective transistors and expose the source and the drain of each transistor. The material of the gate insulation layer 320 may be inorganic insulation materials such as silicon oxide, silicon nitride, and silicon oxynitride. The material of the gate layer 330 may be polysilicon.

Figure 7:
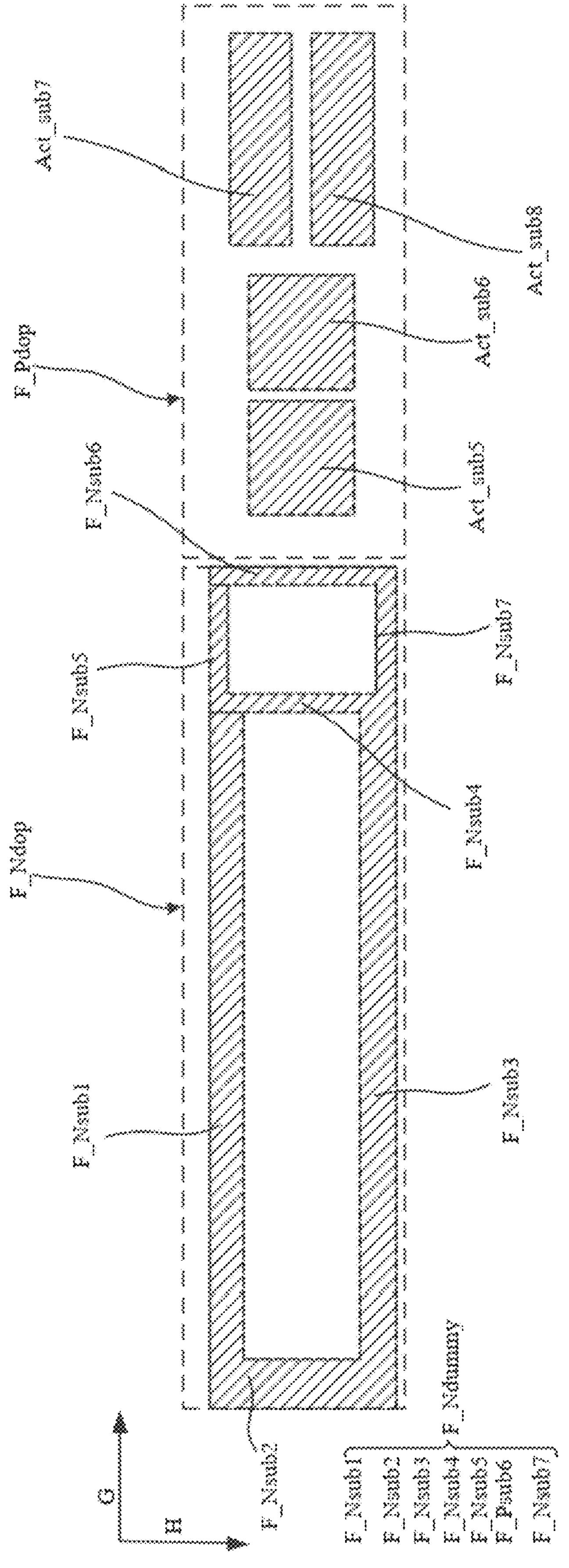
FIG. 7 is a schematic structural diagram of N-type doping on the semiconductor substrate in a line drive signal enhancement area according to an embodiment of the present disclosure, where the shaded area filled with lines is an N-type doped region.
Figure 8:
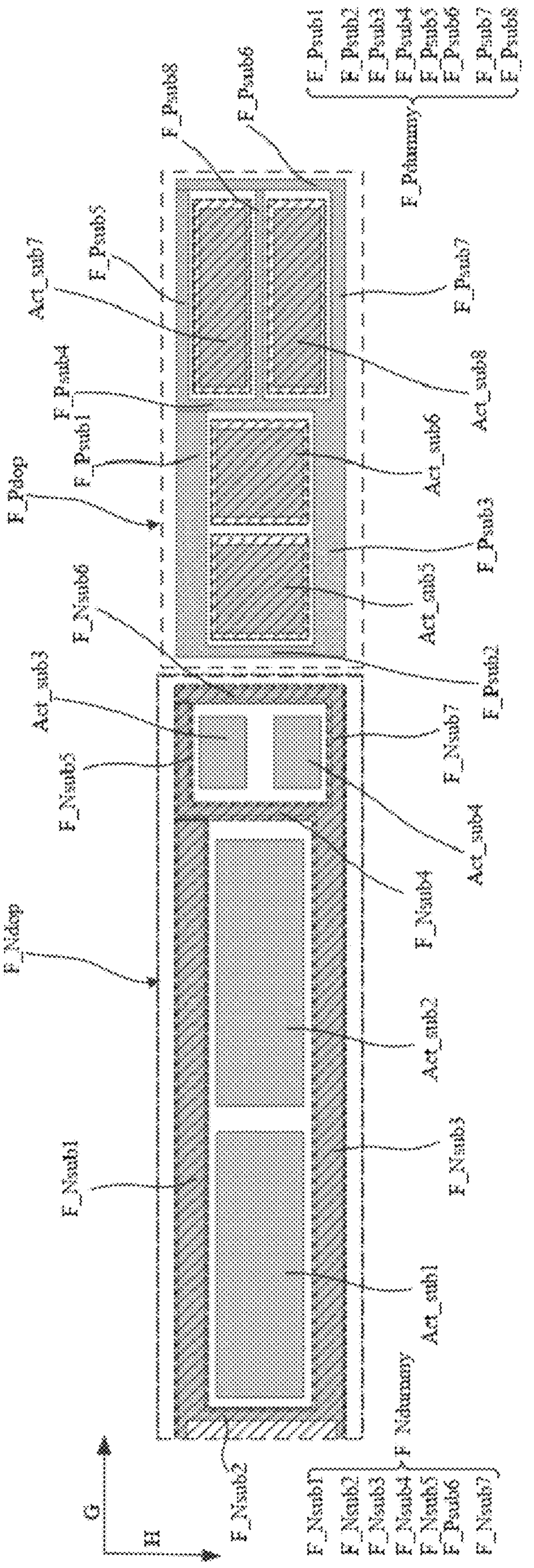
FIG. 8 is a schematic positional diagram of the N-type doped region and each active region in the line drive signal enhancement area according to an embodiment of the present disclosure.

Referring to FIGS. 7, 8 and 11, N-type ion implantation may be performed on each active region of the P-type substrate region F_Pdop and the N-type auxiliary doped region F_Ndummy of the N-type substrate region F_Ndop. In this way, the source and drain of each transistor located in the P-type substrate region F_Pdop are transformed into N-type doped, and then each N-type transistor is formed in the P-type substrate region F_Pdop. When the doping concentration of the N-type auxiliary doped region F_Ndummy increases, a better anti-leakage effect is provided.

Figure 9:
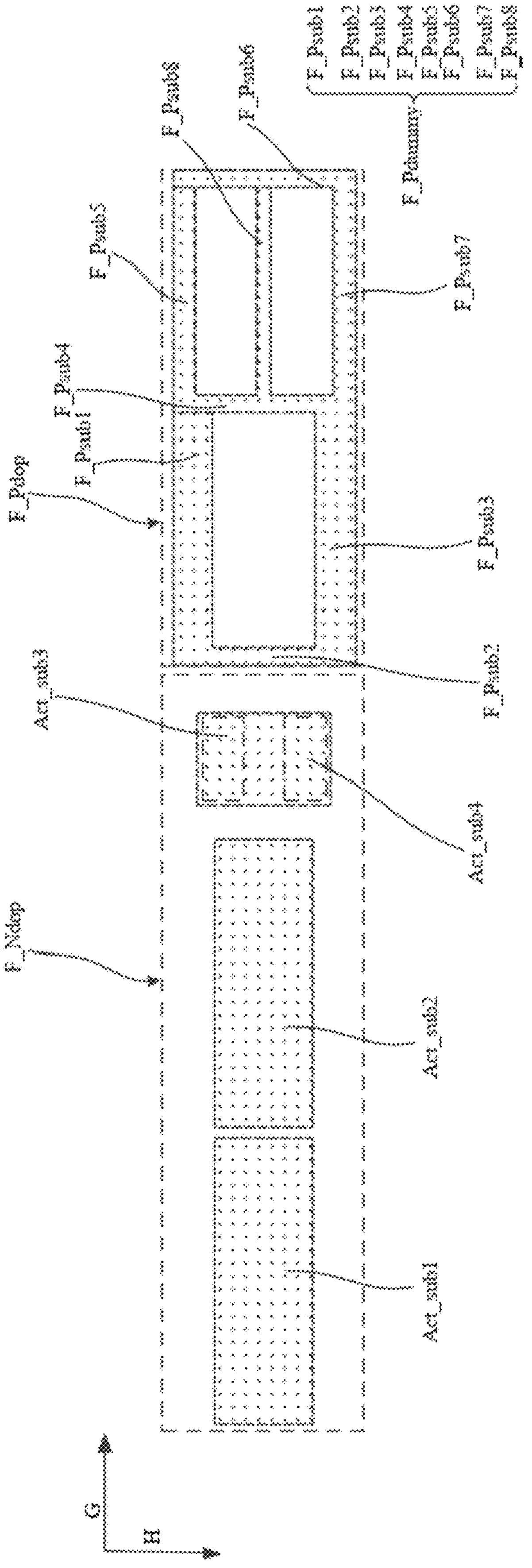
FIG. 9 is a schematic structural diagram of P-type doping on the semiconductor substrate in a line drive signal enhancement area according to an embodiment of the present disclosure, where the shaded area filled with dots is a P-type doped region.
Figure 10:
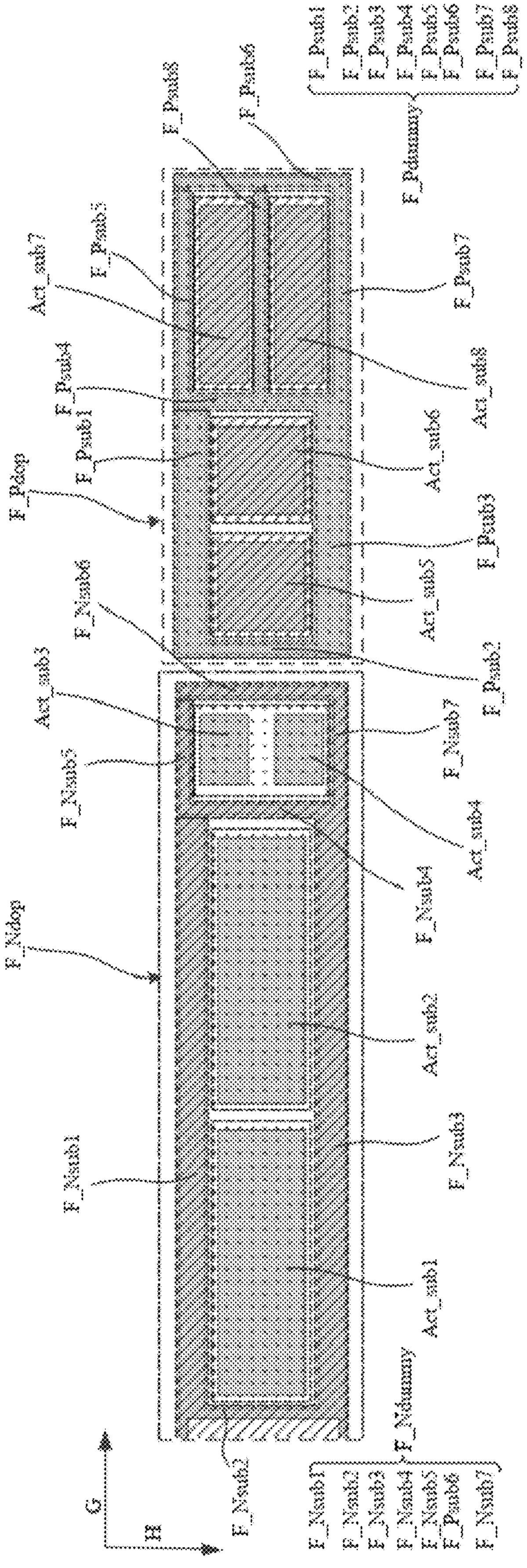
FIG. 10 is a schematic positional diagram of the P-type doped region, the N-type doped region and each active region in the line drive signal enhancement area according to an embodiment of the present disclosure.

Referring to the dot-filled part in FIGS. 9, 10 and 11, P-type ion implantation may be performed on each active region of the N-type substrate region F_Ndop and the P-type auxiliary doped region F_Pdummy of the P-type substrate region F_Pdop. In this way, the source and drain of each transistor located in the N-type substrate region F_Ndop are transformed into P-type doped, and then each P-type transistor is formed in the N-type substrate region F_Ndop. When the doping concentration of the P-type auxiliary doped region F_Pdummy increases, a better anti-leakage effect is provided.

According to the above-mentioned preparation method, the portion of each active region that overlaps with the gate may be used as the channel region of each transistor. In the process of N-type ion implantation or P-type ion implantation, the gate helps to block the implantation of ions into the active region, thereby maintaining the semiconductor characteristics.

In one embodiment of the present disclosure, referring to FIG. 11, the gate M1G of the first transistor M1 includes a first gate MIG1 and a second gate MIG2. The first gate MIG1 of the first transistor M1 and the second gates MIG2 of the first transistor M1 extend along the first direction G and are sequentially arranged in the second direction H, and the lengths of the two are the same. The portion of the seventh sub-active region Act_sub7 overlapping with the first gate MIG1 of the first transistor M1 and the second gate MIG2 of the first transistor M1 serves as a channel region of the first transistor M1. In other words, the channel region of the first transistor M1 has a first channel region and a second channel region arranged in parallel with each other. The first channel region of the first transistor M1 overlaps with the first gate MIG1 of the first transistor M1. The second channel region of the first transistor M1 overlaps with the second gate MIG2 of the first transistor M1. The drain MID of the first transistor M1 is located between the first channel region of the first transistor M1 and the second channel region of the first transistor M1. The source MIS of the first transistor M1 is located at a side of the first channel of the first transistor M1 away from the second channel region of the first transistor M1, and further located at a side of the second channel region of the first transistor M1 away from the first channel region of the first transistor M1. In other words, the source MIS of the first transistor M1 includes a first source MIS1 and a second source MIS2 arranged in parallel with each other. The first source MIS1 of the first transistor M1 is located at a side of the first channel region of the first transistor M1 away from the second channel region of the first transistor M1. The second source MIS2 of the first transistor M1 is located at a side of the second channel region of the first transistor M1 away from the first channel region of the first transistor M1. In this way, the first source MIS1 of the first transistor M1, the first channel region of the first transistor M1, the drain MID of the first transistor M1, the second channel region of the first transistor M1 and the second source MIS2 of the first transistor M1 extend along the first direction G and are arranged in sequence in the second direction H.

In an embodiment of the present disclosure, referring to FIG. 11, the gate M2G of the second transistor M2 includes a first gate M2G1 and a second gate M2G2. The second gate M2G2 of the second transistor M2 and the first gates M2G1 of the second transistor M2 extend along the first direction G and are sequentially arranged in the second direction H, and the lengths of the two are the same. The portion of the eighth sub-active region Act_sub8 overlapping with the first gate M2G1 of the second transistor M2 and the second gate M2G2 of the second transistor M2 serves as a channel region of the second transistor M2. In other words, the channel region of the second transistor M2 has a first channel region and a second channel region arranged in parallel with each other. The first channel region of the second transistor M2 overlaps with the first gate M2G1 of the second transistor M2. The second channel region of the second transistor M2 overlaps with the second gate M2G2 of the second transistor M2. The drain M2D of the second transistor M2 is located between the first channel region of the second transistor M2 and the second channel region of the second transistor M2. The source M2S of the second transistor M2 is located at a side of the first channel region of the second transistor M2 away from the second channel region of the second transistor M2, and further located at a side of the second channel region of the second transistor M2 away from the first channel region of the second transistor M2. In other words, the source M2S of the second transistor M2 includes a first source M2S1 and a second source M2S2 arranged in parallel with each other. The first source M2S1 of the second transistor M2 is located at a side of the first channel region of the second transistor M2 away from the second channel region of the second transistor M2. The second source M2S2 of the second transistor M2 is located at a side of the second channel region of the second transistor M2 away from the first channel region of the second transistor M2. In this way, the second source M2S2 of the second transistor M2, the second channel region of the second transistor M2, the drain M2D of the second transistor M2, the first channel region of the second transistor M2, and the first source M2S1 of the second transistor M2 extend along the first direction G, and are arranged in sequence in the second direction H.

In an embodiment of the present disclosure, the first source MIS1 of the first transistor M1, the first gate MIG1 of the first transistor M1, the drain MID of the first transistor M1, the second gate MIG2 of the first transistor M1, the second source MIS2 of the first transistor M1, the second source M2S2 of the second transistor M2, the second gate M2G2 of the second transistor M2, the drain M2D of the second transistor M2, the first gate M2G1 of the second transistor M2, and the first source M2S1 of the second transistor M2 are sequentially arranged along the second direction H. In this way, the second transistor M2 is located at a side in the second direction H of the first transistor M1.

In one embodiment of the present disclosure, referring to FIG. 11, the gate M5G of the fifth transistor M5, the gate M6G of the sixth transistor M6, the gate M3G of the third transistor M3, and the gate M4G of the fourth transistor M4 extend along the first direction G and are sequentially arranged along the second direction H. The gate M5G of the fifth transistor M5 and the gate M6G of the sixth transistor M6 overlap with the third sub-active region Act_sub3. The gate M3G of the third transistor M3 and the gate M4G of the fourth transistor M4 overlap with the fourth sub-active region Act_sub4. In this way, the fifth transistor M5, the sixth transistor M6, the third transistor M3 and the fourth transistor M4 are sequentially arranged along the second direction H.

The portion of the fourth sub-active region Act_sub4 that overlaps with the gate M3G of the third transistor M3 serves as a channel region of the third transistor M3. The source M3S of the third transistor M3 is located at a side in a direction opposite to the second direction H of the channel region of the third transistor M3. The drain M3D of the third transistor M3 is located at a side in the second direction H of the channel region of the third transistor M3. In other words, the source M3S of the third transistor M3, the channel region of the third transistor M3 and the drain M3D of the third transistor M3 all extend along the first direction G, and are sequentially arranged along the second direction H.

The portion of the fourth sub-active region Act_sub4 overlapping with the gate M4G of the fourth transistor M4 serves as a channel region of the fourth transistor M4. The source M4S of the fourth transistor M4 is located at a side in the second direction H of the channel region of the third transistor M4. The drain M4D of the fourth transistor M4 is located at a side in a direction opposite to the second direction H of the channel region of the fourth transistor M4. In other words, the drain M4D of the fourth transistor M4, the channel region of the fourth transistor M4 and the source M4S of the fourth transistor M4 all extend along the first direction G and are sequentially arranged along the second direction H.

The portion of the third sub-active region Act_sub3 overlapping with the gate M5G of the fifth transistor M5 serves as a channel region of the fifth transistor M5. The source M5S of the fifth transistor M5 is located at a side in a direction opposite to the second direction H of the channel region of the fifth transistor M5. The drain M5D of the fifth transistor M5 is located at a side in the second direction H of the channel region of the fifth transistor M5. In other words, the source M5S of the fifth transistor M5, the channel region of the fifth transistor M5 and the drain M5D of the fifth transistor M5 all extend along the first direction G, and are sequentially arranged along the second direction H.

The portion of the third sub-active region Act_sub3 overlapping with the gate M6G of the sixth transistor M6 serves as a channel region of the sixth transistor M6. The source M6S of the sixth transistor M6 is located at a side in the second direction H of the channel region of the sixth transistor M6. The drain M6D of the sixth transistor M6 is located at a side in a direction opposite to the second direction H of the channel region of the sixth transistor M6. In other words, the drain M6D of the sixth transistor M6, the channel region of the sixth transistor M6 and the source M6S of the sixth transistor M6 all extend along the first direction G and are sequentially arranged along the second direction H.

Optionally, the drain M3D of the third transistor M3 and the drain M4D of the fourth transistor M4 coincide with each other. In this way, the third transistor M3 and the fourth transistor M4 can share a drain, thereby simplifying the wiring arrangement of the line drive signal enhancement circuit 101, improving the compactness of the line drive signal enhancement circuit 101, and reducing the area occupied by the line drive signal enhancement circuit 101.

Optionally, the drain M5D of the fifth transistor M5 and the drain M6D of the sixth transistor M6 coincide with each other. In this way, the fifth transistor M5 and the sixth transistor M6 can share a drain, thereby simplifying the wiring arrangement of the line drive signal enhancement circuit 101, improving the compactness of the line drive signal enhancement circuit 101, and reducing the area occupied by the line drive signal enhancement circuit 101.

In one embodiment of the present disclosure, referring to FIG. 11, the gate M7G of the seventh transistor M7 includes a first gate M7G1 and a second gate M7G2. The first gate M7G1 of the seventh transistor M7 and the second gate M7G2 of the seventh transistor M7 extend along the first direction G and are arranged in sequence along the second direction H, and both have the same length. The portion of the fifth sub-active region Act_sub5 overlapping with the first gate M7G1 of the seventh transistor M7 and the second gate M7G2 of the seventh transistor M7 serves as a channel region of the seventh transistor M7. In other words, the channel region of the seventh transistor M7 has a first channel region and a second channel region arranged in parallel with each other. The first channel region of the seventh transistor M7 overlaps with the first gate M7G1 of the seventh transistor M7. The second channel region of the seventh transistor M7 overlaps with the second gate M7G2 of the seventh transistor M7. The drain M7D of the seventh transistor M7 is located between the first channel region of the seventh transistor M7 and the second channel region of the seventh transistor M7. The source M7S of the seventh transistor is located at a side of the first channel region of the seventh transistor M7 away from the second channel region of the seventh transistor M7, and further located at a side of the second channel region of the seventh transistor M7 away from the first channel region of the seventh transistor M7. In other words, the source M7S of the seventh transistor includes a first source M7S1 and a second source M7S2 arranged in parallel with each other. The first source M7S1 of the seventh transistor M7 is located at a side of the first channel region of the seventh transistor M7 away from the second channel region of the seventh transistor M7. The second source M7S2 of the seventh transistor M7 is located at a side of the second channel region of the seventh transistor M7 away from the first channel region of the seventh transistor M7. In this way, the first source M7S1 of the seventh transistor M7, the first channel region of the seventh transistor M7, the drain M7D of the seventh transistor M7, the second channel region of the seventh transistor M7 and the second source M7S2 of the seventh transistor M7 extend along the first direction G, and are arranged in sequence along the second direction H.

In one embodiment of the present disclosure, referring to FIG. 11, the gate M8G of the eighth transistor M8 includes a first gate M8G1 and a second gate M8G2. The first gate M8G1 of the eighth transistor M8 and the second gate M8G2 of the eighth transistor M8 extend along the first direction G and are arranged in sequence along the second direction H, and both have the same length. The portion of the sixth sub-active region Act_sub6 overlapping with the first gate M8G1 of the eighth transistor M8 and the second gate M8G2 of the eighth transistor M8 serves as a channel region of the eighth transistor M8. In other words, the channel region of the eighth transistor M8 has a first channel region and a second channel region arranged in parallel with each other. The first channel region of the eighth transistor M8 overlaps with the first gate M8G1 of the eighth transistor M8. The second channel region of the eighth transistor M8 overlaps with the second gate M8G2 of the eighth transistor M8. The drain M8D of the eighth transistor M8 is located between the first channel region of the eighth transistor M8 and the second channel region of the eighth transistor M8. The source M8S of the eighth transistor is located at a side of the first channel region of the eighth transistor M8 away from the second channel region of the eighth transistor M8, and further located at a side of the second channel region of the eighth transistor M8 away from the first channel region of the eighth transistor M8. In other words, the source M8S of the eighth transistor includes a first source M8S1 and a second source M8S2 arranged in parallel with each other. The first source M8S1 of the eighth transistor M8 is located at a side of the first channel region of the eighth transistor M8 away from the second channel region of the eighth transistor M8. The second source M8S2 of the eighth transistor M8 is located at a side of the second channel region of the eighth transistor M8 away from the first channel region of the eighth transistor M8. In this way, the first source M8S1 of the eighth transistor M8, the first channel region of the eighth transistor M8, the drain M8D of the eighth transistor M8, the second channel region of the eighth transistor M8 and the second source M8S2 of the eighth transistor M8 extend along the first direction G, and are arranged in sequence along the second direction H.

In one embodiment of the present disclosure, the extension lines in the first direction G of the first source M8S1 of the eighth transistor M8 and the first source M7S1 of the seventh transistor M7 coincide with each other. That is, the first source M8S1 of the eighth transistor M8 and the first source M7S1 of the seventh transistor M7 are linearly arranged along the first direction G. The extension lines in the first direction G of the second source M8S2 of the eighth transistor M8 and the second source M7S2 of the seventh transistor M7 coincide with each other. That is, the second source M8S2 of the eighth transistor M8 and the second source M7S2 of the seventh transistor M7 are linearly arranged along the first direction G. The extension lines in the first direction G of the first gate M8G1 of the eighth transistor M8 and the first gate M7G1 of the seventh transistor M7 coincide with each other. That is, the first gate M8G1 of the eighth transistor M8 and the first gate M7G1 of the seventh transistor M7 are linearly arranged along the first direction G. The extension lines in the first direction G of the second gate M8G2 of the eighth transistor M8 and the second gate M7G2 of the seventh transistor M7 coincide with each other. That is, the second gate M8G2 of the eighth transistor M8 and the second gate M7G2 of the seventh transistor M7 are linearly arranged along the first direction G. The extension lines in the first direction G of the drain M8D of the eighth transistor M8 and the drain M7D of the seventh transistor M7 coincide. That is, the drain M8D of the eighth transistor M8 and the drain M7D of the seventh transistor M7 are linearly along the first direction G. The extension lines in the first direction G of the first channel region of the eighth transistor M8 and the first channel region of the seventh transistor M7 coincide. That is, the first channel region of the eighth transistor M8 and the first channel region of the seventh transistor M7 are linearly arranged along the first direction G. The extension lines in the first direction G of the second channel region of the eighth transistor M8 and the second channel region of the seventh transistor M7 coincide. That is, the second channel region of the eighth transistor M8 and the second channel region of the seventh transistor M7 are arranged in a straight line along the first direction G. In this way, the eighth transistor M8 is located at a side in the first direction G of the seventh transistor M7.

In an embodiment of the present disclosure, referring to FIG. 11, the gate M13G of the thirteenth transistor M13 includes a first gate M13G1 and a second gate M13G2. The second gate M13G2 of the thirteenth transistor M13 and the first gate M13G1 of the thirteenth transistors M13 both extend along the first direction G and are arranged in sequence along the second direction H, and both have the same length. The portion of the fifth sub-active region Act_sub5 overlapping with the first gate M13G1 of the thirteenth transistor M13 and the second gate M13G2 of the thirteenth transistor M13 serves as a channel region of the thirteenth transistor M13. In other words, the channel region of the thirteenth transistor M13 has a first channel region and a second channel region arranged in parallel with each other. The first channel region of the thirteenth transistor M13 and the first gate M13G1 of the thirteenth transistor M13 overlap with each other. The second channel region of the thirteenth transistor M13 overlaps with the second gate M13G2 of the thirteenth transistor M13. The drain M13D of the thirteenth transistor M13 is located between the first channel region of the thirteenth transistor M13 and the second channel region of the thirteenth transistor M13. The source M13S of the thirteenth transistor M13 is located at a side of the first channel region of the thirteenth transistor M13 away from the second channel region of the thirteenth transistor M13, and further located at a side of the second channel region of the thirteenth transistor M13 away from the first channel region of the thirteenth transistor M13. In other words, the source M13S of the thirteenth transistor includes a first source M13S1 and a second source M13S2 arranged in parallel with each other. The first source M13S1 of the thirteenth transistor M13 is located at a side of the first channel region of the thirteenth transistor M13 away from the second channel region of the thirteenth transistor M13.

The second source M13S2 of the thirteenth transistor M13 is located at a side of the second channel region of the thirteenth transistor M13 away from the first channel of the thirteenth transistor M13. In this way, the second source M13S2 of the thirteenth transistor M13, the second channel region of the thirteenth transistor M13, the drain M13D of the thirteenth transistor M13, the first channel region of the thirteenth transistor M13, and the first source M13S1 of the thirteenth transistor M13 all extend along the first direction G, and are sequentially arranged along the second direction H.

In one embodiment of the present disclosure, referring to FIG. 11, the gate M14G of the fourteenth transistor M14 includes a first gate M14G1 and a second gate M14G2. The second gate M14G2 of the fourteenth transistor M14 and the first gate M14G1 of the fourteenth transistor M14 both extend along the first direction G and are arranged in sequence along the second direction H, and both have the same length. The portion of the sixth sub-active region Act_sub6 overlapping with the first gate M14G1 of the fourteenth transistor M14 and the second gate M14G2 of the fourteenth transistor M14 serves as a channel region of the fourteenth transistor M14. In other words, the channel region of the fourteenth transistor M14 has a first channel region and a second channel region arranged in parallel with each other. The first channel region of the fourteenth transistor M14 and the first gate M14G1 of the fourteenth transistor M14 overlap. The second channel region of the fourteenth transistor M14 overlaps with the second gate M14G2 of the fourteenth transistor M14. The drain M14D of the fourteenth transistor M14 is located between the first channel region of the fourteenth transistor M14 and the second channel region of the fourteenth transistor M14. The source M14S of the fourteenth transistor is located at a side of the first channel region of the fourteenth transistor M14 away from the second channel region of the fourteenth transistor M14, and further located at a side of the second channel region of the fourteenth transistor M14 away from the first channel region of the fourteenth transistor M14. In other words, the source M14S of the fourteenth transistor includes a first source M14S1 and a second source M14S2 arranged in parallel with each other. The first source M14S1 of the fourteenth transistor M14 is located at a side of the first channel region of the fourteenth transistor M14 away from the second channel region of the fourteenth transistor M14. The second source M14S2 of the fourteenth transistor M14 is located at a side of the second channel region of the fourteenth transistor M14 away from the first channel region of the fourteenth transistor M14. In this way, the second source M14S2 of the fourteenth transistor M14, the second channel region of the fourteenth transistor M14, the drain M14D of the fourteenth transistor M14, the first channel region of the fourteenth transistor M14 and the first source M14S1 of the fourteenth transistor M14 all extend along the first direction G, and are sequentially arranged along the second direction H.

In an embodiment of the present disclosure, the extension lines in the first direction G of the first source M14S1 of the fourteenth transistor M14 and the first source M13S1 of the thirteenth transistor M13 coincide. That is, the first source M14S1 of the fourteenth transistor M14 and the first source M13S1 of the thirteenth transistor M13 are linearly arranged along the first direction G. The extension lines in the first direction G of the second source M14S2 of the fourteenth transistor M14 and the second source M13S2 of the thirteenth transistor M13 coincide. That is, the second source M14S2 of the fourteenth transistor M14 and the second source M13S2 of the thirteenth transistor M13 are linearly arranged along the first direction G. The extension lines in the first direction G of the first gate M14G1 of the fourteenth transistor M14 and the first gate M13G1 of the thirteenth transistor M13 coincide. That is, the first gate M14G1 of the fourteenth transistor M14 and the first gates M13G1 of the thirteenth transistor M13 are linearly arranged along the first direction G. The extension lines in the first direction G of the second gate M14G2 of the fourteenth transistor M14 and the second gate M13G2 of the thirteenth transistor M13 coincide. That is, the second gate M14G2 of the fourteenth transistor M14 and the second gate M13G2 of the thirteenth transistor M13 are linearly arranged along the first direction G. The extension lines in the first direction G of the drain M14D of the fourteenth transistor M14 and the drain M13D of the thirteenth transistor M13 coincide. That is, the drain M14D of the fourteenth transistor M14 and the drain M13D of the thirteenth transistor M13 are arranged in a straight line along the first direction G. The extension lines in the first direction G of the first channel region of the fourteenth transistor M14 and the first channel region of the thirteenth transistor M13 coincide. That is, the first channel region of the fourteenth transistor M14 and the first channel region of the thirteenth transistor M13 are linearly arranged along the first direction G. The extension lines in the first direction G of the second channel region of the fourteenth transistor M14 and the second channel region of the thirteenth transistor M13 coincide. That is, the second channel region of the fourteenth transistor M14 and the second channel region of the thirteenth transistor M13 are linearly arranged along the first direction G. In this way, the fourteenth transistor M14 is located at a side in the first direction G of the thirteenth transistor M13.

In an embodiment of the present disclosure, the first source M7S1 of the seventh transistor M7, the first gate M7G1 of the seventh transistor M7, the drain M7D of the seventh transistor M7, the second gate M7G2 of the seventh transistor M7, the second source M7S2 of the seventh transistor M7, the second source M13S2 of the thirteenth transistor M13, the second gate M13G2 of the thirteenth transistor M13, the drain M13D of the thirteenth transistor M13, the first gate M13G1 of the thirteenth transistor M13, and the first source M13S1 of the thirteenth transistor M13 are sequentially arranged along the second direction H. In this way, the thirteenth transistor M13 is located at a side in the second direction H of the seventh transistor M7. Further, the second source M7S2 of the seventh transistor M7 and the second source M13S2 of the thirteenth transistor M13 coincide. In this way, the seventh transistor M7 and the thirteenth transistor M13 can share a source, thereby simplifying the wiring arrangement of the line drive signal enhancement circuit 101, improving the compactness of the line drive signal enhancement circuit 101, and reducing the area occupied by the line drive signal enhancement circuit 101.

In an embodiment of the present disclosure, the first source M8S1 of the eighth transistor M8, the first gate M8G1 of the eighth transistor M8, the drain M8D of the eighth transistor M8, and the second gate M8G2 of the eighth transistor M8, the second source M8S2 of the eighth transistor M8, the second source M14S2 of the fourteenth transistor M14, the second gate M14G2 of the fourteenth transistor M14, the drain M14D of the fourteenth transistor M14, the first gate M14G1 of the fourteenth transistor M14, and the first source M14S1 of the fourteenth transistor M14 are sequentially arranged along the second direction H. In this way, the fourteenth transistor M14 is located at a side in the second direction H of the eighth transistor M8. Further, the second source M8S2 of the eighth transistor M8 and the second source M14S2 of the fourteenth transistor M14 coincide. In this way, the eighth transistor M8 and the fourteenth transistor M14 can share a source, thereby simplifying the wiring arrangement of the line drive signal enhancement circuit 101, improving the compactness of the line drive signal enhancement circuit 101, and reducing the area occupied by the line drive signal enhancement circuit 101.

In one embodiment of the present disclosure, referring to FIG. 11, the gate M9G of the ninth transistor M9 includes a first gate M9G1 and a second gate M9G2. The first gate M9G1 of the ninth transistor M9 and the second gate M9G2 of the ninth transistor M9 extend along the first direction G and are arranged in sequence along the second direction H, and both have the same length. The portion of the first sub-active region Act_sub1 overlapping with the first gate M9G1 of the ninth transistor M9 and the second gate M9G2 of the ninth transistor M9 serves as a channel region of the ninth transistor M9. In other words, the channel region of the ninth transistor M9 has a first channel region and a second channel region arranged in parallel with each other. The first channel region of the ninth transistor M9 overlaps with the first gate M9G1 of the ninth transistor M9. The second channel region of the ninth transistor M9 overlaps with the second gate M9G2 of the ninth transistor M9. The drain M9D of the ninth transistor M9 is located between the first channel region of the ninth transistor M9 and the second channel region of the ninth transistor M9. The source M9S of the ninth transistor is located at a side of the first channel region of the ninth transistor M9 away from the second channel region of the ninth transistor M9, and further located at a side of the second channel region of the ninth transistor M9 away from the first channel region of the ninth transistor M9. In other words, the source M9S of the ninth transistor includes a first source M9S1 and a second source M9S2 arranged in parallel with each other. The first source M9S1 of the ninth transistor M9 is located at a side of the first channel region of the ninth transistor M9 away from the second channel region of the ninth transistor M9. The second source M9S2 of the ninth transistor M9 is located at a side of the second channel region of the ninth transistor M9 away from the first channel region of the ninth transistor M9. In this way, the first source M9S1 of the ninth transistor M9, the first channel region of the ninth transistor M9, the drain M9D of the ninth transistor M9, the second channel region of the ninth transistor M9, and the second source M9S2 of the ninth transistor M9 extend along the first direction G, and are sequentially arranged along the second direction H.

In one embodiment of the present disclosure, referring to FIG. 11, the gate M10G of the tenth transistor M10 includes a first gate M10G1 and a second gate M10G2. The first gate M10G1 of the tenth transistor M10 and the second gate M10G2 of the tenth transistor M10 extend along the first direction G and are arranged in sequence along the second direction H, and both have the same length. The portion of the second sub-active region Act_sub2 overlapping with the first gate M10G1 of the tenth transistor M10 and the second gate M10G2 of the tenth transistor M10 serves as a channel region of the tenth transistor M10. In other words, the channel region of the tenth transistor M10 has a first channel region and a second channel region arranged in parallel with each other. The first channel region of the tenth transistor M10 overlaps with the first gate M10G1 of the tenth transistor M10. The second channel region of the tenth transistor M10 overlaps with the second gate M10G2 of the tenth transistor M10. The drain M10D of the tenth transistor M10 is located between the first channel region of the tenth transistor M10 and the second channel region of the tenth transistor M10. The source M10S of the tenth transistor is located at a side of the first channel region of the tenth transistor M10 away from the second channel region of the tenth transistor M10, and further located at a side of the second channel region of the tenth transistor M10 away from the first channel region of the tenth transistor M10. In other words, the source M10S of the tenth transistor includes a first source M10S1 and a second source M10S2 arranged in parallel with each other. The first source M10S1 of the tenth transistor M10 is located at a side of the first channel region of the tenth transistor M10 away from the second channel region of the tenth transistor M10. The second source M10S2 of the tenth transistor M10 is located at a side of the second channel region of the tenth transistor M10 away from the first channel region of the tenth transistor M10. In this way, the first source M10S1 of the tenth transistor M10, the first channel region of the tenth transistor M10, the drain M10D of the tenth transistor M10, the second channel region of the tenth transistor M10, and the second source M10S2 of the tenth transistor M10 extend along the first direction G and are arranged in sequence along the second direction H.

In an embodiment of the present disclosure, the extension lines in the first direction G of the first source M10S1 of the tenth transistor M10 and the first source M9S1 of the ninth transistor M9 coincide. That is, the first source M10S1 of the tenth transistor M10 and the first source M9S1 of the ninth transistor M9 are linearly arranged along the first direction G. The extension lines in the first direction G of the second source M10S2 of the tenth transistor M10 and the second source M9S2 of the ninth transistor M9 coincide. That is, the second source M10S2 of the tenth transistor M10 and the second source M9S2 of the ninth transistor M9 are linearly arranged along the first direction G. The extension lines in the first direction G of the first gate M10G1 of the tenth transistor M10 and the first gate M9G1 of the ninth transistor M9 coincide. That is, the first gate M10G1 of the tenth transistor M10 and the first gate M9G1 of the ninth transistor M9 are linearly arranged along the first direction G. The extension lines in the first direction G of the second gate M10G2 of the tenth transistor M10 and the second gate M9G2 of the ninth transistor M9 coincide. That is, the second gate M10G2 of the tenth transistor M10 and the second gate M9G2 of the ninth transistor M9 are linearly arranged along the first direction G. The extension lines in the first direction G of the drain M10D of the tenth transistor M10 and the drain M9D of the ninth transistor M9 coincide. That is, the drain M10D of the tenth transistor M10 and the drain M9D of the ninth transistor M9 are linearly arranged along the first direction G. The extension lines in the first direction G of the first channel region of the tenth transistor M10 and the first channel region of the ninth transistor M9 coincide. That is, the first channel region of the tenth transistor M10 and the first channel region of the ninth transistor M9 are linearly arranged along the first direction G. The extension lines in the first direction G of the second channel region of the tenth transistor M10 and the second channel region of the ninth transistor M9 coincide. That is, the second channel region of the tenth transistor M10 and the second channel region of the ninth transistor M9 are arranged in a straight line along the first direction G. In this way, the tenth transistor M10 is located at a side in the first direction G of the ninth transistor M9.

In one embodiment of the present disclosure, referring to FIG. 11, the gate M11G of the eleventh transistor M11 includes a first gate M11G1 and a second gate M11G2. The second gate M11G2 of the eleventh transistor M11 and the first gates M11G1 of the eleventh transistor M11 both extend along the first direction G and are arranged in sequence along the second direction H, and both have the same length. The portion of the first sub-active region Act_sub1 that overlaps with the first gate M11G1 of the eleventh transistor M11 and the second gate M11G2 of the eleventh transistor M11 serves as a channel region of the eleventh transistor M11. In other words, the channel region of the eleventh transistor M11 has a first channel region and a second channel region arranged in parallel with each other. The first channel region of the eleventh transistor M11 and the first gate M11G1 of the eleventh transistor M11 overlaps. The second channel region of the eleventh transistor M11 overlaps with the second gate M11G2 of the eleventh transistor M11. The drain M11D of the eleventh transistor M11 is located between the first channel region of the eleventh transistor M11 and the second channel region of the eleventh transistor M11. The source M11S of the eleventh transistor is located at a side of the first channel region of the eleventh transistor M11 away from the second channel region of the eleventh transistor M11, and further located at a side of the second channel region of the eleventh transistor M11 away from the first channel region of the eleventh transistor M11. In other words, the source M11S of the eleventh transistor includes a first source M11S1 and a second source M11S2 arranged in parallel with each other. The first source M11S1 of the eleventh transistor M11 is located at a side of the first channel region of the eleventh transistor M11 away from the second channel region of the eleventh transistor M11. The second source M11S2 of the eleventh transistor M11 is located at a side of the second channel region of the eleventh transistor M11 away from the first channel region of the eleventh transistor M11. In this way, the second source M11S2 of the eleventh transistor M11, the second channel region of the eleventh transistor M11, the drain M11D of the eleventh transistor M11, the first channel region of the eleventh transistor M11 and the first source M11S1 of the eleventh transistor M11 all extend along the first direction G and are sequentially arranged along the second direction H.

In one embodiment of the present disclosure, referring to FIG. 11, the gate M12G of the twelfth transistor M12 includes a first gate M12G1 and a second gate M12G2. The second gate M12G2 of the twelfth transistor M12 and the first gate M12G1 of the twelfth transistor M12 both extend along the first direction G and are arranged in sequence along the second direction H, and both have the same length. The portion of the second sub-active sub-region Act_sub2 overlapping with the first gate M12G1 of the twelfth transistor M12 and the second gate M12G2 of the twelfth transistor M12 serves as a channel region of the twelfth transistor M12. In other words, the channel region of the twelfth transistor M12 has a first channel region and a second channel region arranged in parallel with each other. The first channel region of the twelfth transistor M12 and the first gate M12G1 of the twelfth transistor M12 overlap. The second channel region of the twelfth transistor M12 overlaps with the second gate M12G2 of the twelfth transistor M12. The drain M12D of the twelfth transistor M12 is located between the first channel region of the twelfth transistor M12 and the second channel region of the twelfth transistor M12. The source M12S of the twelfth transistor M12 is located at a side of the first channel region of the twelfth transistor M12 away from the second channel region of the twelfth transistor M12, and further located at a side of the second channel region of the twelfth transistor M12 away from the first channel region of the twelfth transistor M12. In other words, the source M12S of the twelfth transistor includes a first source M12S1 and a second source M12S2 arranged in parallel with each other. The first source M12S1 of the twelfth transistor M12 is located at a side of the first channel region of the twelfth transistor M12 away from the second channel region of the twelfth transistor M12. The second source M12S2 of the twelfth transistor M12 is located at a side of the second channel region of the twelfth transistor M12 away from the first channel region of the twelfth transistor M12. In this way, the second source M12S2 of the twelfth transistor M12, the second channel region of the twelfth transistor M12, the drain M12D of the twelfth transistor M12, the first channel region of the twelfth transistor M12, and the first source M12S1 of the twelfth transistor M12 all extend along the first direction G, and are sequentially arranged along the second direction H.

In an embodiment of the present disclosure, the extension lines in the first direction G of the first source M12S1 of the twelfth transistor M12 and the first source M11S1 of the eleventh transistor M11 coincide. That is, the first source M12S1 of the twelfth transistor M12 and the first source M11S1 of the eleventh transistor M11 are linearly arranged along the first direction G. The extension lines in the first direction G of the second source M12S2 of the twelfth transistor M12 and the second source M11S2 of the eleventh transistor M11 coincide. That is, the second source M12S2 of the twelfth transistor M12 and the second source M11S2 of the eleventh transistor M11 are linearly arranged along the first direction G. The extension lines in the first direction G of the first gate M12G1 of the twelfth transistor M12 and the first gate M11G1 of the eleventh transistor M11 coincide. That is, the first gate M12G1 of the twelfth transistor M12 and the first gate M11G1 of the eleventh transistor M11 are linearly arranged along the first direction G. The extension lines in the first direction G of the second gate M12G2 of the twelfth transistor M12 and the second gate M11G2 of the eleventh transistor M11 coincide. That is, the second gate M12G2 of the twelfth transistor M12 and the second gate M11G2 of the eleventh transistor M11 are linearly arranged along the first direction G. The extension lines in the first direction G of the drain M12D of the twelfth transistor M12 and the drain M11D of the eleventh transistor M11 coincide. That is, the drain M12D of the twelfth transistor M12 and the drain M11D of the eleventh transistor M11 are arranged in a straight line along the first direction G. The extension lines in the first direction G of the first channel region of the twelfth transistor M12 and the first channel region of the eleventh transistor M11 coincide. That is, the first channel region of the twelfth transistor M12 and the first channel region of the eleventh transistor M11 are linearly arranged along the first direction G. The extension lines in the first direction G of the second channel region of the twelfth transistor M12 and the second channel region of the eleventh transistor M11 coincide. That is, the second channel region of the twelfth transistor M12 and the second channel region of the eleventh transistor M11 are linearly arranged along the first direction G. In this way, the twelfth transistor M12 is located at a side in the first direction G of the eleventh transistor M11.

In an embodiment of the present disclosure, the first source M9S1 of the ninth transistor M9, the first gate M9G1 of the ninth transistor M9, the drain M9D of the ninth transistor M9, the second gate M9G2 of the ninth transistor M9, the second source M9S2 of the ninth transistor M9, the second source M11S2 of the eleventh transistor M11, the second gate M11G2 of the eleventh transistor M11, the drain M11D of the eleventh transistor M11, the first gate M11G1 of the eleventh transistor M11, and the first source M11S1 of the eleventh transistor M11 are arranged in sequence along the second direction H. In this way, the eleventh transistor M11 is located at a side in the second direction H of the ninth transistor M9. Further, the second source M9S2 of the ninth transistor M9 and the second source M11S2 of the eleventh transistor M11 coincide. In this way, the ninth transistor M9 and the eleventh transistor M11 can share a source, thereby simplifying the wiring arrangement of the line drive signal enhancement circuit 101, improving the compactness of the line drive signal enhancement circuit 101, and reducing the area occupied by the line drive signal enhancement circuit 101.

In an embodiment of the present disclosure, the first source M10S1 of the tenth transistor M10, the first gate M10G1 of the tenth transistor M10, the drain M10D of the tenth transistor M10, the second gate M10G2 of the tenth transistor M10, the second source M10S2 of the tenth transistor M10, the second source M12S2 of the twelfth transistor M12, the second gate M12G2 of the twelfth transistor M12, the drain M12D of the twelfth transistor M12, the first gate M12G1 of the twelfth transistor M12, and the first source M12S1 of the twelfth transistor M12 are sequentially arranged along the second direction H. In this way, the twelfth transistor M12 is located at a side in the second direction H of the tenth transistor M10. Further, the second source M10S2 of the tenth transistor M10 and the second source M12S2 of the twelfth transistor M12 coincide. In this way, the twelfth transistor M12 and the tenth transistor M10 can share a source, thereby simplifying the wiring arrangement of the line drive signal enhancement circuit 101, improving the compactness of the line drive signal enhancement circuit 101, and reducing the area occupied by the line drive signal enhancement circuit 101.

Optionally, referring to FIG. 23, the insulation medium layer 340 includes a first dielectric layer 341, a second dielectric layer 342 and a third dielectric layer 343 sequentially stacked on the gate layer 330. The metal wiring layer 360 includes a first metal wiring layer 361 located between the first dielectric layer 341 and the second dielectric layer 342, a second metal wiring layer 362 located between the second dielectric layer 342 and the third dielectric layer 343, and a third metal wiring layer 363 located on a surface of the third dielectric layer 343 away from the semiconductor substrate 310.

The conductive pillar includes a first conductive pillar 351 penetrating the first dielectric layer 341, a second conductive pillar 352 penetrating the second dielectric layer 342, and a third conductive pillar 353 penetrating the third dielectric layer 343. The first metal wiring layer 361 is connected to the semiconductor substrate 310 and the gate layer 330 through the first conductive pillar 351. The second metal wiring layer 362 is connected to the first metal wiring layer 361 through the second conductive pillar 352. The third metal wiring layer 363 is connected to the second metal wiring layer 362 through the third conductive pillar 353.

Optionally, referring to FIG. 23, each conductive pillar penetrates through the corresponding dielectric layer in a direction perpendicular to the semiconductor substrate 310. Exemplarily, the first conductive pillar 351 penetrates through the first dielectric layer 341 in a direction perpendicular to the semiconductor substrate 310, so as to connect with the semiconductor substrate 310 or the gate layer 330.

In an embodiment of the present disclosure, the orthographic projection on the semiconductor substrate 310 of the first conductive pillar 351 does not overlap with the orthographic projection on the semiconductor substrate 310 of the second conductive pillar 352. The orthographic projection on the semiconductor substrate 310 of the second conductive pillar 352 does not overlap with the orthographic projection on the semiconductor substrate 310 of the third conductive pillar 353.

Optionally, each of the conductive pillars may be a metal pillar, such as a tungsten pillar.

Figure 12:
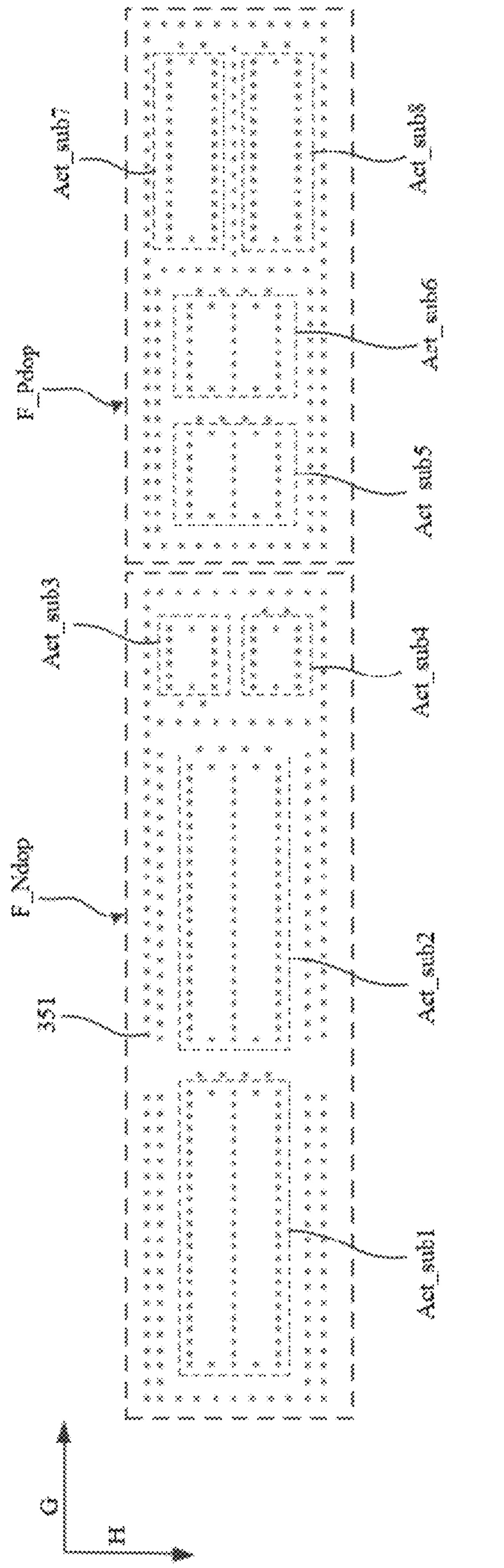
FIG. 12 is a schematic structural diagram of each first conductive pillar in the first dielectric layer in the line drive signal enhancement area according to an embodiment of the present disclosure.
Figure 13:
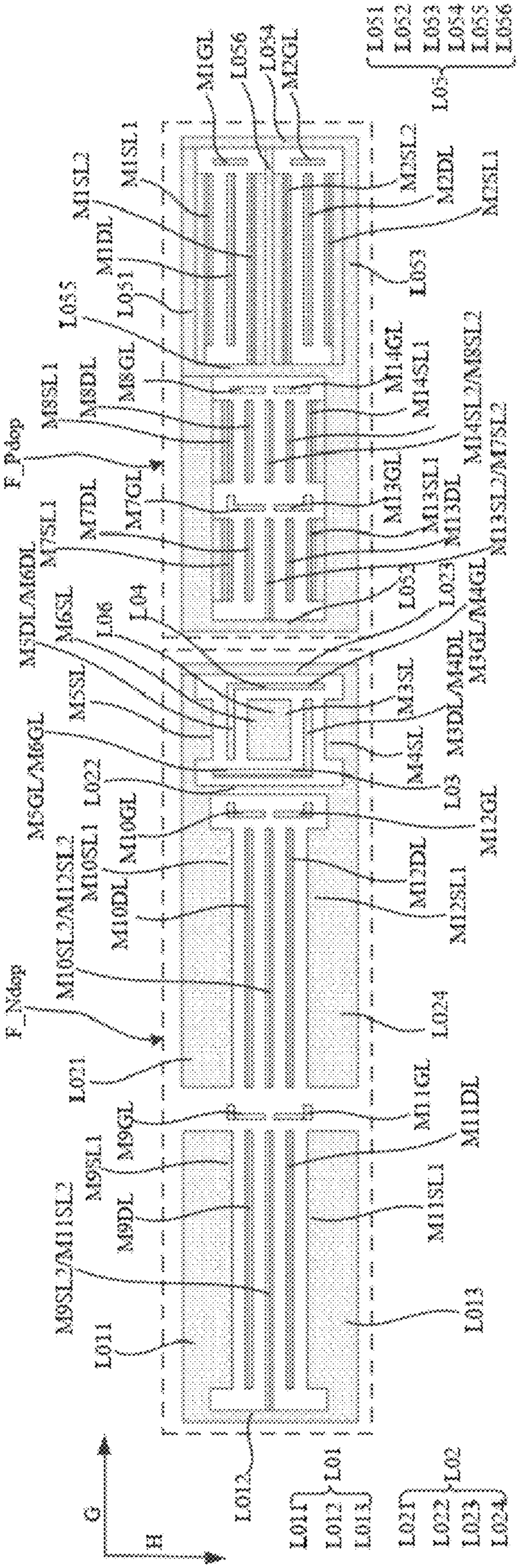
FIG. 13 is a schematic structural diagram of a first metal wiring layer in the line drive signal enhancement area according to an embodiment of the present disclosure.
Figure 14:
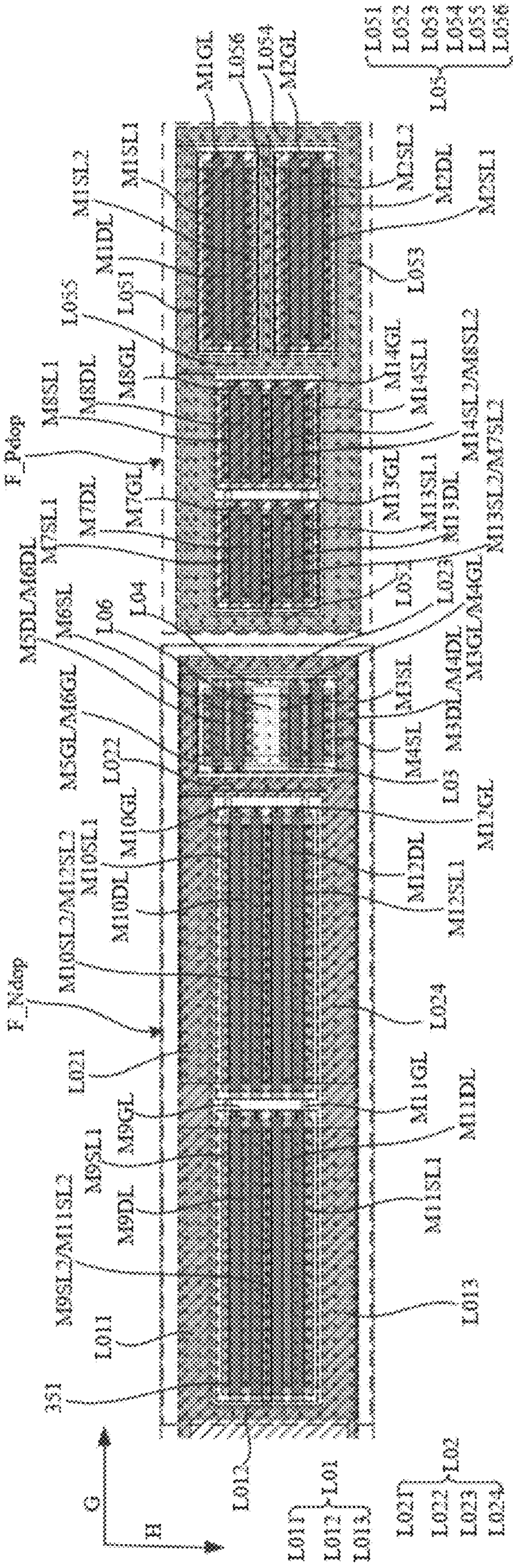
FIG. 14 is a schematic structural diagram of the P-type doped region, the N-type doped region, each active region, the gate layer, the first conductive pillar and the first metal wiring layer in the line drive signal enhancement area according to an embodiment of the present disclosure.

Optionally, referring to FIG. 13, the first metal wiring layer 361 includes part of the connection lead. The connection lead located in the first metal wiring layer 361 includes the first connection lead L01 to the sixth connection lead L06, and further include the gate connection line, the source connection line, and the drain connection line corresponding to each of the first transistor M1 to the fourteenth transistor M14. With reference to FIGS. 12 to 14, the gate connection line corresponding to each transistor is connected to the gate of the transistor through the first conductive pillar 351; the source connection line corresponding to each transistor is connected to the source of the transistor through the first conductive pillar 351; and the drain connection line corresponding to each transistor is connected to the drain of the transistor through the first conductive pillar 351.

The source connection line corresponding to the ninth transistor M9 and the source connection line corresponding to the eleventh transistor M11 are connected to the first connection lead L01. The source connection line corresponding to the tenth transistor M10 includes a first sub-connection line M10SL1 and a second sub-connection line M10SL2. The source connection line corresponding to the twelfth transistor M12 includes a first sub-connection line M12SL1 and a second sub-connection line M12SL2. The first sub-connection line M10SL1 of the source connection line corresponding to the tenth transistor M10, the first sub-connection line M12SL1 of the source connection line corresponding to the twelfth transistor M12, the source connection line M5SL corresponding to the fifth transistor M5, and the source connection line M4SL corresponding to the fourth transistor M4 are connected to the second connection lead L02.

The drain connection line M3DL corresponding to the third transistor M3, the drain connection line M4DL corresponding to the fourth transistor M4, the gate connection line M5GL corresponding to the fifth transistor M5, and the gate connection line M6GL corresponding to the sixth transistor M6 are connected to the third connection lead L03.

The drain connection line M5DL corresponding to the fifth transistor M5, the drain connection line M6DL corresponding to the sixth transistor M6, the gate connection line M3GL corresponding to the third transistor M3, and the gate connection line M4GL corresponding to the fourth transistor M4 are connected to the fourth connection lead L04.

The source connection line corresponding to the eighth transistor M8 includes a first sub-connection line M8SL1 and a second sub-connection line M8SL2. The source connection line corresponding to the fourteenth transistor M14 includes a first sub-connection line M14SL1 and a second sub-connection line M14SL2. The first sub-connection line M8SL1 of the source connection line corresponding to the eighth transistor M8, the first sub-connection line M14SL1 of the source connection line corresponding to the fourteenth transistor M14, the source connection line corresponding to the seventh transistor M7, the source connection line corresponding to the thirteenth transistor M13, the source connection line corresponding to the first transistor M1, and the source connection line corresponding to the second transistor M2 are connected to the fifth connection lead L05.

The source connection line M3SL corresponding to the third transistor M3 and the source connection line M6SL corresponding to the sixth transistor M6 are connected to the sixth connection lead L06.

Figure 17:
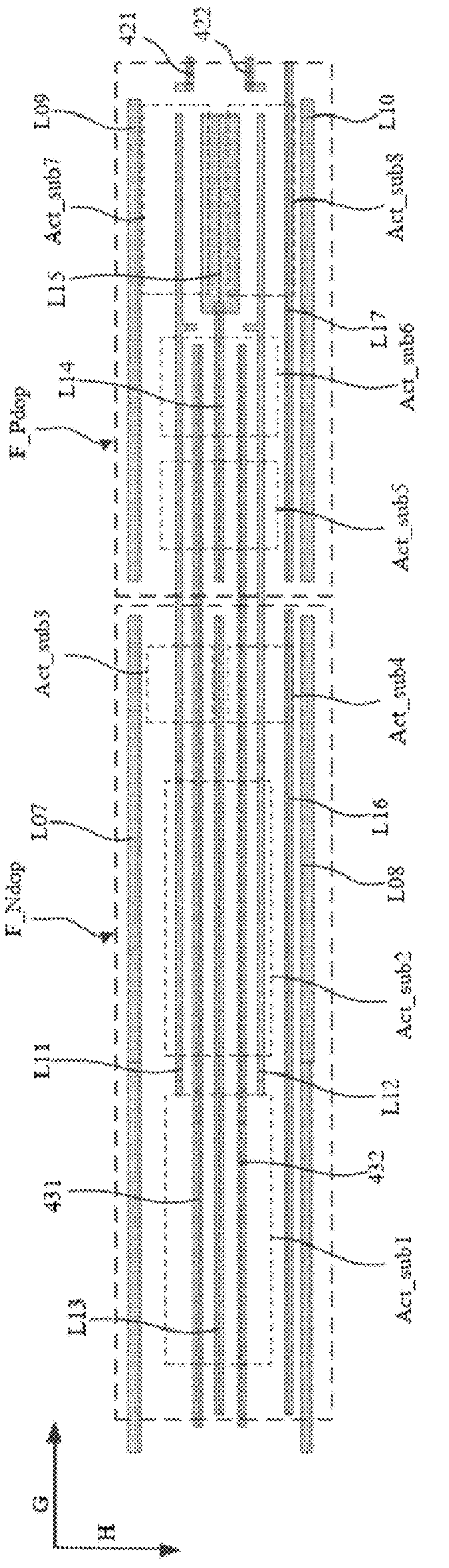
FIG. 17 is a schematic structural diagram of a second metal wiring layer in a line drive signal enhancement area according to an embodiment of the present disclosure.

Referring to FIG. 17, the second metal wiring layer 362 includes a first control lead 421, a second control lead 422, a first output lead 431, a second output lead 432 and part of the connection lead. The connection lead located at the second metal wiring layer 362 includes the seventh connection lead L07 to the fifteenth connection lead L15. Referring to FIGS. 15 to 18, the second metal wiring layer 362 is connected to the first metal wiring layer 361 through the second conductive pillar 352.

The first connection lead L01 and the second connection lead L02 are connected to the seventh connection lead L07. The first connection lead L01 and the second connection lead L02 are connected to the eighth connection lead L08. The fifth connection lead L05 is connected to the ninth connection lead L09 and the tenth connection lead L10.

The gate connection line M9GL corresponding to the ninth transistor M9, the gate connection line M10GL corresponding to the tenth transistor M10, the drain connection line M5DL corresponding to the fifth transistor M5, the drain connection line M6DL corresponding to the sixth transistor M6, the gate connection line M7GL corresponding to the seventh transistor M7, the gate connection line M8GL corresponding to the eighth transistor M8, and the drain connection line M1DL corresponding to the first transistor M1 are connected to the eleventh connection lead L11.

The gate connection line M11GL corresponding to the eleventh transistor M11, the gate connection line M12GL corresponding to the twelfth transistor M12, the drain connection line M3DL corresponding to the third transistor M3, the drain connection line M4DL corresponding to the fourth transistor M4, the gate connection line M13GL corresponding to the thirteenth transistor M13, the gate connection line M14GL corresponding to the fourteenth transistor M14, and the drain connection line M2DL corresponding to the second transistor M2 are connected to the twelfth connection lead L12.

The first connection lead L01, the second sub-connection line M9SL2 of the source connection line corresponding to the ninth transistor M9, the second sub-connection line M10SL2 of the source connection line corresponding to the tenth transistor M10, the second sub-connection line M11SL2 of the source connection line corresponding to the eleventh transistor M11, the second sub-connection line M12SL2 of the source connection line corresponding to the twelfth transistor M12, the sixth connection lead L06, and the second connection lead L02 are connected to the thirteenth connection lead L13.

The second sub-connection line M7SL2 of the source connection line corresponding to the seventh transistor M7, the second sub-connection line M8SL2 of the source connection line corresponding to the eighth transistor M8, the second sub-connection line M8SL2 of the source connection line corresponding to the thirteenth transistor M13, the second sub-connection line M14SL2 of the source connection line corresponding to the fourteenth transistor M14, and the fifth connection lead L05 are connected to the fourteenth connection lead L14.

The second sub-connection line M1SL2 of the source connection line corresponding to the first transistor M1, the second sub-connection line M2SL2 of the source connection line corresponding to the second transistor M2, and the fifth connection lead L05 are connected to the fifteenth connection lead L15.

The drain connection line M7DL corresponding to the seventh transistor M7, the drain connection line M8DL corresponding to the eighth transistor M8, the drain connection line M9DL corresponding to the ninth transistor M9, and the drain connection line M10DL corresponding to the tenth transistor M10 are connected to the first output lead 431. The drain connection line M11DL corresponding to the eleventh transistor M11, the drain connection line M12DL corresponding to the twelfth transistor M12, the drain connection line M13DL corresponding to the thirteenth transistor M13, and the drain connection line M14DL corresponding to the fourteenth transistor M14 are connected to the second output lead 432.

Figure 19:
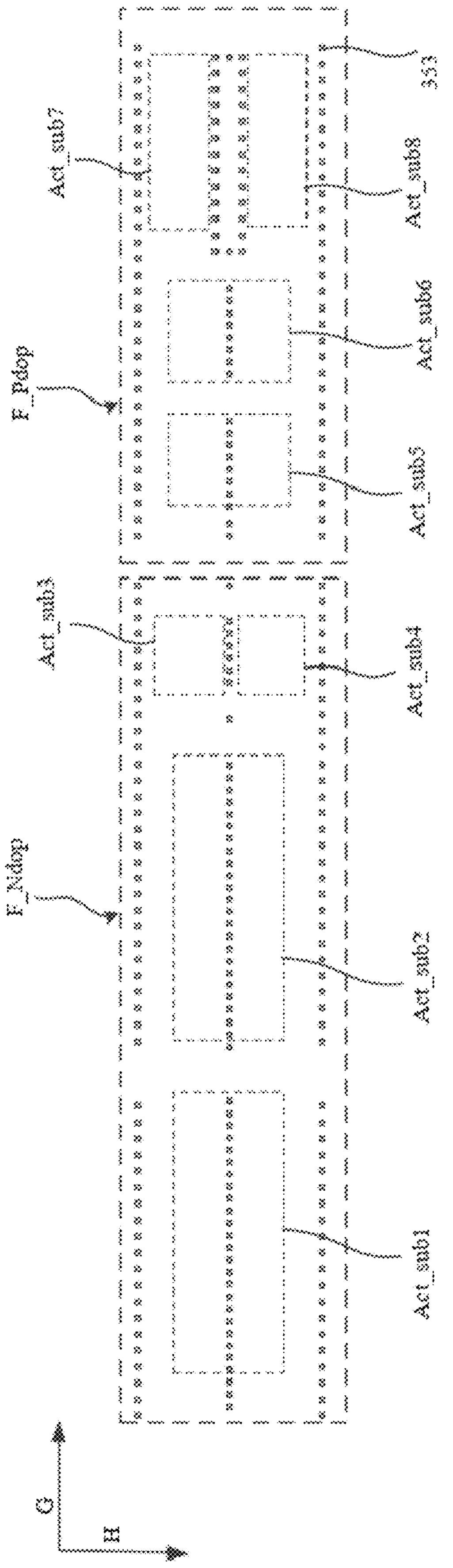
FIG. 19 is a schematic structural diagram of each third conductive pillar in the third dielectric layer in the line drive signal enhancement area according to an embodiment of the present disclosure.
Figure 20:
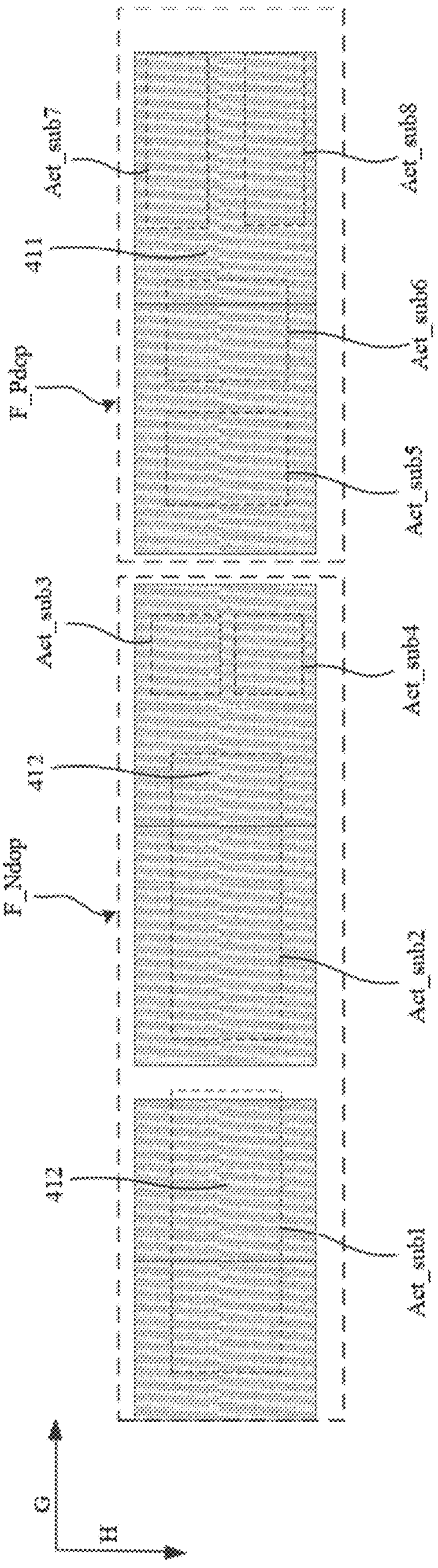
FIG. 20 is a schematic structural diagram of a third metal wiring layer in a line drive signal enhancement area according to an embodiment of the present disclosure.

Referring to FIG. 20, the third metal wiring layer 363 includes a first voltage lead 411 for loading a first voltage, and further a second power supply lead 412 including a wire for loading a second power supply voltage V2. With reference to FIGS. 19 to 22, the ninth connection lead L09, the tenth connection lead L10, the fourteenth connection lead L14, and the fifteenth connection lead L15 are connected to the first power supply lead 411 through the third conductive pillar. The seventh connection lead L07, the eighth connecting lead L08, the thirteenth connection lead L13 and the second power supply lead 412 are connected through the third conductive pillar.

In this way, in the display panel according to an embodiment of the present disclosure, the metal wiring layer 360 electrically connects each transistor in the line drive signal enhancement area F, so that the display panel forms the line drive signal enhancement circuit 101 in the line drive signal enhancement area F.

In one embodiment of the present disclosure, referring to FIG. 11, the second source M7S2 of the seventh transistor M7 and the second source M13S2 of the thirteenth transistor M13 coincide. Referring to FIG. 13, the second sub-connection line M7SL2 of the source connection line corresponding to the seventh transistor M7 and the second sub-connection line M13SL2 of the source connection line corresponding to the thirteenth transistor M13 coincide and are the same lead.

In one embodiment of the present disclosure, referring to FIG. 11, the second source M8S2 of the eighth transistor M8 and the second source M14S2 of the fourteenth transistor M14 coincide. Referring to FIG. 13, the second sub-connection line M8SL2 of the source connection line corresponding to the eighth transistor M8 and the second sub-connection line M14SL2 of the source connection line corresponding to the fourteenth transistor M14 coincide and are the same lead.

In an embodiment of the present disclosure, referring to FIG. 11, the second source M9S2 of the ninth transistor M9 and the second source M11S2 of the eleventh transistor M11 coincide. Referring to FIG. 13, the second sub-connection line M9SL2 of the source connection line corresponding to the ninth transistor M9 and the second sub-connection line M11SL2 of the source connection line corresponding to the eleventh transistor M11 coincide and are the same lead.

In an embodiment of the present disclosure, referring to FIG. 11, the second source M10S2 of the tenth transistor M10 and the second source M12S2 of the twelfth transistor M12 coincide. Referring to FIG. 13, the second sub-connection line M10SL2 of the source connection line corresponding to the tenth transistor M10 and the second sub-connection line M12SL2 of the source connection line corresponding to the twelfth transistor M12 coincide and are the same lead.

In one embodiment of the present disclosure, referring to FIG. 11, the drain M5D of the fifth transistor M5 and the drain M6D of the sixth transistor M6 coincide. Referring to FIG. 13, the drain connection line M5DL corresponding to the fifth transistor M5 and the drain connection line M6DL corresponding to the sixth transistor M6 coincide and are the same lead.

In one embodiment of the present disclosure, referring to FIG. 11, the drain M3D of the third transistor M3 and the drain M4D of the fourth transistor M4 coincide. Referring to FIG. 13, the drain connection line M3DL corresponding to the third transistor M3 and the drain connection line M4DL corresponding to the fourth transistor M4 coincide, and are the same lead.

Optionally, among the first transistor M1 to the fourteenth transistor M14, the source connection line corresponding to any one of the transistors overlaps with the source of the transistor, and the extension directions of the two are the same. In an embodiment of the present disclosure, among the first transistor M1 to the fourteenth transistor M14, the extension direction of the source connection line corresponding to any one of the transistors is the first direction G. Further optionally, for any transistor, the source connection lead corresponding to the transistor and the source of the transistor are connected through a plurality of first conductive pillars 351 arranged in sequence along the first direction G.

Optionally, among the first transistor M1 to the fourteenth transistor M14, the drain connection line corresponding to any one of the transistors overlaps with the drain of the transistor, and the extension directions of the two are the same. In an embodiment of the present disclosure, among the first transistor M1 to the fourteenth transistor M14, the extension direction of the drain connection line corresponding to any one of the transistors is the first direction G. Further optionally, for any transistor, the drain connection lead corresponding to the transistor and the drain of the transistor are connected through two first conductive pillars 351 arranged along the first direction G.

Optionally, the width of the drain connection line corresponding to each transistor is the same.

Optionally, among the first transistor M1 to the fourteenth transistor M14, the gate of any one of the transistors extends along the first direction G; and the gate connection line corresponding to any one of the transistors extends along the second direction H, and is electrically connected to an end of the gate of the transistor through the first conductive pillar 351. Further, the gate connection line corresponding to any one of the transistors does not overlap with the active region.

Optionally, the widths of the drain connection line and the gate connection line corresponding to each transistor are the same.

Exemplarily, Referring to FIG. 13, the gate connection line MIGL corresponding to the first transistor M1 is located at a side in the first direction G of the seventh sub-active region Act_sub7 and extends along the second direction H, and is further connected to a side in the first direction G of the first gate MIG1 of the first transistor M1 and the second gate M1G2 of the first transistor M1.

The gate connection line M2GL corresponding to the second transistor M2 is located at a side in the first direction G of the eighth sub-active region Act_sub8 and extends along the second direction H, and is further connected to an end in the first direction G of the first gate M2G1 of the second transistor M2 and the second gate M2G2 of the second transistor M2.

The gate connection line M3GL corresponding to the third transistor M3 is located at a side in the first direction G of the fourth sub-active region Act_sub4 and extends along the second direction H, and is further connected to an end at a side in the first direction G of the gate M3G of the third transistor M3.

The gate connection line M4GL corresponding to the fourth transistor M4 is located at a side in the first direction G of the fourth sub-active region Act_sub4 and extends along the second direction H, and is further connected to an end at a side in the first direction G of the gate M4G of the fourth transistor M4.

The gate connection line M5GL corresponding to the fifth transistor M5 is located at a side in a direction opposite to the first direction G of the third sub-active region Act_sub3 and extends along the second direction H, and is further connected to an end at a side in a direction opposite to the first direction of the gate M5G of the fifth transistor M5.

The gate connection line M6GL corresponding to the sixth transistor M6 is located at a side in a direction opposite to the first direction G of the third sub-active region Act_sub3 and extends along the second direction H, and is further connected to an end at a side in a direction opposite to the first direction of the gate M6G of the sixth transistor M6.

The gate connection line M7GL corresponding to the seventh transistor M7 is located at a side in the first direction G of the fifth sub-active region Act_sub5 and extends along the second direction H, and is further connected to an end at a side in the first direction G of the first gate M7G1 of the seventh transistor M7 and the second gate M7G2 of the seventh transistor M7.

The gate connection line M8GL corresponding to the eighth transistor M8 is located at a side in the first direction G of the sixth sub-active region Act_sub6 and extends along the second direction H, and is further connected with an end at a side in the first direction G of the first gate M8G1 of the eighth transistor M8 and the second gate M8G2 of the eighth transistor M8.

The gate connection line M9GL corresponding to the ninth transistor M9 is located at a side in the first direction G of the first sub-active region Act_sub1 and extends along the second direction H, and is further connected to an end at a side in the first direction G of the first gate M9G1 of the ninth transistor M9 and the second gate M9G2 of the ninth transistor M9.

The gate connection line M10GL corresponding to the tenth transistor M10 is located at a side in the first direction G of the second sub-active region Act_sub2 and extends along the second direction H, and is further connected to an end at a side in the first direction G of the first gate M10G1 of the tenth transistor M10 and the second gate M10G2 of the tenth transistor M10.

The gate connection line M11GL corresponding to the eleventh transistor M11 is located at a side in the first direction G of the first sub-active region Act_sub1 and extends along the second direction H, and is further connected to an end at a side in the first direction G of the first gate M11G1 of the eleventh transistor M11 and the second gate M11G2 of the eleventh transistor M11.

The gate connection line M12GL corresponding to the twelfth transistor M12 is located at a side in the first direction G of the second sub-active region Act_sub2 and extends along the second direction H, and is further connected to an end at a side in the first direction G of the first gate M12G1 of the twelfth transistor M12 and the second gate M12G2 of the twelfth transistor M12.

The gate connection line M13GL corresponding to the thirteenth transistor M13 is located at a side in the first direction G of the fifth sub-active region Act_sub5 and extends along the second direction H, and is further connected to an end at a side in the first direction G of the first gate M13G1 of the thirteenth transistor M13 and the second gate M13G2 of the thirteenth transistor M13.

The gate connection line M14GL corresponding to the fourteenth transistor M14 is located at a side in the first direction G of the sixth sub-active region Act_sub6 and extends along the second direction H, and is further connected to an end at a side in the first direction G of the first gate M14G1 of the fourteenth transistor M14 and the second gate M14G2 of the fourteenth transistor M14.

In an embodiment of the present disclosure, referring to FIG. 13, the gate connection line M3GL corresponding to the third transistor M3 and the gate connection line M4GL corresponding to the fourth transistor M4 coincide and are the same lead. The drain connection line M5DL corresponding to the fifth transistor M5 and the drain connection line M6DL corresponding to the sixth transistor M6 coincide and are the same lead. Further, the fourth connection lead L04 extends along the second direction H, and is consistent with the extension directions of the gate connection line M3GL corresponding to the third transistor M3 and the gate connection line M4GL corresponding to the fourth transistor M4, and is further connected to an end in the first direction G of the drain connection line M5DL corresponding to the fifth transistor M5/the drain connection line M6DL corresponding to the sixth transistor M6. In this way, the drain connection line M5DL corresponding to the fifth transistor M5/the drain connection line M6DL corresponding to the sixth transistor M6, the fourth connection lead L04, the gate connection line M3GL corresponding to the third transistor M3/the gate connection line M4GL corresponding to the fourth transistor M4 form an L-shaped lead arranged along the first direction G and the second direction H.

Exemplarily, along the first direction G, the gate connection line M3GL corresponding to the third transistor M3/the gate connection line M4GL corresponding to the fourth transistor M4, and the fourth connection lead L04 are located between the sixth N-type doped sub-region F_Nsub6 and the third sub-active region Act_sub3, the fourth sub-active region Act_sub4, and further extend along the second direction H. An end in the second direction H of the fourth connection lead L04 is connected to the gate connection line M3GL corresponding to the third transistor M3/the gate connection line M4GL corresponding to the fourth transistor M4. An end in a direction opposite to the second direction H of the fourth connection lead L04 is connected to the drain connection line M5DL corresponding to the fifth transistor M5/the drain connection line M6DL corresponding to the sixth transistor M6.

In an embodiment of the present disclosure, referring to FIG. 13, the gate connection line M5GL corresponding to the fifth transistor M5 and the gate connection line M6GL corresponding to the sixth transistor M6 coincide and are the same lead. The drain connection line M3DL corresponding to the third transistor M3 and the drain connection line M4DL corresponding to the fourth transistor M4 coincide and are the same lead. Further, the third connection lead L03 extends along the second direction H, and is consistent with the extension direction of the gate connection line M5GL corresponding to the fifth transistor M5, and is further connected to an end at a side in a direction opposite to the first direction G of the drain connection line M3DL corresponding to the third transistor M3. In this way, the drain connection line M3DL corresponding to the third transistor M3/the drain connection line M4DL corresponding to the fourth transistor M4, the third connection lead L03, the gate connection line M5GL corresponding to the fifth transistor M5/the gate connection line M6GL corresponding to the sixth transistor M6 form an L-shaped lead arranged along the first direction G and the second direction H. Exemplarily, along the first direction G, the gate connection line M5GL corresponding to the fifth transistor M5/the gate connection line M6GL corresponding to the sixth transistor M6, and the third connection lead L03 are located between the fourth N-type doped sub-region F_Nsub4 and the third sub-active region Act_sub3, the fourth sub-active region Act_sub4, and extend along the second direction H. An end in the second direction H of the third connection lead L03 is connected to the drain connection line M3DL corresponding to the third transistor M3/the drain connection line M4DL corresponding to the fourth transistor M4. An end in a direction opposite to the second direction H of the third connection lead L03 is connected to the gate connection line M5GL corresponding to the fifth transistor M5/the gate connection line M6GL corresponding to the sixth transistor M6.

In an embodiment of the present disclosure, an end in a direction opposite to the second direction H of the gate connection line M9GL corresponding to the ninth transistor M9, the gate connection line M10GL corresponding to the tenth transistor M10, and the gate connection line M7GL corresponding to the seventh transistor M7 is provided with a transfer line extending along the first direction G. The transfer line of the gate connection line M9GL corresponding to the ninth transistor M9, the transfer line of the gate connection line M10GL corresponding to the tenth transistor M10, the transfer line of the gate connection line M7GL corresponding to the seventh transistor M7, the drain connection line M5DL corresponding to the fifth transistor M5/the drain connection line M6DL corresponding to the sixth transistor M6, and the drain connection line M1DL corresponding to the first transistor M1 are arranged along the first direction G in a straight line. The eleventh connection lead L11 is arranged in a straight line along the first direction G, and overlaps with the transfer line of the gate connection line M9GL corresponding to the ninth transistor M9, the transfer line of the gate connection line M10GL corresponding to the tenth transistor M10, the transfer line of the gate connection line M7GL corresponding to the seventh transistor M7, the drain connection line M5DL corresponding to the fifth transistor M5/the drain connection line M6DL corresponding to the sixth transistor M6, and the drain connection line M1DL corresponding to the first transistor M1. The eleventh connection lead L11 is respectively connected with the transfer line of the gate connection line M9GL corresponding to the ninth transistor M9, the transfer line of the gate connection line M10GL corresponding to the tenth transistor M10, the transfer line of the gate connection line M7GL corresponding to the seventh transistor M7, the gate connection line M8GL corresponding to the eighth transistor M8, the drain connection line M5DL corresponding to the fifth transistor M5/the drain connection line M6DL corresponding to the sixth transistor M6, and the drain connection line M1DL corresponding to the first transistor M1 through the second conductive pillar. Optionally, the eleventh connection lead L11 may also be provided with a transfer line extending toward the second direction H. The transfer line of the eleventh connection lead L11 overlaps with the gate connection line M8GL corresponding to the eighth transistor M8, and is connected to the gate connection line M8GL corresponding to the eighth transistor M8 through the second conductive pillar 352. In this way, the gate connection line M8GL corresponding to the eighth transistor M8 does not need to be provided with a transfer line. This helps to prevent the transfer line of the gate connection line M8GL corresponding to the eighth transistor M8 from occupying space in the first direction G, and reduce the area occupied by the line drive signal enhancement circuit 101 in an embodiment of the present disclosure.

In an embodiment of the present disclosure, an end in the second direction H of the gate connection line M11GL corresponding to the eleventh transistor M11, the gate connection line M12GL corresponding to the twelfth transistor M12, and the gate connection line M13GL corresponding to the thirteenth transistor M13 is provided with a transfer line extending along the first direction G. The transfer line of the gate connection line M11GL corresponding to the eleventh transistor M11, the transfer line of the gate connection line M12GL corresponding to the twelfth transistor M12, the transfer line of the gate connection line M13GL corresponding to the thirteenth transistor M13, the drain connection line M3DL corresponding to the third transistor M3/the drain connection line M4DL corresponding to the fourth transistor M4, and the drain connection line M2DL corresponding to the second transistor M2 are linearly arranged along the first direction G. The twelfth connection lead L12 is linearly arranged along the first direction G. The transfer line of the gate connection line M11GL corresponding to the eleventh transistor M11, the transfer line of the gate connection line M12GL corresponding to the twelfth transistor M12, and the transfer line of the gate connection line M13GL corresponding to the thirteenth transistor M13, the drain connection line M3DL corresponding to the third transistor M3/the drain connection line M4DL corresponding to the fourth transistor M4, and the drain connection line M2DL corresponding to the second transistor M2 overlap. The twelfth connection lead L12 is respectively connected to the transfer line of the gate connection line M11GL corresponding to the eleventh transistor M11, the transfer line of the gate connection line M12GL corresponding to the twelfth transistor M12, the transfer line of the gate connection line M13GL corresponding to the thirteenth transistor M13, the gate connection line M14GL corresponding to the fourteenth transistor M14, the drain connection line M3DL corresponding to the third transistor M3/the drain connection line M4DL corresponding to the fourth transistor M4, and the drain connection line M2DL corresponding to the second transistor M2 through the second conductive pillar 352. Optionally, the twelfth connection lead L12 may also be provided with a transfer line extending in a direction opposite to the second direction H. The transfer line of the twelfth connection lead L12 overlaps with the gate connection line M14GL corresponding to the fourteenth transistor M14, and is connected to the gate connection line M14GL corresponding to the fourteenth transistor M14 through the second conductive pillar 352. In this way, the gate connection line M14GL corresponding to the fourteenth transistor M14 does not need to be provided with a transfer line. This helps to prevent the transfer line of the gate connection line M14GL corresponding to the fourteenth transistor M14 from occupying space in the first direction G, and reducing the area occupied by the line drive signal enhancement circuit 101 in an embodiment of the present disclosure.

In some embodiments, referring to FIG. 13, the first connection lead L01 includes a first sub-lead L011, a second sub-lead L012 and a third sub-lead L013 connected in sequence. The first sub-lead L011 of the first connection lead L01 and the third sub-lead L013 of the first connection lead L01 extend along the first direction G, and at least partially overlap the N-type auxiliary doped region F_Ndummy. The second sub-lead L012 of the first connection lead L01 extends along the second direction H and at least partially overlaps with the N-type auxiliary doped region F_Ndummy. The first sub-active region Act_sub1 is located in a semi-open space surrounded by the first connection lead L01.

Exemplarily, the first connection lead L01 is located at a side in a direction opposite to the first direction G of the second connection lead L02. The extension direction of the first sub-lead L011 of the first connection lead L01 is consistent with the extension direction of the first N-type doped sub-region F_Nsub1, and both are in the first direction G and at least partially overlap. The extension direction of the second sub-lead L012 of the first connection lead L01 is the same as the extension direction of the second N-type doped sub-region F_Nsub2, and both are in the second direction H and at least partially overlap. The extension direction of the third sub-lead L013 of the first connection lead L01 is the same as the extension direction of the third N-type doped sub-region F_Nsub3, and both are in the second direction H and at least partially overlap. In this way, the first connection lead L01 forms a notch structure having an opening facing the first direction G, and the first sub-active region Act_sub1 is located in a space surrounded by the notch structure.

In one embodiment of the present disclosure, the first sub-lead L011 of the first connection lead L01, the second sub-lead L012 of the first connection lead L01, and the third sub-lead L013 of the first connection lead L01 are all connected to the N-type auxiliary doped region F_Ndummy. Specifically, the first sub-lead L011 of the first connection lead L01 is connected to the first N-type doped sub-region F_Nsub1 through a plurality of first conductive pillars 351 arranged in sequence along the first direction G. The second sub-lead L012 of the first connection lead L01 is connected to the second N-type doped sub-region F_Nsub2 through a plurality of first conductive pillars 351 arranged in sequence along the second direction H. The third sub-lead L013 of the first connection lead L01 is connected to the third N-type doped sub-region F_Nsub3 through a plurality of first conductive pillars 351 arranged in sequence along the first direction G. Optionally, the first sub-lead L011 of the first connection lead L01 is connected to the first N-type doped sub-region F_Nsub1 through two rows of first conductive pillars 351, and each row of first conductive pillars 351 includes a plurality of first conductive pillars 351 sequentially arranged along the first direction G. Optionally, the third sub-lead L013 of the first connection lead L01 is connected to the third N-type doped sub-region F_Nsub3 through two rows of first conductive pillars 351, and each row of first conductive pillars 351 includes a plurality of first conductive pillars 351 sequentially arranged along the first direction G.

In this way, the second power supply voltage V2 loaded on the first connecting lead L01 can be uniformly loaded on the N-type auxiliary doped region F_Ndummy overlapping with the first connection lead L01, thereby reducing the leakage of electricity of the ninth transistor M9 and the eleventh transistor M11. Further, the orthographic projection on the semiconductor substrate 310 of the first sub-lead L011 of the first connection lead L01 is located within the range of the first N-type doped sub-region F_Nsub1. The orthographic projection on the semiconductor substrate 310 of the second sub-lead L012 of the first connection lead L01 is located within the range of the second N-type doped sub-region F_Nsub2. The orthographic projection on the semiconductor substrate 310 of the third sub-lead L013 of the first connection lead L01 is located within the range of the third N-type doped sub-region F_Nsub3.

In an embodiment of the present disclosure, referring to FIG. 13, the first sub-lead L011 of the first connection lead L01 and the first sub-connection line M9SL1 of the source connection line corresponding to the ninth transistor M9 both extend along the first direction G. The local position of the first sub-lead L011 of the first connection lead L01 may also extend along the second direction H to form a protruding portion. The protruding portion of the first sub-lead L011 of the first connection lead L01 extends along the second direction H to connect with the first sub-connection line M9SL1 of the source connection line corresponding to the ninth transistor M9. Thus, a side in a direction opposite to the second direction H of the first sub-connection line M9SL1 of the source connection line corresponding to the ninth transistor M9 is connected to the first sub-lead L011 of the first connection lead L01. Further, an end in the first direction G of the protruding portion of the first sub-lead L011 of the first connection lead L01 is aligned with an end in the first direction G of the first sub-connection line M9SL1 of the source connection line corresponding to the ninth transistor M9. An end in a direction opposite to the first direction G of the protruding portion of the first sub-lead L011 of the first connection lead L01 is aligned with an end in a direction opposite to the first direction G of the first sub-connection line M9SL1 of the source connection line corresponding to the ninth transistor M9. In this way, the length in the first direction G of the protruding portion of the first sub-lead L011 of the first connection lead L01 is the same as the length in the first direction G of the first sub-connection line M9SL1 of the source connection line corresponding to the ninth transistor M9. The arrangement of the protruding portion of the first sub-lead L011 of the first connection lead L01 helps to make the first source M9S1LN of the ninth transistor M9 and the first sub-lead L011 of the first connection lead L01 forming an integrated structure.

In an embodiment of the present disclosure, referring to FIG. 13, the third sub-lead L013 of the first connection lead L01 and the first sub-connection line M11SL1 of the source connection line corresponding to the eleventh transistor M11 both extend along the first direction G. The local position of the third sub-lead L013 of the first connection lead L01 may also extend in a direction opposite to the second direction H to form a protruding portion. The protruding portion of the third sub-lead L013 of the first connection lead L01 extends along a direction opposite to the second direction H to connect with the first sub-connection line M11SL1 of the source connection line corresponding to the eleventh transistor M11. Thus, a side in the second direction H of the first sub-connection line M11SL1 of the source connection line corresponding to the eleventh transistor M11 is connected to the third sub-lead L013 of the first connection lead L01. Further, an end in the first direction G of the protruding portion of the third sub-lead L013 of the first connection lead L01 is aligned with an end in the first direction G of the first sub-connection line M11SL1 of the source connection line corresponding to the eleventh transistor M11. An end in a direction opposite to the first direction G of the protruding portion of the third sub-lead L013 of the first connection lead L01 is aligned with an end in a direction opposite to the first direction G of the first sub-connection line M11SL1 of the source connection line corresponding to the eleventh transistor M11. In this way, the length in the first direction G of the protruding portion of the third sub-lead L013 of the first connection lead L01 is the same as the length in the first direction G of the first sub-connection line M11SL1 of the source connection line corresponding to the eleventh transistor M11. The arrangement of the protruding portion of the third sub-lead L013 of the first connection lead L01 helps to make the first source M11S1LN of the eleventh transistor M11 and the third sub-lead L013 of the first connection lead L01 forming an integrated structure.

Optionally, referring to FIG. 13, the second connection lead L02 includes a first sub-lead L021, a second sub-lead L022 and a fourth sub-lead L024 connected in sequence, and further includes a third sub-lead L023. The first sub-lead L021 of the second connection lead L02 and the fourth sub-lead L024 of the second connection lead L02 both extend along the first direction G, and at least partially overlap with the P-type auxiliary doped region F_Pdummy. The second sub-lead L022 of the second connection lead L02 and the third sub-lead L023 of the second connection lead L02 both extend along the second direction H, and at least partially overlap with the P-type auxiliary doped region F_Pdummy. The second sub-active region Act_sub2 is located in a space surrounded by the first sub-lead L021 of the second connection lead L02, the second sub-lead L022 of the second connection lead L02 and the fourth sub-lead L024 of the second connection lead L02. The second active layer Act2 is located in a space surrounded by the first sub-lead L021 of the second connection lead L02, the second sub-lead L022 of the second connection lead L02, the third sub-lead L023 of the second connection lead L02, and the fourth sub-lead L024 of the second connection lead L02.

For example, referring to FIG. 13, the second connection lead L02 is located at a side in the first direction G of the first connection lead L01. The extension directions of the first sub-lead L021 of the second connection lead L02 and the first sub-lead L011 of the first connection lead L01 are consistent, and are not continuous with the first sub-lead L011 of the first connection lead L01. The part, close to an end in a direction opposite to the first direction G, of the first sub-lead L021 of the second connection lead L02 may at least partially overlap with the first N-type doped sub-region F_Nsub1. The part, close to an end in the first direction G, of the first sub-lead L021 of the second connection lead L02 may at least partially overlap with the fifth N-type doped sub-region F_Nsub5. The size in the second direction H of the overlapping portion between the first sub-lead L021 of the second connection lead L02 and the fifth N-type doped sub-region F_Nsub5 may be smaller than the size in the second direction H of the overlapping portion between the first sub-lead L021 of the second connection lead L02 and the first N-type doped sub-region F_Nsub1.

The extension directions of the fourth sub-lead L024 of the second connection lead L02 and the third sub-lead L013 of the first connection lead L01 are consistent and are not continuous with the third sub-lead L013 of the first connection lead L01. The part, close to an end in a direction opposite to the first direction G, of the fourth sub-lead L024 of the second connection lead L02 may at least partially overlap with the third N-type doped sub-region F_Nsub3. The part, close to an end in the first direction G, of the fourth sub-lead L024 of the second connection lead L02 may at least partially overlap with the seventh N-type doped sub-region F_Nsub7. The size in the second direction H of the overlapping portion between the fourth sub-lead L024 of the second connection lead L02 and the seventh N-type doped sub-region F_Nsub7 may be smaller than the size in the second direction H of the overlapping portion between the fourth sub-lead L024 of the second connection lead L02 and the third N-type doped sub-region F_Nsub3.

The second sub-lead L022 of the second connection lead L02 extends along the second direction H, and has both ends respectively connected to the first sub-lead L021 of the second connection lead L02 and the fourth sub-lead L024 of the second connection lead L02. The overlapping portion between the first sub-lead L021 of the second connection lead L02 and the first N-type doped sub-region F_Nsub1, as well as the overlapping portion between the fourth sub-lead L024 of the second connection lead L02 and the third N-type doped sub-region F_Nsub3, are both located at a side in a direction opposite to the first direction G of the second sub-lead L022 of the second connection lead L02. The overlapping portion between the first sub-lead L021 of the second connection lead L02 and the fifth N-type doped sub-region F_Nsub5, as well as the overlapping portion between the fourth sub-lead L024 of the second connection lead L02 and the seventh N-type doped sub-region F_Nsub7, are both located at a side in the first direction G of the second sub-lead L022 of the second connection lead L02. The second sub-lead L022 of the second connection lead L02 and the fourth N-type doped sub-region F_Nsub4 at least partially overlap.

The third sub-lead L023 of the second connection lead L02 extends along the second direction H, and has both ends respectively connected to the first sub-lead L021 of the second connection lead L02 and the fourth sub-lead L024 of the second connection lead L02. The first sub-lead L021 of the second connection lead L02, the fourth sub-lead L024 of the second connection lead L02, and the second sub-lead L022 of the second connection lead L02 are all located at a side in a direction opposite to the first direction G of the third sub-lead L023 of the second connection lead L02. The third sub-lead L023 of the second connection lead L02 may at least partially overlap with the sixth N-type doped sub-region F_Nsub6.

Referring to FIG. 13, the first sub-lead L021 of the second connection lead L02, the second sub-lead L022 of the second connection lead L02, and the fourth sub-lead L024 of the second connection lead L02 surround a space having an opening facing a direction opposite to the first direction G. The second sub-active region Act_sub2 may be located in such space. The first sub-lead L021 of the second connection lead L02, the second sub-lead L022 of the second connection lead L02, the fourth sub-lead L024 of the second connection lead L02, and the third sub-lead L023 of the second connection lead L02 surround a closed space, and the second active region Act2 may be located in the closed space.

In one embodiment of the present disclosure, the first sub-lead L021 of the second connection lead L02, the second sub-lead L022 of the second connection lead L02, the third sub-lead L023 of the second connection lead L02, and the fourth sub-lead L024 of the second connection lead L02 are all connected to the N-type auxiliary doped region F_Ndummy. Referring to FIGS. 12 to 14, the first sub-lead L021 of the second connection lead L02 is connected to the first N-type doped sub-region F_Nsub1 and the fifth N-type doped sub-region F_Nsub5 through a plurality of first conductive pillars 351 arranged in sequence along the first direction G. The second sub-lead L022 of the second connection lead L02 is connected to the fourth N-type doped sub-region F_Nsub4 through a plurality of first conductive pillars 351 arranged in sequence along the second direction H. The third sub-lead L023 of the second connection lead L02 is connected to the sixth N-type doped sub-region F_Nsub6 through a plurality of first conductive pillars 351 arranged in sequence along the second direction H. The fourth sub-lead L024 of the second connection lead L02 is connected to the third N-type doped sub-region F_Nsub3 and the seventh N-type doped sub-region F_Nsub7 through a plurality of first conductive pillars 351 arranged in sequence along the first direction G. Optionally, the first sub-lead L021 of the second connection lead L02 is connected to the first N-type doped sub-region F_Nsub1 through two rows of first conductive pillars 351. Each row of first conductive pillars 351 includes a plurality of first conductive pillars 351 sequentially arranged along the first direction G. Optionally, the fourth sub-lead L024 of the second connection lead L02 is connected to the third N-type doped sub-region F_Nsub3 through two rows of first conductive pillars 351. Each row of first conductive pillars 351 includes a plurality of first conductive pillars 351 sequentially arranged along the first direction G. In this way, the second power supply voltage V2 loaded on the second connection lead L02 can be evenly loaded on the N-type auxiliary doped region F_Ndummy overlapping with the third connection lead L03, thereby reducing the leakage of electricity of the tenth transistor M10, the twelfth transistor M12, the fourth transistor M4 and the fifth transistor M5.

In an embodiment of the present disclosure, referring to FIG. 13, the first sub-lead L021 of the second connection lead L02 and the first sub-connection line M10SL1 of the source connection line corresponding to the tenth transistor M10 both extend along the first direction G. The local position of the first sub-lead L021 of the second connection lead L02 may also extend along the second direction H to form a first protruding portion. The first protruding portion of the first sub-lead L021 of the second connection lead L02 extends along the second direction H to connect with the first sub-connection line M10SL1 of the source connection line corresponding to the tenth transistor M10. Thus, a side in a direction opposite to the second direction H of the first sub-connection line M10SL1 of the source connection line corresponding to the tenth transistor M10 is connected to the first sub-lead L021 of the second connection lead L02. Further, an end in the first direction G of the first protruding portion of the first sub-lead L021 of the second connection lead L02 is aligned with an end in the first direction G of the first sub-connection line M10SL1 of the source connection line corresponding to the tenth transistor M10. An end in a direction opposite to the first direction G of the first protruding portion of the first sub-lead L021 of the second connection lead L02 is aligned with an end in a direction opposite to the first direction G of the first sub-connection line M10SL1 of the source connection line corresponding to the tenth transistor M10. In this way, the length in the first direction G of the first protruding portion of the first sub-lead L021 of the second connection lead L02 is the same as the length in the first direction G of the first sub-connection line M10SL1 of the source connection line corresponding to the tenth transistor M10. The arrangement of the first protruding portion of the first sub-lead L021 of the second connection lead L02 helps to make the first source M10S1LN of the tenth transistor M10 and the first sub-lead L021 of the second connection lead L02 forming an integrated structure.

In an embodiment of the present disclosure, referring to FIG. 13, the fourth sub-lead L024 of the second connection lead L02 and the first sub-connection line M12SL1 of the source connection line corresponding to the twelfth transistor M12 both extend along the first direction G. The local position of the fourth sub-lead L024 of the second connection lead L02 may also extend along a direction opposite to the second direction H to form a first protruding portion. The first protruding portion of the fourth sub-lead L024 of the second connection lead L02 extends along a direction opposite to the second direction H to connect with the first sub-connection line M12SL1 of the source connection line corresponding to the twelfth transistor M12. Thus, a side in the second direction H of the first sub-connection line M12SL1 of the source connection line corresponding to the twelfth transistor M12 is connected to the fourth sub-lead L024 of the second connection lead L02. Further, an end in the first direction G of the first protruding portion of the fourth sub-lead L024 of the second connection lead L02 is aligned with an end in the first direction G of the first sub-connection line M12SL1 of the source connection line corresponding to the twelfth transistor M12. An end in a direction opposite to the first direction G of the first protruding portion of the fourth sub-lead L024 of the second connection lead L02 is aligned with an end in a direction opposite to the first direction G of the first sub-connection line M12SL1 of the source connection line corresponding to the twelfth transistor M12. In this way, the length in the first direction G of the first protruding portion of the fourth sub-lead L024 of the second connection lead L02 is the same as the length in the first direction G of the first sub-connection line M12SL1 of the source connection line corresponding to the twelfth transistor M12. The arrangement of the first protruding portion of the fourth sub-lead L024 of the second connection lead L02 helps to make the first source M12S1LN of the twelfth transistor M12 and the fourth sub-lead L024 of the second connection lead L02 forming an integral structure.

In some embodiments, referring to FIG. 13, the third connection lead L03, the fourth connection lead L04, the drain connection line M3DL corresponding to the third transistor M3/the drain connection line M4DL corresponding to the fourth transistor M4, the gate connection line M3GL corresponding to the third transistor M3/the gate connection line M4GL corresponding to the fourth transistor M4, the drain connection line M5DL corresponding to the fifth transistor M5/the drain connection line M6DL corresponding to the sixth transistor M6, the gate connection line M5GL corresponding to the fifth transistor M5/the gate connection line M6GL corresponding to the sixth transistor M6, the sixth connection lead L06, the source connection line M5SL corresponding to the fifth transistor M5, the source connection line M6SL corresponding to the sixth transistor M6, the source connection line M3SL corresponding to the third transistor M3, and the source connection line M4SL corresponding to the fourth transistor M4 are all located in a closed space surrounded by the first sub-lead L021 of the second connection lead L02, the second sub-lead L022 of the second connection lead L02, the fourth sub-lead L024 of the second connection lead L02 and the third sub-lead L023 of the second connection lead L02.

Optionally, the widths of the third connection lead L03 and the fourth connection lead L04 are the same as the width of the drain connection line corresponding to each transistor.

In an embodiment of the present disclosure, referring to FIG. 13, the first sub-lead L021 of the second connection lead L02 and the source connection line M5SL corresponding to the fifth transistor M5 both extend along the first direction G. The local position of the first sub-lead L021 of the second connection lead L02 may also extend along the second direction H to form a second protruding portion. The second protruding portion of the first sub-lead L021 of the second connection lead L02 extends along the second direction H to connect with the source connection line M5SL corresponding to the fifth transistor M5. Thus, a side in a direction opposite to the second direction H of the source connection line M5SL corresponding to the fifth transistor M5 is connected to the first sub-lead L021 of the second connection lead L02. Further, an end in the first direction G of the second protruding portion of the first sub-lead L021 of the second connection lead L02 is aligned with an end in the first direction G of the source connection line M5SL corresponding to the fifth transistor M5. An end in a direction opposite to the first direction G of the second protruding portion of the first sub-lead L021 of the second connection lead L02 is aligned with an end in a direction opposite to the first direction G of the source connection line M5SL corresponding to the fifth transistor M5. In this way, the length in the first direction G of the second protruding portion of the first sub-lead L021 of the second connection lead L02 is the same as the length in the first direction G of the source connection line M5SL corresponding to the fifth transistor M5. The arrangement of the second protruding portion of the first sub-lead L021 of the second connection lead L02 helps to make the source connection line M5SL corresponding to the fifth transistor M5 and the first sub-lead L021 of the second connection lead L02 forming an integrated structure.

In an embodiment of the present disclosure, referring to FIG. 13, the sixth connection lead L06 and the source connection line M6SL corresponding to the sixth transistor M6 both extend along the first direction G. At least a local position of the sixth connection lead L06 may also extend along a direction opposite to the second direction H to form a first protruding portion. The first protruding portion of the sixth connection lead L06 extends along a direction opposite to the second direction H to connect with the source connection line M6SL corresponding to the sixth transistor M6. Thus, a side in the second direction H of the source connection line M6SL corresponding to the sixth transistor M6 is connected to the sixth connection lead L06. Further, an end in the first direction G of the first protruding portion of the sixth connection lead L06 is aligned with an end in the first direction G of the source connection line M6SL corresponding to the sixth transistor M6. An end in a direction opposite to the first direction G of the first protruding portion of the sixth connection lead L06 is aligned with an end in a direction opposite to the first direction G of the source connection line M6SL corresponding to the sixth transistor M6. In this way, the length in the first direction G of the first protruding portion of the sixth connection lead L06 is the same as the length in the first direction G of the source connection line M6SL corresponding to the sixth transistor M6. The arrangement of the first protruding portion of the sixth connection lead L06 helps to make the source connection line M6SL corresponding to the sixth transistor M6 and the sixth connection lead L06 forming an integral structure.

In an embodiment of the present disclosure, referring to FIG. 13, the sixth connection lead L06 and the source connection line M3SL corresponding to the third transistor M3 both extend along the first direction G. At least a local position of the sixth connection lead L06 may also extend along the second direction H to form a second protruding portion. The second protruding portion of the sixth connection lead L06 extends along the second direction H to connect with the source connection line M3SL corresponding to the third transistor M3. Thus, a side in a direction opposite to the second direction H of the source connection line M3SL corresponding to the third transistor M3 is connected to the sixth connection lead L06. Further, an end in the first direction G of the second protruding portion of the sixth connection lead L06 is aligned with an end in the first direction G of the source connection line M3SL corresponding to the third transistor M3. An end in a direction opposite to the first direction G of the second protruding portion of the sixth connection lead L06 is aligned with an end in a direction opposite to the first direction G of the source connection line M3SL corresponding to the third transistor M3. In this way, the length in the first direction G of the second protruding portion of the sixth connection lead L06 is the same as the length in the first direction G of the source connection line M3SL corresponding to the third transistor M3. The arrangement of the second protruding portion of the sixth connection lead L06 helps to make the source connection line M3SL corresponding to the third transistor M3 and the sixth connection lead L06 forming an integral structure.

Optionally, the width of the sixth connection lead L06 is greater than the width of the source connection line corresponding to each transistor.

Optionally, referring to FIG. 13, the sixth connection lead L06 extends along the axis of the first direction G, and has an extension direction coinciding with the axis along the first direction G of the second sub-connection line M10SL2 of the source connection line corresponding to the tenth transistor M10/the second sub-connection line M12SL2 of the source connection line corresponding to the twelfth transistor M12.

In an embodiment of the present disclosure, referring to FIG. 13, the fourth sub-lead L024 of the second connection lead L02 and the source connection line M4SL corresponding to the fourth transistor M4 both extend along the first direction G. The local position of the fourth sub-lead L024 of the second connection lead L02 may also extend along a direction opposite to the second direction H to form a second protruding portion. The second protruding portion of the fourth sub-lead L024 of the second connection lead L02 extends along a direction opposite to the second direction H to connect with the source connection line M4SL corresponding to the fourth transistor M4. Thus, a side in the second direction H of the source connection line M4SL corresponding to the fourth transistor M4 is connected to the fourth sub-lead L024 of the second connection lead L02. Further, an end in the first direction G of the second protruding portion of the fourth sub-lead L024 of the second connection lead L02 is aligned with an end in the first direction G of the source connection line M4SL corresponding to the fourth transistor M4. An end in a direction opposite to the first direction G of the second protruding portion of the fourth sub-lead L024 of the second connection lead L02 is aligned with an end in a direction opposite to the first direction G of the source connection line M4SL corresponding to the fourth transistor M4. In this way, the length in the first direction G of the second protruding portion of the fourth sub-lead L024 of the second connection lead L02 is the same as the length in the first direction G of the source connection line M4SL corresponding to the fourth transistor M4. The arrangement of the second protruding portion of the fourth sub-lead L024 of the second connection lead L02 helps to make the source connection line M4SL corresponding to the fourth transistor M4 and the fourth sub-lead L024 of the second connection lead L02 forming an integrated structure.

Figure 15:
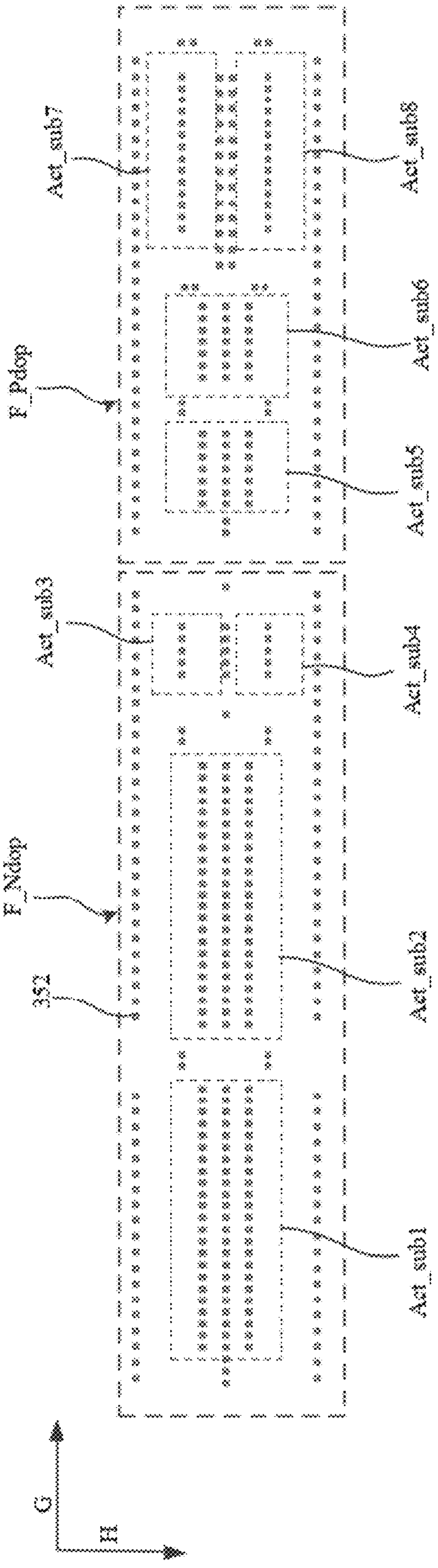
FIG. 15 is a schematic structural diagram of each second conductive pillar in the second dielectric layer in the line drive signal enhancement area according to an embodiment of the present disclosure.
Figure 16:
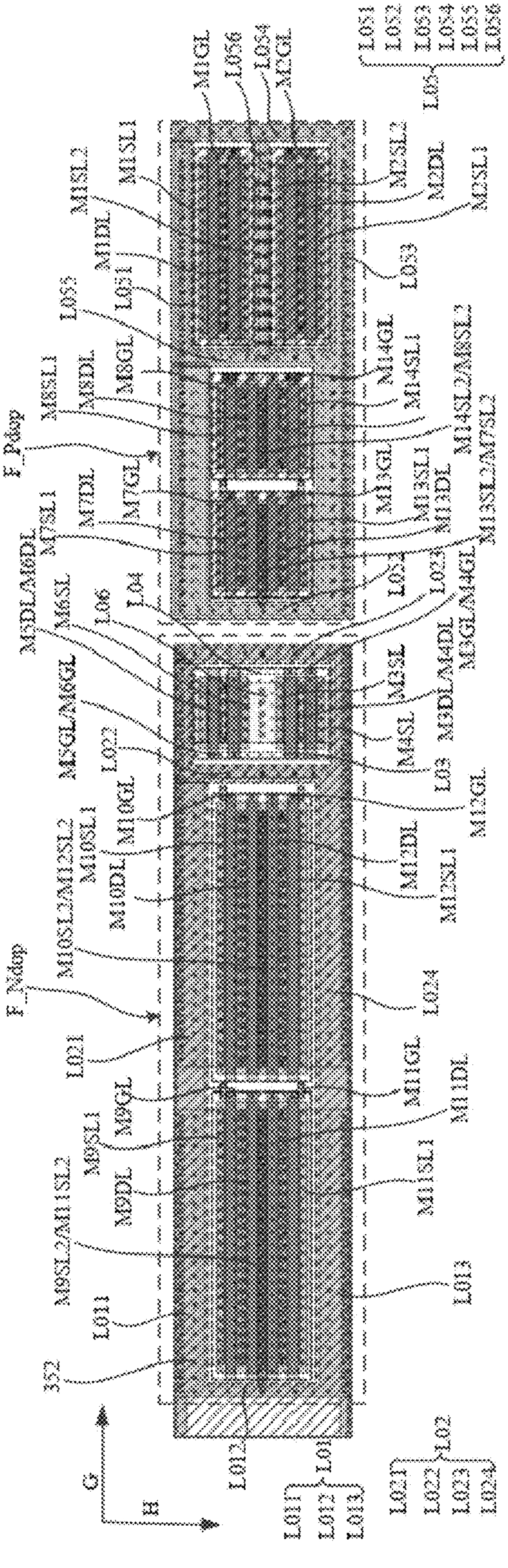
FIG. 16 is a schematic structural diagram of the P-type doped region, the N-type doped region, each active region, the gate layer, the first conductive pillar, the first metal wiring layer, and the second conductive pillar in the line drive signal enhancement area according to an embodiment of the present disclosure.

In some embodiments, referring to FIG. 15, the fifth connection lead L05 includes a first sub-lead L051, a second sub-lead L052, a third sub-lead L053, and a fourth sub-lead L054 connected in sequence, and further includes a fifth sub-lead L055 and a sixth sub-lead L056.

The first sub-lead L051 of the fifth connection lead L05, the third sub-lead L053 of the fifth connection lead L05, and the sixth sub-lead L056 of the fifth connection lead L05 all extend along the first direction G, and at least partially overlap with the P-type auxiliary doped regions F_Pdummy.

The sixth sub-lead L056 of the fifth connection lead L05 is located between the first sub-lead L051 of the fifth connection lead L05 and the third sub-lead L053 of the fifth connection lead L05, and has both ends respectively connected to the fifth sub-lead L055 of the fifth connection lead L05 and the fourth sub-lead L054 of the fifth connection lead L05. The second sub-lead L052 of the fifth connection lead L05, the fourth sub-lead L054 of the fifth connection lead L05, and the fifth sub-lead L055 of the fifth connection lead L05 all extend along the second direction H, and at least partially overlap with the P-type auxiliary doped region F_Pdummy. The fifth sub-lead L055 of the fifth connection lead L05 is located between the second sub-lead L052 of the fifth connection lead L05 and the fourth sub-lead L054 of the fifth connection lead L05, and has both ends respectively connected to the first sub-lead L051 of the fifth connection lead L05 and the third sub-lead L053 of the fifth connection lead L05. The first sub-lead L051 to the sixth sub-lead L056 of the fifth connection lead L05 are all connected to the P-type auxiliary doped region F_Pdummy. The third active region Act3 is located in a space surrounded by the first sub-lead L051 of the fifth connection lead L05, the first sub-lead L052 of the fifth connection lead L05, the third sub-lead L053 of the fifth connection lead L05, and the fifth sub-lead L053 of the fifth connection lead L05. The seventh sub-active region Act_sub7 is located in a space surrounded by the first sub-lead L051 of the fifth connection lead L05, the first sub-lead L055 of the fifth connection lead L05, the sixth sub-lead L056 of the fifth connection lead L05 and the fourth sub-lead L054 of the fifth connection lead L05. The eighth sub-active region Act_sub8 is located in a space surrounded by the sixth sub-lead L056 of the fifth connection lead L05, the first sub-lead L055 of the fifth connection lead L05, the third sub-lead L053 of the fifth connection lead L05, and the fourth sub-lead L054 of the fifth connection lead L05.

Further, referring to FIG. 13, the gate connection line M7GL corresponding to the seventh transistor M7 and the gate connection line M13GL corresponding to the thirteenth transistor M13 are located in a space surrounded by the first sub-lead L051 of the fifth connection lead L05, the second sub-lead L052 of the fifth connection lead L05, the third sub-lead L053 of the fifth connection lead L05, and the fifth sub-lead L055 of the fifth connection lead L05, and is further located between the fifth sub-active region Act_sub5 and the sixth sub-active region Act_sub6. The gate connection line M8GL corresponding to the eighth transistor M8 and the gate connection line M14GL corresponding to the fourteenth transistor M14 are located in a space surrounded by the first sub-lead L051 of the fifth connection lead L05, the second sub-lead L052 of the fifth connection lead L05, the third sub-lead L053 of the fifth connection lead L05 and the fifth sub-lead L055 of the fifth connection lead L05, and is further located between the sixth sub-active region Act_sub6 and the fifth sub-lead L055 of the fifth connection lead L05.

Further, referring to FIG. 13, the gate connection line MIGL corresponding to the first transistor M1 is located in a space surrounded by the first sub-lead L051 of the fifth connection lead L05, the fifth sub-lead L055 of the fifth connection lead L05, the sixth sub-lead L056 of the fifth connection lead L05, and the fourth sub-lead L054 of the fifth connection lead L05, and is further located between the seventh sub-active region Act_sub7 and the fourth sub-lead L054 of the fifth connection lead L05. The gate connection line M2GL corresponding to the second transistor M2 is located in a space surrounded by the third sub-lead L053 of the fifth connection lead L05, the fifth sub-lead L055 of the fifth connection lead L05, the sixth sub-lead L056 of the fifth connection lead L05, and the fourth sub-lead L054 of the fifth connection lead L05, and is further located between the eighth sub-active region Act_sub8 and the fourth sub-lead L054 of the fifth connection lead L05.

In an embodiment of the present disclosure, referring to FIG. 13, the first sub-lead L051 of the fifth connection lead L05 extends along the first direction G, and has the extension direction consistent with the extension directions of the first P-type doped sub-region F_Psub1 and the fifth P-type doped sub-region F_Psub5. The first sub-lead L051 of the fifth connection lead L05 includes a first portion located at a side in the first direction G and a second portion located at a side in a direction opposite to the first direction G. The first portion of the first sub-lead L051 of the fifth connection lead L05 overlaps with the fifth P-type doped sub-region F_Psub5, and is electrically connected by a plurality of first conductive pillars 351 arranged in sequence along the first direction G. The second portion of the first sub-lead L051 of the fifth connection lead L05 overlaps with the first P-type doped sub-region F_Psub1, and is electrically connected through a plurality of first conductive pillars 351 arranged in sequence along the first direction G. Further, referring to FIG. 12, the second portion of the first sub-lead L051 of the fifth connection lead L05 and the first P-type doped sub-region F_Psub1 are electrically connected through two rows of first conductive pillars 351. Each row of first conductive pillars 351 includes a plurality of first conductive pillars 351 arranged in sequence along the first direction G. Further, referring to FIG. 13, the connection position between the first portion and the second portion of the first sub-lead L051 of the fifth connection lead L05 is connected to an end in a direction opposite to the second direction H of the fifth sub-lead L055 of the fifth connection lead L05.

In an embodiment of the present disclosure, referring to FIG. 13, the second portion of the first sub-lead L051 of the fifth connection lead L05 and the first sub-connection line M7SL1 of the source connection line corresponding to the seventh transistor M7 both extend along the first direction G. The local position of the second portion of the first sub-lead L051 of the fifth connection lead L05 may also extend along the second direction H to form a first protruding portion. T first protruding portion of the first sub-lead L051 of the fifth connection lead L05 extends along the second direction H to connect with the first sub-connection line M7SL1 of the source connection line corresponding to the seventh transistor M7. Thus, a side in a direction opposite to the second direction H of the first sub-connection line M7SL1 of the source connection line corresponding to the seventh transistor M7 is connected to the second portion of the first sub-lead L051 of the fifth connection lead L05. Further, an end in the first direction G of the first protruding portion of the first sub-lead L051 of the fifth connection lead L05 is aligned with an end in the first direction G of the first sub-connection line M7SL1 of the source connection line corresponding to the seventh transistor M7. An end in a direction opposite to the first direction G of the first protruding portion of the first sub-lead L051 of the fifth connection lead L05 is aligned with an end in a direction opposite to the first direction G of the first sub-connection line M7SL1 of the source connection line corresponding to the seventh transistor M7. In this way, the length in the first direction G of the first protruding portion of the first sub-lead L051 of the fifth connection lead L05 is the same as the length in the first direction G of the first sub-connection line M7SL1 of the source connection line corresponding to the seventh transistor M7. The arrangement of the first protruding portion of the first sub-lead L051 of the fifth connection lead L05 helps to make the first sub-connection line M7SL1 of the source connection line corresponding to the seventh transistor M7 and the second portion of the first sub-connection line L051 of the fifth connection lead L05 forming an integrated structure.

In an embodiment of the present disclosure, referring to FIG. 13, the second portion of the first sub-lead L051 of the fifth connection lead L05 and the first sub-connection line M8SL1 of the source connection line corresponding to the eighth transistor M8 both extend along the first direction G. The local position of the second portion of the first sub-lead L051 of the fifth connection lead L05 may also extend along the second direction H to form a second protruding portion. T second protruding portion of the first sub-lead L051 of the fifth connection lead L05 extends along the second direction H to connect with the first sub-connection line M8SL1 of the source connection line corresponding to the eighth transistor M8. Thus, a side in a direction opposite to the second direction H of the first sub-connection line of the source connection line corresponding to the eighth transistor M8 is connected to the second portion of the first sub-lead L051 of the fifth connection lead L05. Further, an end in the first direction G of the second protruding portion of the first sub-lead L051 of the fifth connection lead L05 is aligned with an end in the first direction G of the first sub-connection line M8SL1 of the source connection line corresponding to the eighth transistor M8. An end in a direction opposite to the first direction G of the second protruding portion of the first sub-lead L051 of the fifth connection lead L05 is aligned with an end in a direction opposite to the first direction G of the first sub-connection line M8SL1 of the source connection line corresponding to the eighth transistor M8. In this way, the length in the first direction G of the second protruding portion of the first sub-lead L051 of the fifth connection lead L05 is the same as the length in the first direction G of the first sub-connection line M8SL1 of the source connection line corresponding to the eighth transistor M8. The arrangement of the second protruding portion of the first sub-lead L051 of the fifth connection lead L05 helps to make the first sub-connection line M8SL1 of the source connection line corresponding to the eighth transistor M8 and the second portion of the first sub-lead L051 of the fifth connection lead L05 forming an integrated structure.

In an embodiment of the present disclosure, referring to FIG. 13, the first portion of the first sub-lead L051 of the fifth connection lead L05 and the first sub-connection line M1SL1 of the source connection line corresponding to the first transistor M1 both extend along the first direction G. The local position of the first portion of the first sub-lead L051 of the fifth connection lead L05 may also extend along the second direction H to form a third protruding portion. The third protruding portion of the first sub-lead L051 of the fifth connection lead L05 extends along the second direction H to connect with the first sub-connection line M1SL1 of the source connection line corresponding to the first transistor M1. Thus, a side in a direction opposite to the second direction H of the first sub-connection line M1SL1 of the source connection line corresponding to the first transistor M1 is connected to the first portion of the first sub-lead L051 of the fifth connection lead L05. Further, an end in the first direction G of the third protruding portion of the first sub-lead L051 of the fifth connection lead L05 is aligned with an end in the first direction G of the first sub-connection line M1SL1 of the source connection line corresponding to the first transistor M1. An end in a direction opposite to the first direction G of the third protruding portion of the first sub-lead L051 of the fifth connection lead L05 is connected to the fifth sub-lead L055 of the fifth connection lead L05. In this way, the third protruding portion of the first sub-lead L051 of the fifth connection lead L05 protrudes beyond the first sub-connection line M1SL1 of the source connection line corresponding to the first transistor M1 in a direction opposite to the first direction G. The arrangement of the third protruding portion of the first sub-lead L051 of the fifth connection lead L05 helps to make the first sub-connection line M1SL1 of the source connection line corresponding to the first transistor M1 and the first portion of the first sub-lead L051 of the fifth connection lead L05 forming an integrated structure.

In an embodiment of the present disclosure, referring to FIG. 13, the second sub-lead L052 of the fifth connection lead L05 extends along the second direction H, and has an extension direction consistent with the extension direction of the second P-type doped sub-region F_Psub2, both of which can overlap. The second sub-lead L052 of the fifth connection lead L05 is electrically connected to the second P-type doped sub-region F_Psub2 through a plurality of first conductive pillars 351 arranged in sequence along the second direction H.

Optionally, the second sub-connection line M7SL2 of the source connection line corresponding to the seventh transistor M7 and the second sub-connection line M13SL2 of the source connection line corresponding to the thirteenth transistor M13 overlap, and extend along a direction opposite to the first direction G to connect with the second sub-lead L052 of the fifth connection lead L05.

In one embodiment of the present disclosure, referring to FIG. 13, the third sub-lead L053 of the fifth connection lead L05 extends along the first direction G, and has an extension direction being consistent with the extension directions of the third P-type doped sub-region F_Psub3 and the seventh P-type doped sub-region F_Psub7. The third sub-lead L053 of the fifth connection lead L05 includes a first portion located at a side in the first direction G and a second portion located at a side in a direction opposite to the first direction G. The first portion of the third sub-lead L053 of the fifth connection lead L05 overlaps with the seventh P-type doped sub-region F_Psub7, and is electrically connected therewith through a plurality of first conductive pillars 351 arranged in sequence along the first direction G. The second portion of the third sub-lead L053 of the fifth connection lead L05 and the third P-type doped sub-regions F_Psub3 overlap and are electrically connected through a plurality of first conductive pillars 351 arranged in sequence along the first direction G. Further, the second portion of the third sub-lead L053 of the fifth connection lead L05 and the third P-type doped sub-region F_Psub3 are electrically connected through two rows of first conductive pillars 351. Any row of first conductive pillars 351 includes a plurality of first conductive pillars 351 arranged in sequence in the first direction G. Further, referring to FIG. 13, the connection position between the first portion and the second portion of the third sub-lead L053 of the fifth connection lead L05 is connected to an end in the second direction H of the fifth sub-lead L055 of the fifth connection lead L05.

In an embodiment of the present disclosure, referring to FIG. 13, the second portion of the third sub-lead L053 of the fifth connection lead L05 and the first sub-connection line M13SL1 of the source connection line corresponding to the thirteenth transistor M13 both extend along the first direction G. The local position of the second portion of the third sub-lead L053 of the fifth connection lead L05 may also extend in a direction opposite to the second direction H to form a first protruding portion. The first protruding portion of the third sub-lead L053 of the fifth connection lead L05 extends along a direction opposite to the second direction H to connect with the first sub-connection line M13SL1 of the source connection line corresponding to the thirteenth transistor M13. Thus, a side in the second direction H of the first sub-connection line M13SL1 of the source connection line corresponding to the thirteenth transistor M13 is connected to the second portion of the third sub-lead L053 of the fifth connection lead L05. Further, an end in the first direction G of the first protruding portion of the third sub-lead L053 of the fifth connection lead L05 is aligned with an end in the first direction G of the first sub-connection line M13SL1 of the source connection line corresponding to the thirteenth transistor M13. An end in a direction opposite to the first direction G of the first protruding portion of the third sub-lead L053 of the fifth connection lead L05 is aligned with an end in a direction opposite to the first direction G of the first sub-connection line M13SL1 of the source connection line corresponding to the thirteenth transistor M13. In this way, the length in the first direction G of the first protruding portion of the third sub-lead L053 of the fifth connection lead L05 is the same as the length in the first direction G of the first sub-connection line M13SL1 of the source connection line corresponding to the thirteenth transistor M13. The arrangement of the first protruding portion of the third sub-lead L053 of the fifth connection lead L05 helps to make the first sub-connection line M13SL1 of the source connection line corresponding to the thirteenth transistor M13 and the second portion of the third sub-lead L053 of the fifth connection lead L05 forming an integrated structure.

In an embodiment of the present disclosure, referring to FIG. 13, the second portion of the third sub-lead L053 of the fifth connection lead L05 and the first sub-connection line M14SL1 of the source connection line corresponding to the fourteenth transistor M14 both extend along the first direction G. The local position of the second portion of the third sub-lead L053 of the fifth connection lead L05 may also extend along a direction opposite to the second direction H to form a second protruding portion. The second protruding portion of the third sub-lead L053 of the fifth connection lead L05 extends in a direction opposite to the second direction H to connect with the first sub-connection line M14SL1 of the source connection line corresponding to the fourteenth transistor M14. Thus, a side in the second direction H of the first sub-connection line M14SL1 of the source connection line corresponding to the fourteenth transistor M14 is connected to the second portion of the third sub-lead L053 of the fifth connection lead L05. Further, an end in the first direction G of the second protruding portion of the third sub-lead L053 of the fifth connection lead L05 is aligned with an end in the first direction G of the first sub-connection line M14SL1 of the source connection line corresponding to the fourteenth transistor M14. An end in a direction opposite to the first direction G of the second protruding portion of the third sub-lead L053 of the fifth connection lead L05 is aligned with an end in a direction opposite to the first direction G of the first sub-connection line M14SL1 of the source connection line corresponding to the fourteenth transistor M14. In this way, the length in the first direction G of the second protruding portion of the third sub-lead L053 of the fifth connection lead L05 is the same as the length in the first direction G of the first sub-connection line M14SL1 of the source connection line corresponding to the fourteenth transistor M14. The arrangement of the second protruding portion of the third sub-lead L053 of the fifth connection lead L05 helps to make the first sub-connection line M14SL1 of the source connection line corresponding to the fourteenth transistor M14 and the second portion of the third sub-lead L053 of the fifth connection lead L05 forming an integrated structure.

In an embodiment of the present disclosure, referring to FIG. 13, the first portion of the third sub-lead L053 of the fifth connection lead L05 and the first sub-connection line M2SL1 of the source connection line corresponding to the second transistor M2 both extend along the first direction G. The local position of the first portion of the third sub-lead L053 of the fifth connection lead L05 may also extend along a direction opposite to the second direction H to form a third protruding portion. The third protruding portion of the third sub-lead L053 of the fifth connection lead L05 extends along a direction opposite to the second direction H to connect with the first sub-connection line M2SL1 of the source connection line corresponding to the second transistor M2. Thus, a side in the second direction H of the first sub-connection line M2SL1 of the source connection line corresponding to the second transistor M2 is connected to the first portion of the third sub-lead L053 of the fifth connection line L05. Further, an end in the first direction G of the third protruding portion of the third sub-lead L053 of the fifth connection lead L05 is aligned with an end in the first direction G of the first sub-connection line M2SL1 of the source connection line corresponding to the second transistor M2. An end in a direction opposite to the first direction G of the third protruding portion of the third sub-lead L053 of the fifth connection lead L05 is connected to the fifth sub-lead L055 of the fifth connection lead L05. In this way, the third protruding portion of the third sub-lead L053 of the fifth connection lead L05 extends beyond the first sub-connection line M2SL1 of the source connection line corresponding to the second transistor M2 in a direction opposite to the first direction G. The arrangement of the third protruding portion of the third sub-lead L053 of the fifth connection lead L05 helps to make the first sub-connection line M2SL1 of the source connection line corresponding to the second transistor M2 and the first portion of the third sub-lead L053 of the fifth connection lead L05 forming an integrated structure.

In an embodiment of the present disclosure, referring to FIG. 13, the fourth sub-lead L054 of the fifth connection lead L05 extends along the second direction H, and has an extension direction consistent with the extension direction of the sixth P-type doped sub-region F_Psub6, both of which may overlap. The fourth sub-lead L054 of the fifth connection lead L05 is electrically connected to the sixth P-type doped sub-region F_Psub6 through a plurality of first conductive pillars 351 arranged in sequence along the second direction H. Further, an end in the first direction G of the sixth sub-lead L056 of the fifth connection lead L05 is connected to the middle position of the fourth sub-lead L054 of the fifth connection lead L05. In this way, the areas of the seventh sub-active region Act_sub7 and the eighth sub-active region Act_sub8 may be substantially the same.

In an embodiment of the present disclosure, referring to FIG. 13, the fifth sub-lead L055 of the fifth connection lead L05 extends along the second direction H, and has an extension direction consistent with the extension direction of the fourth P-type doped sub-region F_Psub4, both of which are may overlap. The fifth sub-lead L055 of the fifth connection lead L05 is electrically connected to the fourth P-type doped sub-region F_Psub4 through a plurality of first conductive pillars 351 arranged in sequence along the second direction H. Further, an end in a direction opposite to the first direction G of the sixth sub-lead L056 of the fifth connection lead L05 is connected to the middle position of the fifth sub-lead L055 of the fifth connection lead L05. In this way, the areas of the seventh sub-active region Act_sub7 and the eighth sub-active region Act_sub8 may be substantially the same.

In one embodiment of the present disclosure, the sixth sub-lead L056 of the fifth connection lead L05 extends along the first direction G, and has an extension direction consistent with the extension direction of the eighth P-type doped sub-region F_Psub8, and the two may overlap. The sixth sub-lead L056 of the fifth connection lead L05 is electrically connected to the eighth P-type doped sub-region F_Psub8 through a plurality of first conductive pillars 351 arranged in sequence along the first direction G.

In one embodiment of the present disclosure, referring to FIG. 13, the sixth sub-lead L056 of the fifth connection lead L05 and the second sub-connection line M1SL2 of the source connection line corresponding to the first transistor M1 both extend along the first direction G. At least a local position of the sixth sub-lead L056 of the fifth connection lead L05 may also extend in a direction opposite to the second direction H to form a first protruding portion. The first protruding portion of the sixth sub-lead L056 of the fifth connection lead L05 extends in a direction opposite to the second direction H to connect with the second sub-connection line M1SL2 of the source connection line corresponding to the first transistor M1. Thus, a side in the second direction H of the second sub-connection line M1SL2 of the source connection line corresponding to the first transistor M1 is connected to the sixth sub-lead L056 of the fifth connection lead L05. Further, an end in the first direction G of the first protruding portion of the sixth sub-lead L056 of the fifth connection lead L05 is aligned with an end in the first direction G of the second sub-connection line M1SL2 of the source connection line corresponding to the first transistor M1. An end in a direction opposite to the first direction G of the first protruding portion of the sixth sub-lead L056 of the fifth connection lead L05 is connected to the fifth sub-lead L055 of the fifth connection lead L05. The arrangement of the first protruding portion of the sixth sub-lead L056 of the fifth connection lead L05 helps to make the second sub-connection line M1SL2 of the source connection line corresponding to the first transistor M1 and the sixth sub-lead L056 of the fifth connection lead L05 forming an integral structure.

In an embodiment of the present disclosure, referring to FIG. 13, the sixth sub-lead L056 of the fifth connection lead L05 and the second sub-connection line M2SL2 of the source connection line corresponding to the second transistor M2 both extend along the first direction G. At least a local position of the sixth sub-lead L056 of the fifth connection lead L05 may also extend along the second direction H to form a second protruding portion. The second protruding portion of the sixth sub-lead L056 of the fifth connection lead L05 extends along the second direction H to connect with the second sub-connection line M2SL2 of the source connection line corresponding to the second transistor M2. Thus, a side in a direction opposite to the second direction H of the second sub-connection line M2SL2 of the source connection line corresponding to the second transistor M2 is connected to the sixth sub-lead L056 of the fifth connection lead L05. Further, an end in the first direction G of the second protruding portion of the sixth sub-lead L056 of the fifth connection lead L05 is aligned with an end in the first direction G of the second sub-connection line M2SL2 of the source connection line corresponding to the second transistor M2. An end in a direction opposite to the first direction G of the second protruding portion of the sixth sub-lead L056 of the fifth connection lead L05 is connected to the fifth sub-lead L055 of the fifth connection lead L05. The arrangement of the second protruding portion of the sixth sub-lead L056 of the fifth connection lead L05 helps to make the second sub-connection line M2SL2 of the source connection line corresponding to the second transistor M2 and the sixth sub-lead L056 of the fifth connection lead L05 forming an integral structure.

Optionally, the width of the sixth sub-lead L056 of the fifth connection lead L05 is greater than the width of the source connection line corresponding to each transistor.

Optionally, referring to FIG. 13, the axis in the first direction G of the sixth sub-lead L056 of the fifth connection lead L05 coincides with the axis in the first direction G of the second sub-connection line M8SL2 of the source connection line corresponding to the eighth transistor M8/the second sub-connection lines M14SL2 of the source connection line corresponding to the fourteenth transistor M14.

Optionally, the axes in the first direction G of the drain connection line M9DL corresponding to the ninth transistor M9, the drain connection line M10DL corresponding to the tenth transistor M10, the drain connection line M7DL corresponding to the seventh transistor M7, and the drain connection line M8DL corresponding to the eighth transistor M8 coincide.

Optionally, the axes along the first direction G of the drain connection line M11DL corresponding to the eleventh transistor M11, the drain connection line M12DL corresponding to the twelfth transistor M12, the drain connection line M13DL corresponding to the thirteenth transistor M13, and the drain connection line M14DL corresponding to the fourteenth transistor M14 coincide.

Optionally, the axes along the first direction G of the second sub-connection line M9SL2 of the source connection line corresponding to the ninth transistor M9/the second sub-connection line M11SL2 of the source connection line corresponding to the eleventh transistor M11, the second sub-connection line M10SL2 of the source connection line corresponding to the tenth transistor M10/the second sub-connection line M12SL2 of the source connection line corresponding to the twelfth transistor M12, the second sub-connection line M7SL2 of the source connection line corresponding to the seventh transistor M7/the second sub-connection line M13SL2 of the source connection line corresponding to the thirteenth transistor M13, the second sub-connection line M8SL2 of the source connection line corresponding to the eighth transistor M8/the second sub-connection line M14SL2 of the source connection line corresponding to the fourteenth transistor M14, the sixth connection lead L06, and the sixth sub-lead L056 of the fifth connection lead L05 coincide.

Optionally, the axes along the first direction G of the first sub-connection line M9SL1 of the source connection line corresponding to the ninth transistor M9, the first sub-connection line M10SL1 of the source connection line corresponding to the tenth transistor M10, the first sub-connection line M7SL1 of the source connection line corresponding to the seventh transistor M7, and the first sub-connection line M8SL1 of the source connection line corresponding to the eighth transistor M8 are coincident.

Optionally, the axes along the first direction G of the first sub-connection line M1SL1 of the source connection line corresponding to the eleventh transistor M11, the first sub-connection line M12SL1 of the source connection line corresponding to the twelfth transistor M12, the first sub-connection line M13SL1 of the source connection line corresponding to the thirteenth transistor M13, and the first sub-connection line M14SL1 of the source connection line corresponding to the fourteenth transistor M14 coincide with each other.

Referring to FIG. 17, the second metal wiring layer 362 may include a first control lead 421, a second control lead 422, a first output lead 431 and a second output lead 432, and further include part of the connection lead. The connection lead located at the second metal wiring layer 362 may include the seventh to fifteenth connection leads L07 to L15.

Figure 18:
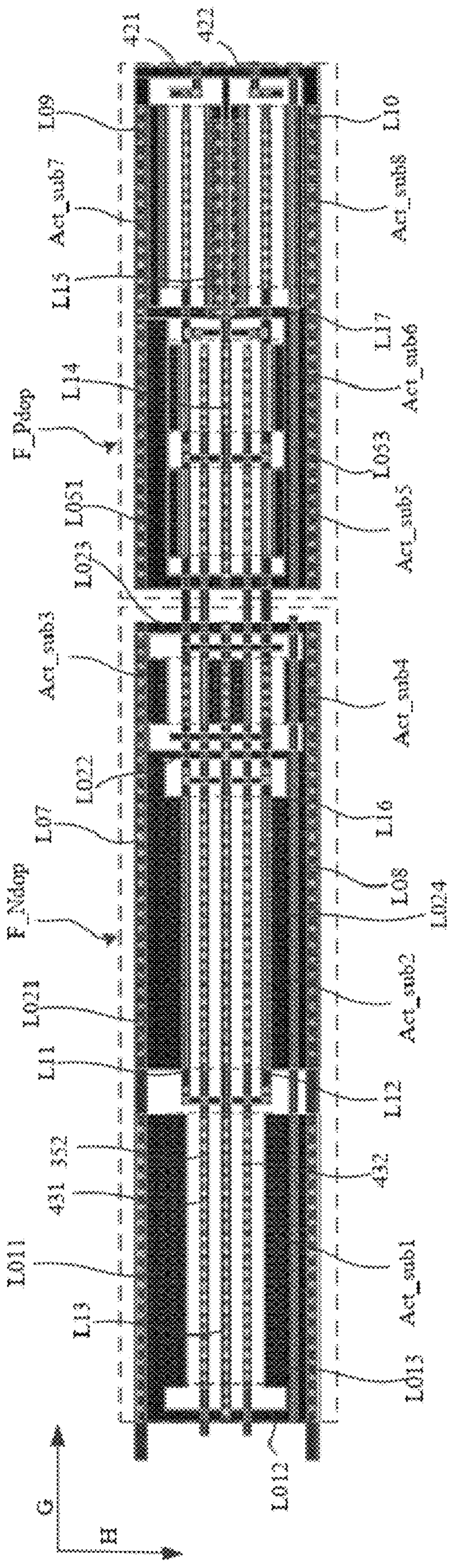
FIG. 18 is a schematic structural diagram of a first metal wiring layer, a second conductive pillar, and a second metal wiring layer in a line drive signal enhancement area according to an embodiment of the present disclosure.

The seventh connection lead L07 extends along the first direction G, and overlaps with the first sub-lead L011 of the first connection lead L01 and the first sub-lead L021 of the second connection lead L02. Referring to FIGS. 13, 17 and 18, the extension lines of the seventh connection lead L07, the first sub-lead L011 of the first connection lead L01 and the first sub-lead L021 of the second connection lead L02 are substantially coincident. In this way, the seventh connection lead L07 may be electrically connected to the first sub-lead L011 of the first connection lead L01 through a plurality of second conductive pillars 352 arranged along the first direction G. The seventh connection lead L07 may be electrically connected to the first sub-lead L021 of the second connection lead L02 through a plurality of second conductive pillars 352 arranged along the first direction G. Further, each of the second conductive pillars 352 connected to the seventh connection lead L07 is linearly arranged along the first direction G. It can be understood that, in the gap between the first sub-lead L011 of the first connection lead L01 and the first sub-lead L021 of the second connection lead L02, the second conductive pillar 352 may not be provided.

Optionally, along the first direction G, an end in the first direction G of the seventh connection lead L07 does not exceed an end in the first direction G of the first sub-lead L021 of the second connection lead L02. Along a direction opposite to the first direction G, an end in the direction opposite to the first direction G of the seventh connection lead L07 exceeds an end in a direction opposite to the first direction G of the first sub-lead L011 of the first connection lead L01.

The eighth connection lead L08 extends along the first direction G, and overlaps with the third sub-lead L013 of the first connection lead L01 and the fourth sub-lead L024 of the second connection lead L02. The extension lines of the eighth connection lead L08, the third sub-lead L013 of the first connection lead L01, and the fourth sub-lead L024 of the second connection lead L02 are substantially coincident. In this way, the eighth connection lead L08 may be electrically connected to the third sub-lead L013 of the first connection lead L01 through a plurality of second conductive pillars 352 arranged along the first direction G. The eighth connection lead L08 may be electrically connected to the fourth sub-lead L024 of the second connection lead L02 through a plurality of second conductive pillars 352 arranged along the first direction G. Further, each of the second conductive pillars 352 connected to the seventh connection lead L07 is linearly arranged along the first direction G. It can be understood that, in the gap between the third sub-lead L013 of the first connection lead L01 and the fourth sub-lead L024 of the second connection lead L02, the second conductive pillar 352 may not be provided.

Optionally, along the first direction G, an end in the first direction G of the eighth connection lead L08 does not exceed an end in the first direction G of the fourth sub-lead L024 of the second connection lead L02. Along a direction opposite to the first direction G, an end in a direction opposite to the first direction G of the eighth connection lead L08 is beyond an end in a direction opposite to the first direction G of the third sub-lead L013 of the first connection lead L01.

In one embodiment of the present disclosure, the seventh connection lead L07 and the eighth connection lead L08 may be loaded with the second power supply voltage V2, and then the first connection lead L01 and the second connection lead L02 may be loaded with the second power supply voltage V2.

Referring to FIGS. 13, 15 and 17, the ninth connection lead L09 extends along the first direction G and overlaps with the first sub-lead L051 of the fifth connection lead L05. The extension lines of the ninth connection lead L09 and the first sub-lead L051 of the fifth connection lead L05 are substantially coincident. In this way, the ninth connection lead L09 may be electrically connected to the first sub-lead L051 of the fifth connection lead L05 through a plurality of second conductive pillars 352 arranged along the first direction G.

Optionally, along the first direction G, an end in the first direction G of the ninth connection lead L09 does not exceed an end in the first direction G of the first sub-lead L051 of the fifth connection lead L05. In a direction opposite to the first direction G, an end in the direction opposite to the first direction G of the ninth connection lead L09 is beyond an end in a direction opposite to the first direction G of the first sub-lead L051 of the fifth connection lead L05. Further, an end in a direction opposite to the first direction G of the ninth connection lead L09 is aligned with an end in a direction opposite to the first direction G of the first sub-lead L051 of the fifth connection lead L05. Along the first direction G, an end in the first direction G of the ninth connection lead L09 is aligned with an end in the first direction G of the drain connection line M1DL corresponding to the first transistor M1.

Referring to FIGS. 13, 15 and 17, the tenth connection lead L10 extends along the first direction G and overlaps with the third sub-lead L053 of the fifth connection lead L05. The extension lines of the tenth connection lead L10 and the third sub-lead L053 of the fifth connection lead L05 are substantially coincident. In this way, the tenth connection lead L10 may be electrically connected to the third sub-lead L053 of the fifth connection lead L05 through a plurality of second conductive pillars 352 arranged along the first direction G.

Optionally, along the first direction G, an end in the first direction G of the tenth connection lead L10 does not exceed an end in the first direction G of the third sub-lead L053 of the fifth connection lead L05. Along a direction opposite to the first direction G, an end in a direction opposite to the first direction G of the tenth connection lead L10 exceeds an end in a direction opposite to the first direction G of the third sub-lead L053 of the fifth connection lead L05. Further, an end in a direction opposite to the first direction G of the tenth connection lead L10 is aligned with an end in a direction opposite to the first direction G of the third sub-lead L053 of the fifth connection lead L05. Along the first direction G, an end in the first direction G of the tenth connection lead L10 is aligned with an end in the first direction G of the drain connection line M2DL corresponding to the second transistor M2.

In an embodiment of the present disclosure, the ninth connection lead L09 and the tenth connection lead L10 may be loaded with the first power supply voltage V1, and then the fifth connection lead L05 may be loaded with the first power supply voltage V1.

Optionally, referring to FIG. 17, the seventh connection lead L07 and the ninth connection lead L09 are located on the same straight line, and the ninth connection lead L09 is located at a side in the first direction G of the seventh connection lead L07. The eighth connection lead L08 and the tenth connection lead L10 are located on the same straight line, and the tenth connection lead L10 is located at a side in the first direction G of the eighth connection lead L08.

Optionally, referring to FIG. 17, the seventh connection lead L07, the eighth connection lead L08, the ninth connection lead L09 and the tenth connection lead L10 have the same width (i.e., the dimension in the second direction H), which is larger than the width of the source connection line corresponding to each transistor. In this way, the impedance of the seventh connection lead L07, the eighth connection lead L08, the ninth connection lead L09 and the tenth connection lead L10 can be reduced, and the driving capability of the line drive signal enhancement circuit can be improved.

In some embodiments, referring to FIGS. 13, 15 and 17, the eleventh connection lead L11 extends along the first direction G, and overlaps with the transfer line of the gate connection line M9GL corresponding to the ninth transistor M9, the transfer line of the gate connection line M10GL corresponding to the tenth transistor M10, the transfer line of the gate connection line M7GL corresponding to the seventh transistor M7, the drain connection line M5DL corresponding to the fifth transistor M5/the drain connection line M6DL corresponding to the sixth transistor M6, and the drain connection line M1DL corresponding to the first transistor M1, and is further connected thereto through the second conductive pillar 352. Optionally, the eleventh connection lead L11 may also be provided with a transfer line extending toward the second direction H. The transfer line of the eleventh connection lead L11 overlaps with the gate connection line M8GL corresponding to the eighth transistor M8, and is connected thereto through the second conductive pillar 352.

Optionally, along the first direction G, an end in the first direction G of the drain connection line M1DL corresponding to the first transistor M1 is located at a side in the first direction G of the eleventh connection lead L11. An end in a direction opposite to the first direction G of the eleventh connection lead L11 is aligned with an end in a direction opposite to the first direction G of the gate connection line M9GL corresponding to the ninth transistor M9.

Optionally, the width of the eleventh connection lead L11 is the same as the width of the source connection line corresponding to each transistor.

In some embodiments, referring to FIG. 13, FIG. 15 and FIG. 17, the twelfth connection lead L12 is linearly arranged along the first direction G, and overlaps with the transfer line of the gate connection line M11GL corresponding to the eleventh transistor M11, the transfer line of the gate connection line M12GL corresponding to the twelfth transistor M12, the transfer line of the gate connection line M13GL corresponding to the thirteenth transistor M13, the drain connection line M3DL corresponding to the third transistor M3/the drain connection line M4DL corresponding to the fourth transistor M4, and the drain connection line M2DL corresponding to the second transistor M2, and is further connected thereto through the second conductive pillar 352. Optionally, the twelfth connection lead L12 may also be provided with a transfer line extending in a direction opposite to the second direction H. The transfer line of the twelfth connection lead L12 overlaps with the gate connection line M14GL corresponding to the fourteenth transistor M14, and is connected thereto through the second conductive pillar 352.

Optionally, along the first direction G, an end in the first direction G of the drain connection line M2DL corresponding to the second transistor M2 is located at a side in the first direction G of an end in the first direction G of the twelfth connection lead L12. An end in a direction opposite to the first direction G of the twelfth connection lead L12 is aligned with an end in a direction opposite to the first direction G of the gate connection line M11GL corresponding to the eleventh transistor M11.

Optionally, the width of the twelfth connection lead L12 is the same as the width of the source connection line corresponding to each transistor.

In some embodiments, referring to FIGS. 13, 15 and 17, the thirteenth connection lead L13 extends along the first direction G, and overlaps sequentially with the second sub-lead L012 of the first connection lead L01, the second sub-connection line M9SL2 of the source connection line of the ninth transistor M9/the second sub-connection line M11SL2 of the source connection line corresponding to the eleventh transistor M11, the second sub-connection line M10SL2 of the source connection line corresponding to the tenth transistor M10/the second sub-connection line M12SL2 of the source connection line corresponding to the twelfth transistor M12, the second sub-lead L022 of the second connection line L02, the third connection line L03, the sixth connection line L06, the fourth connection line L04, and the third sub-lead L023 of the second connection lead L02. Along the first direction G, an end in the first direction of the thirteenth connection lead L13 does not exceed the third sub-lead L023 of the second connection lead L02. An end in a direction opposite to the first direction G of the thirteenth connection lead L13 does not exceed the second sub-lead L012 of the first connection lead L01. Exemplarily, along the first direction G, an end in the first direction G of the thirteenth connection lead L13 is aligned with a side in the first direction G of the third sub-lead L023 of the second connection lead L02. An end in a direction opposite to the first direction G of the thirteenth connection lead L13 is aligned with a side in a direction opposite to the first direction G of the second sub-lead L012 of the first connection lead L01.

Optionally, referring to FIG. 13, FIG. 15 and FIG. 17, the thirteenth connection lead L13 is respectively electrically connected to the second sub-connection line M9SL2 of the source connection line corresponding to the ninth transistor M9/the second sub-connection line M11SL2 of the source connection line corresponding to the eleventh transistor M11, the second sub-connection line M10SL2 of the source connection line corresponding to the tenth transistor M10/the second sub-connection line M12SL2 of the source connection line corresponding to the twelfth transistor M12, and the sixth connection lead L06. In this way, the thirteenth connection lead L13 can load the second power supply voltage V2 on the first connection lead L01 to the second sub-connection line M10SL2 of the source connection line corresponding to the tenth transistor M10/the second sub-connection line M12SL2 of the source connection line corresponding to the twelfth transistor M12, and the sixth connection lead L06. Further, the thirteenth connection lead L13 is electrically connected to the second sub-connection line M9SL2 of the source connection line corresponding to the ninth transistor M9/the second sub-connection line M11SL2 of the source connection line corresponding to the eleventh transistor M1*l* through a plurality of second conductive pillars 352 arranged in sequence in the first direction G. The thirteenth connection lead L13 is electrically connected to the second sub-connection line M10SL2 of the source connection line corresponding to the tenth transistor M10/the second sub-connection line M12SL2 of the source connection line corresponding to the twelfth transistor M12 through a plurality of second conductive pillars 352 arranged in sequence along the first direction G. The thirteenth connection lead L13 and the sixth connection lead L06 are electrically connected through a plurality of second conductive pillars 352 arranged in sequence along the first direction G. Further, the thirteenth connection lead L13 and the second sub-lead L012 of the first connection lead L01 are electrically connected through a second conductive pillar 352. The thirteenth connection lead L13 and the second sub-lead L022 of the second connection lead L02 are electrically connected through a second conductive pillar 352. The thirteenth connection lead L13 and the third sub-lead L023 of the second connection lead L02 are electrically connected through a second conductive pillar 352.

In an embodiment of the present disclosure, referring to FIG. 13, FIG. 15 and FIG. 17, the gate connection line M9GL corresponding to the ninth transistor M9 and the gate connection line M11GL corresponding to the eleventh transistor M11 are respectively located at both sides of the thirteenth connection lead L13, and do not overlap with the thirteenth connection lead L13. The gate connection line M10GL corresponding to the tenth transistor M10 and the gate connection line M12GL corresponding to the twelfth transistor M12 are respectively located at both sides of the thirteenth connection lead L13, and do not overlap with the thirteenth connection lead L13.

Optionally, the width of the thirteenth connection lead L13 is the same as the width of the source connection line corresponding to each transistor.

In some embodiments, referring to FIG. 13, FIG. 15 and FIG. 17, the fourteenth connection lead L14 and the fifteenth connection lead L15 are connected to each other, and both extend along the first direction G. The fifteenth connection lead L15 is located at a side in the first direction G of the fourteenth connection lead L14. The axes along the first direction G of the fourteenth connection lead L14 and the fifteenth connection lead L15 coincide.

The fourteenth connection lead L14 is sequentially overlapping with the second sub-lead L052 of the fifth connection lead L05, the second sub-connection line M7SL2 of the source connection line corresponding to the seventh transistor M7/the second sub-connection line M13SL2 of the source connection line corresponding to the thirteenth transistor M13, the second sub-connection line M8SL2 of the source connection line corresponding to the eighth transistor M8/the second sub-connection line M14SL2 of the source connection line corresponding to the fourteenth transistor M14 and electrically connected thereto. Referring to FIG. 15, the fourteenth connection lead L14 and the second sub-connection line M7SL2 of the source connection line corresponding to the seventh transistor M7/the second sub-connection line M13SL2 of the source connection line corresponding to the thirteenth transistor M13 are electrically connected through a plurality of second conductive pillars 352 arranged in sequence along the first direction G. The fourteenth connection lead L14 and the second sub-connection line M8SL2 of the source connection line corresponding to the eighth transistor M8/the second sub-connection lines M14SL2 of the source connection line corresponding to the fourteenth transistor M14 are electrically connected through a plurality of second conductive pillars 352 arranged in sequence along the first direction G. The fourteenth connection lead L14 and the second sub-lead L052 of the fifth connection lead L05 may be electrically connected through a second conductive pillar 352 or directly connected without the second conductive pillar 352. Of course, the second conductive pillar 352 for connecting the second sub-lead L052 of the fifth connection lead L05 directly to the fourteenth connection lead L14 may also be located at the connection part between the fourteenth connection lead L14 and the second sub-connection line M7SL2 of the source connection line corresponding to the seventh transistor M7/the second sub-connection line M13SL2 of the source connection line corresponding to the thirteenth transistor M13.

Optionally, the width of the fourteenth connection lead L14 is the same as the width of the source connection line corresponding to each transistor.

The fifteenth connection lead L15 overlaps with the sixth sub-lead L056 of the fifth connection lead L05, and is electrically connected thereto through the second conductive pillar 352. Exemplarily, the fifteenth connection lead L15 and the sixth sub-lead L056 of the fifth connection lead L05 are electrically connected through a plurality of second conductive pillars 352 arranged along the first direction G. Optionally, the sixth sub-lead L056 of the fifth connection lead L05 has a first protruding portion and a second protruding portion, so that the local width of the sixth sub-lead L056 of the fifth connection lead L05 is greater than that of the fourteenth connection lead L14. At this time, the width of the fifteenth connection lead L15 may be the same as the maximum width of the sixth sub-lead L056 of the fifth connection lead L05. The fifteenth connection lead L15 and the sixth sub-lead L056 of the fifth connection lead L05 are electrically connected through two rows of second conductive pillars 352. Each row of second conductive pillars 352 includes a plurality of second conductive pillars 352 arranged along the first direction G. Furthermore, among the two rows of second conductive pillars 352, one row of second conductive pillars 352 overlaps with the first protruding portion of the fifteenth connection lead L15, and the other row of second conductive pillars 352 overlaps with the second protruding portion of the fifteenth connection lead L15.

Optionally, an end in a direction opposite to the first direction G of the fifteenth connection lead L15 overlaps with the fifth sub-lead L055 of the fifth connection lead L05, and is electrically connected to the fifth sub-lead L055 of the fifth connection lead L05 through the second conductive post 352.

Optionally, an end in the first direction G of the second sub-connection line M1SL2 of the source connection line corresponding to the first transistor M1 is located at a side in the first direction G of the end in the first direction G of the fifteenth connection lead L15. Further, an end in the first direction G of the fifteenth connection lead L15 is aligned with an end in the first direction G of the eleventh connection lead L11 and the twelfth connection lead L12.

Referring to FIGS. 13, 15 and 17, the first output lead 431 extends along the first direction G, and is electrically connected to the drain connection line M9DL corresponding to the ninth transistor M9, the drain connection line M10DL corresponding to the tenth transistor M10, the drain connection line M7DL corresponding to the seventh transistor M7 and the drain connection line M8DL corresponding to the eighth transistor M8 through the second conductive pillar 352. In an embodiment of the present disclosure, the drain connection line M9DL corresponding to the ninth transistor M9, the drain connection line M10DL corresponding to the tenth transistor M10, the drain connection line M7DL corresponding to the seventh transistor M7, and the drain connection line M8DL corresponding to the eighth transistor M8 extend linearly along the first direction G, and are located on the same straight line. The extension direction of the first output lead 431 coincides with the extension directions of the drain connection line M9DL corresponding to the ninth transistor M9, the drain connection line M10DL corresponding to the tenth transistor M10, the drain connection line M7DL corresponding to the seventh transistor M7, and the drain connection line M8DL corresponding to the eighth transistor M8, and overlaps with the drain connection line M9DL corresponding to the ninth transistor M9, the drain connection line M10DL corresponding to the tenth transistor M10, the drain connection line M7DL corresponding to the seventh transistor M7, and the drain connection line M8DL corresponding to the eighth transistor M8, and is further connected thereto respectively through a plurality of second conductive pillars 352 arranged along the first direction G. These second conductive pillars 352 may be located on the same line.

Optionally, referring to FIGS. 13, 15 and 17, along a direction opposite to the first direction G, an end in a direction opposite to the first direction G of the first output lead 431 extends beyond the second sub-lead L012 of the first connection lead L01. Thus, the first output lead 431 is used as the second output terminal OUT2 of the line drive signal enhancement circuit 101 to output the first scan signal to the display area D of the display panel.

Optionally, referring to FIG. 13, FIG. 15 and FIG. 17, the second output lead 432 extends along the first direction G, and is electrically connected to the drain connection line M11DL corresponding to the eleventh transistor M11, the drain connection line M12DL corresponding to the twelfth transistor M12, the drain connection line M13DL corresponding to the thirteenth transistor M13, and the drain connection line M14DL corresponding to the fourteenth transistor M14 through the second conductive pillar 352. In an embodiment of the present disclosure, the drain connection line M11DL corresponding to the eleventh transistor M11, the drain connection line M12DL corresponding to the twelfth transistor M12, the drain connection line M13DL corresponding to the thirteenth transistor M13, and the drain connection line M14DL corresponding to the fourteen transistors M14 extend linearly along the first direction G and are located on the same straight line. The extension direction of the second output lead 432 is coincident with the extension directions of the drain connection line M11DL corresponding to the eleventh transistor M11, the drain connection line M12DL corresponding to the twelfth transistor M12, the drain connection line M13DL corresponding to the thirteenth transistor M13, and the drain connection line M14DL corresponding to the fourteenth transistor M14, and is connected thereto respectively through a plurality of second conductive pillars 352 arranged along the first direction. The second conductive pillars 352 may be located on the same straight line.

Optionally, along a direction opposite to the first direction G, an end in a direction opposite to the first direction G of the second output lead 432 extends beyond the second sub-lead L012 of the first connection lead L01. Thus, the second output lead 432 serves as the second output terminal OUT2 of the line drive signal enhancement circuit 101, to output a second scan signal to the display area D of the display panel.

Referring to FIGS. 13, 15 and 17, the first control lead 421 is located at a side in the first direction G of the drain connection line M1DL corresponding to the first transistor M1, and is electrically connected to the gate connection line MIGL corresponding to the first transistor M1 through the second conductive pillar 352. In this way, the first control lead 421 may be used as the first input terminal IN1 of the line drive signal enhancement circuit 101 to input the first initial scan signal to the line drive signal enhancement circuit 101.

Optionally, the first control lead 421 extends along the first direction G, and has an end in the first direction G located at a side in the first direction G of the fourth sub-lead L054 of the fifth connection lead L05, so that the first initial scan signal can be received. An end in a direction opposite to the first direction G of the first control lead 421 is aligned with the gate connection line MIGL corresponding to the first transistor M1. Further, an end in a direction opposite to the first direction G of the first control lead 421 has a connection portion. The connection portion of the first control lead 421 extends along a direction opposite to the second direction H, overlaps with the gate connection line MIGL corresponding to the first transistor M1, and is further connected to the gate connection line MIGL corresponding to the first transistor M1 through the second conductive pillar 352. In this way, the conductive area between the first control lead 421 and the gate connection line MIGL corresponding to the first transistor M1 can be increased, thereby reducing the delay of the line drive signal enhancement circuit 101.

With reference to FIGS. 13, 15 and 17, the second control lead 422 is located at a side in the first direction G of the drain connection line M2DL corresponding to the second transistor M2, and is electrically connected to the gate connection line M2GL corresponding to the second transistor M2 through the second conductive pillar 352. In this way, the second control lead 422 may be used as the second input terminal IN2 of the line drive signal enhancement circuit 101 to input the second initial scan signal to the line drive signal enhancement circuit 101.

Optionally, the second control lead 422 extends along the first direction G, and has an end in the first direction G located at a side in the first direction G of the fourth sub-lead L054 of the fifth connection lead L05, so that the second initial scan signal can be received. An end in a direction opposite to the first direction G of the second control lead 422 is aligned with the gate connection line M2GL corresponding to the second transistor M2. Further, an end in a direction opposite to the first direction G of the second control lead 422 has a connection portion. The connection portion of the second control lead 422 extends along the second direction H, overlaps with the gate connection line M2GL corresponding to the second transistor M2, and is further connected to the gate connection line M2GL corresponding to the second transistor M2 through the second conductive pillar 352. In this way, the conductive area between the second control lead 422 and the gate connection line M2GL corresponding to the second transistor M2 can be increased, thereby reducing the delay of the line drive signal enhancement circuit 101.

It can be understood that, in the line drive signal enhancement area F, other leads or conductive structures may also be provided. These leads or conductive structures may not constitute the line drive signal enhancement circuit 101, but only pass through the line drive signal enhancement area F, adjusts the parasitic capacitance, parasitic resistance, etc. at different positions in the line drive signal enhancement circuit 101. For example, referring to FIGS. 13, 15 and 17, the second metal wiring layer 362 may further have a sixteenth connection lead L16 and a seventeenth connection lead L17. The sixteenth connection lead L16 and the seventeenth connection lead L17 extend along the first direction G and the extension axes of the two are coincident. The sixteenth connection lead L16 penetrates the N-type substrate region F_Ndop along the first direction G, and is located between the eighth connection lead L08 and the twelfth connection lead L12. The seventeenth connection lead L17 penetrates the P-type substrate region F_Pdop along the first direction G, and is located between the tenth connection lead L10 and the twelfth connection lead L12. In the line drive signal enhancement area F, the sixteenth connection lead L16 and the seventeenth connection lead L17 are not electrically connected with any of the second conductive pillar 352 and the third conductive pillar 353. Thus, the sixteenth connection lead L16 and the seventeenth connection lead L17 are located in the line drive signal enhancement area F, but do not constitute a part of the line drive signal enhancement circuit 101.

Referring to FIGS. 17, 19 and 20, the third metal wiring layer 363 may be provided with a first power supply lead 411 and a second power supply lead 412. The first power supply lead 411 overlaps with the ninth connection lead L09 and the tenth connection lead L10, and is electrically connected thereto through the third conductive pillar 353. Further, the first power supply lead 411 overlaps with the fourteenth connection lead L14 and the fifteenth connection lead L15, and is electrically connected thereto through the third conductive pillar 353. In one embodiment of the present disclosure, the first power supply lead 411 covers the third active region Act3 and the fourth active region Act4, so as to shield the seventh transistor M7, the eighth transistor M8, the thirteenth transistor M13, the fourteenth transistor M14, the first transistor M1 and the second transistor M2 from interferences by external signals.

Figure 21:
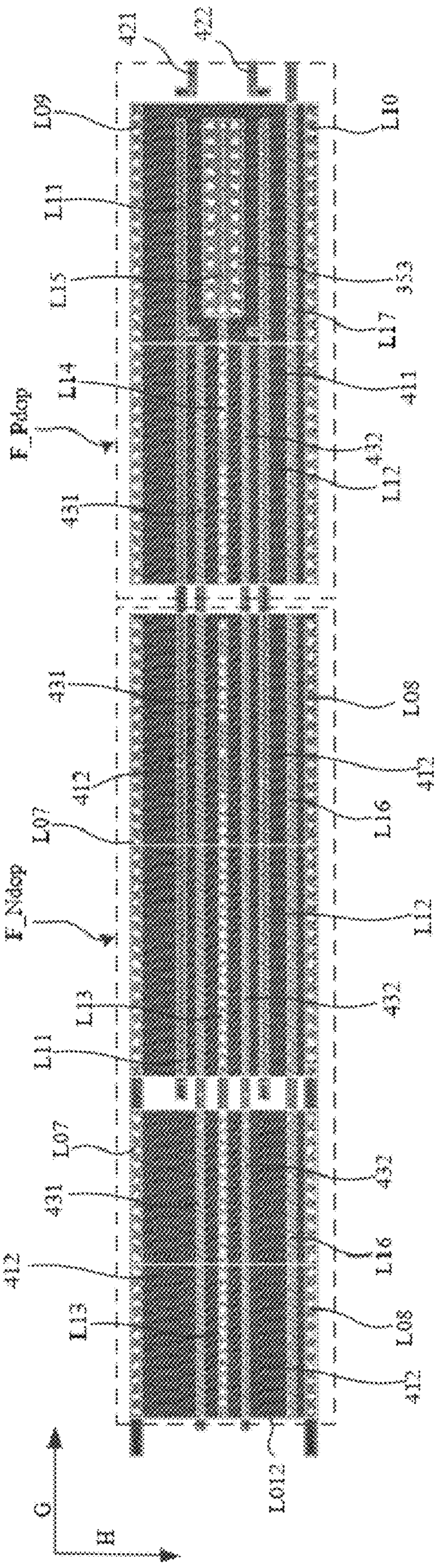
FIG. 21 is a schematic structural diagram of a second metal wiring layer, a third conductive pillar and a third metal wiring layer in a line drive signal enhancement area according to an embodiment of the present disclosure.
Figure 22:
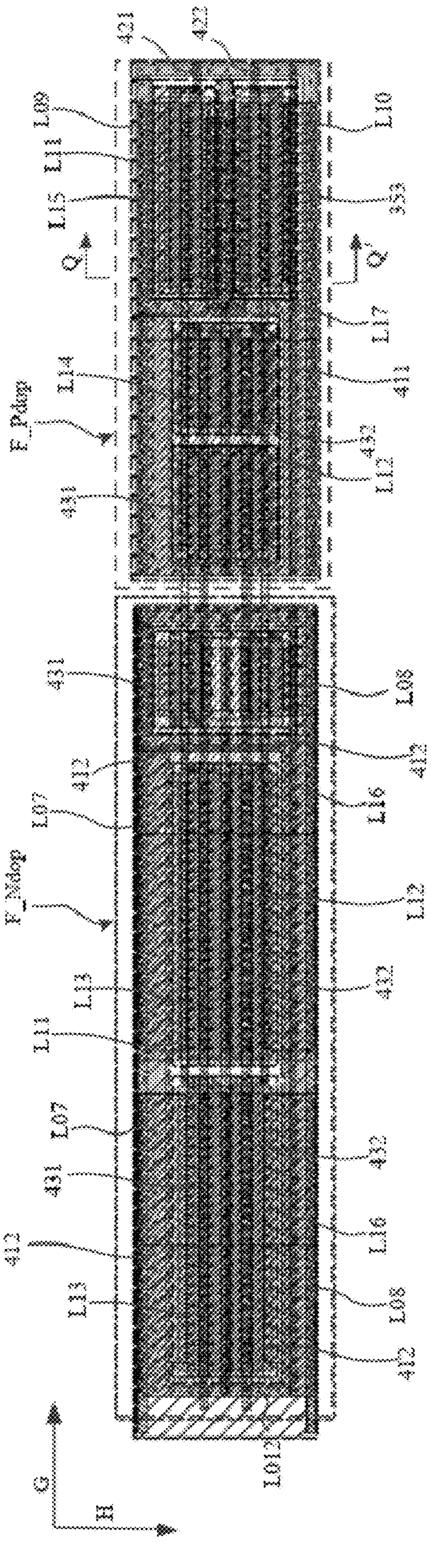
FIG. 22 is a schematic structural diagram of a P-type doped region, an N-type doped region, each active region, a gate layer, a first conductive pillar, a first metal wiring layer, a second conductive pillar, a second metal wiring layer, a third conductive pillar, and a third metal wiring layer in the line drive signal enhancement area according to an embodiment of the present disclosure.

Referring to FIGS. 19, 20 and 21, the first power supply lead 411 has two sides arranged oppositely and extending along the second direction H. The end at an end in the first direction G is aligned with an end in the first direction G of the ninth connection lead L09, and the end at a side in a direction opposite to the first direction G is aligned with an end in a direction opposite to the first direction G of the ninth connection lead L09. In an embodiment of the present disclosure, referring to FIG. 24, the display panel includes a plurality of line signal drive enhancement areas F arranged in sequence along the second direction H. A line signal drive enhancement circuit is arranged in any line signal drive enhancement area F. Each line signal drive enhancement circuit may share the same first power supply lead 411. The first power supply lead 411 extends along the second direction H to cover the third active region Act3 and the fourth active region Act4 of each line signal drive enhancement area, and are electrically connected to the ninth connection lead L09, the tenth connection lead L10, the fourteenth connection lead L14 and the fifteenth connection lead L15 in each line signal drive enhancement area F through the third conductive pillar 353.

Referring to FIGS. 19, 20 and 21, the second power supply lead 412 overlaps with the seventh connection lead L07 and the eighth connection lead L08 and is electrically connected through the third conductive pillar 353. Further, the second power supply lead 412 overlaps with the thirteenth connection lead L13 and is electrically connected thereto through the third conductive pillar 353. In one embodiment of the present disclosure, the second power supply lead 412 covers the first active region Act1 and the second active region Act2, so as to shield the ninth transistor M9, the tenth transistor M10, the eleventh transistor M11, the twelfth transistor M12, the third transistor M3, the fourth transistor M4, the fifth transistor M5, and the sixth transistor M6 from interferences by external signals.

In an embodiment of the present disclosure, referring to FIG. 24, the display panel includes a plurality of line signal drive enhancement areas F arranged in sequence along the second direction H, and a line signal drive enhancement circuit is provided in any line signal drive enhancement area. Each line signal drive enhancement circuit may share the same second power supply lead 412. The second power supply lead 412 extends along the second direction H to cover the first active region Act1 and the second active region of each line signal drive enhancement area Act2, and is electrically connected to the seventh connection lead L07, the eighth connection lead L08, and the fourteenth connection lead L14 in each line signal drive enhancement area through the third conductive pillar 353.

In an embodiment of the present disclosure, the number of the second power supply leads 412 is two, and both of the second power supply leads 412 extend along the second direction H. The second power supply lead 412 at a side in the first direction G covers the second sub-active region Act_sub2 and the second active region Act2, and has an edge at a side in the first direction G located at a side in the first direction G of the third sub-lead L023 of the second connection lead L02, and an edge at a side in a direction opposite to the first direction G of the first sub-lead L021 of the second connection lead L02. The second power supply lead 412 at a side in a direction opposite to the first direction G overlaps with the first sub-active region Act_sub1, and has an edge at a side in the first direction G being aligned with an end in the first direction G of the drain connection line M9DL corresponding to the ninth transistor M9, and an edge at a side in a direction opposite to the first direction G being aligned with an edge in a direction opposite to the first direction G of the second sub-lead L012 of the first connection lead L01. The two second power supply leads 412 both extend along the second direction H to sequentially pass through a plurality of line signal drive enhancement areas F arranged in a straight line along the second direction H.

Optionally, two line signal drive enhancement circuits being adjacent along the second direction H may share part of the metal wiring layer and part of the conductive pillars. Accordingly, two line signal drive enhancement areas being adjacent along the second direction H may share part of an area.

For example, each line signal drive enhancement area F may be sequentially numbered along the second direction H. The third N-type doped sub-region F_Nsub3 in the previous line signal drive enhancement area may be connected with the first N-type doped sub-region F_Nsub1 of the next line signal drive enhancement area to form an integral structure, and both are arranged axially symmetrically. Alternatively, it can be considered that the third N-type doped sub-region F_Nsub3 in the previous line signal drive enhancement area and the first N-type doped sub-region F_Nsub1 of the next line signal drive enhancement area are the same N-type doped sub-region. Accordingly, the seventh N-type doped sub-region F_Nsub7 in the previous line signal drive enhancement area may be connected with the fifth N-type doped sub-region F_Nsub5 of the next line signal drive enhancement area to form an integral structure, and both are arranged axially symmetrically. Alternatively, it can be considered that the seventh N-type doped sub-region F_Nsub7 in the previous line signal drive enhancement area and the fifth N-type doped sub-region F_Nsub5 of the next line signal drive enhancement area are the same N-type doped sub-region. The third P-type doped sub-region F_Psub3 in the previous line signal drive enhancement area may be connected with the first P-type doped sub-region F_Psub1 of the next line signal drive enhancement area to form an integral structure, and both are arranged axially symmetrically. Alternatively, it can be considered that the third P-type doped sub-region F_Psub3 in the previous line signal drive enhancement area and the first P-type doped sub-region F_Psub1 of the next line signal drive enhancement area are the same P-type doped sub-region. The seventh P-type doped sub-region F_Psub7 in the previous line signal drive enhancement area may be connected with the fifth P-type doped sub-region F_Psub5 of the next line signal drive enhancement area to form an integral structure, and both are arranged axially symmetrically. Alternatively, it can be considered that the seventh P-type doped sub-region F_Psub7 in the previous line signal drive enhancement area and the fifth P-type doped sub-region F_Psub5 of the next line signal drive enhancement area are the same P-type doped sub-region.

For another example, each line signal drive enhancement circuit may be sequentially numbered along the second direction H. The third sub-lead L013 of the first connection lead L01 of the previous line signal drive enhancement circuit may be connected with the first sub-lead L011 of the first connection lead L01 of the next line signal drive enhancement circuit to form an integral structure, and both are arranged axially symmetrically. Alternatively, it can be considered that the third sub-lead L013 of the first connection lead L01 of the previous line signal drive enhancement circuit and the first sub-lead L011 of the first connection lead L01 of the next line signal drive enhancement circuit are the same sub-lead.

The fourth sub-lead L024 of the second connection lead L02 of the previous line signal drive enhancement circuit may be connected with the first sub-lead L021 of the second connection lead L02 of the next line signal drive enhancement circuit to form an integral structure, and both are arranged axially symmetrically. Alternatively, it can be considered that the fourth sub-lead L024 of the second connection lead L02 of the previous line signal drive enhancement circuit and the first sub-lead L021 of the second connection lead L02 of the next line signal drive enhancement circuit are the same sub-lead.

The third sub-lead L053 of the fifth connection lead L05 of the previous line signal drive enhancement circuit may be connected with the first sub-lead L051 of the fifth connection lead L05 of the next line signal drive enhancement circuit to form an integral structure, and both are arranged axially symmetrically. Alternatively, it can be considered that the third sub-lead L053 of the fifth connection lead L05 of the previous line signal drive enhancement circuit and the first sub-lead L051 of the fifth connection lead L05 of the next line signal drive enhancement circuit are the same sub-lead.

The eighth connection lead L08 of the previous line signal drive enhancement circuit may be connected with the seventh connection lead L07 of the next line signal drive enhancement circuit to form an integral structure, and both are arranged axially symmetrically. Alternatively, it can be considered that the eighth connection lead L08 of the previous line signal drive enhancement circuit and the seventh connection lead L07 of the next line signal drive enhancement circuit.

The tenth connection lead L10 of the previous line signal drive enhancement circuit may be connected with the ninth connection lead L09 of the next line signal drive enhancement circuit to form an integral structure, and both are arranged axially symmetrically. Alternatively, it may be considered that the connection lead L10 of the previous line signal drive enhancement circuit is the same lead as the ninth connection lead L09 of the next line signal drive enhancement circuit.

In an embodiment of the present disclosure, referring to FIG. 4, the display panel is further provided with a pixel driving circuit 104 in the display area D. The pixel driving circuit 104 includes a data writing unit 250, a storage capacitor Cst and a driving transistor M03. The data writing unit has a first control electrode and a second control electrode. The first control electrode of the data writing unit is connected to the first output lead 431. The second control electrode of the data writing unit is connected to the second output lead 432. The input terminal of the data writing unit is connected to the data line of the display panel. The output terminal of the data writing unit is connected to the third node C. The first electrode plate of the storage capacitor Cst is connected to the third node C, and the second electrode plate of the storage capacitor Cst is loaded with the first driving voltage. The control terminal of the driving transistor M03 is connected to the third node C. The output terminal of the driving transistor M03 is connected to the light-emitting element (such as OLED, liquid crystal pixel unit, LED, etc.) of the display panel. The input terminal of the driving transistor M03 can be loaded with the second driving voltage.

In this way, the line drive signal enhancement circuit 101 can output the scan signal to control the turn-on or turn-off of the data writing unit. When the data writing unit is turned on, the data voltage Vdata loaded on the input terminal of the data writing unit can be loaded to the third node C.

Optionally, the data writing unit may include a first switch transistor M01 and a second switch transistor M02. One of the first switch transistor M01 and the second switch transistor M02 is a P-type transistor, and the other of the first switch transistor M01 and the second switch transistor M02 is an N-type transistor. The P-type transistor can be turned on in response to the first power supply voltage V1 loaded on its control terminal. The N-type transistor can be turned on in response to the second power supply voltage V2 applied to its control terminal. In this way, the control terminal of the first switch transistor M01 can be used as the first control electrode of the data writing unit, and the control terminal of the second switch transistor M02 can be used as the second control electrode of the data writing unit. When the scan signal is applied to the first control electrode and the second control electrode of the data writing unit, both the first switch transistor M01 and the second switch transistor M02 can be turned on. When no scan signal is applied to the first control electrode and the second control electrode of the data writing unit, for example, when the base voltages on the first output terminal OUT1 and the second output terminal OUT2 of the line drive signal enhancement circuit 101 are applied to the first control electrode and the second control electrode of the data writing unit, the data writing unit is turned off.

Exemplarily, if the base voltage output by the first output terminal OUT1 of the line drive signal enhancement circuit 101 is the first power supply voltage V1 and the voltage of the scan signal is the second power supply voltage V2, the base voltage output by the second output terminal OUT2 of the line drive signal enhancement circuit 101 is the second power supply voltage V2 and the voltage of the scan signal is the first power supply voltage V1. Then, the first switch transistor M01 may be an N-type transistor, and the second switch transistor M02 may be a P-type transistor.

Further, the display area D is provided with a first gate lead and a second gate lead. The first control electrode of the data writing unit is connected to the first gate lead, and the second control electrode of the data writing unit is connected to the second gate lead. The first output lead 431 of the line drive signal enhancement circuit 101 is connected to the first gate lead, and the second output lead 432 of the line drive signal enhancement circuit 101 is connected to the second gate lead.

Further, the first power supply lead 411 is used for loading the first driving voltage. The second power supply lead 412 is used for loading the second driving voltage. That is, the first driving voltage and the first power supply voltage are the same, and the second driving voltage and the second power supply voltage are the same. In this way, according to the line drive signal enhancement circuit 101 provided by an embodiment of the present disclosure, the specification of the power supply voltage serving as a scan signal is consistent with the specification of the power supply voltage of the display area D. This can not only simplify setting of the power supply specification and power supply distribution of the display panel, but also significantly improve the driving capability of the scan signal.

Optionally, referring to FIG. 4, the peripheral area E of the display panel is further provided with a plurality of shift registers 102 and a plurality of inverters 103 arranged in a one-to-one correspondence with each line drive signal enhancement circuit 101. In the line drive signal enhancement circuit 101, the shift register 102 and the inverter 103 corresponding to each other, the output terminal of the shift register 102 is connected to the input terminal of the inverter 103 and the first control lead 421 of the line drive signal enhancement circuit 101, and the output terminal of the inverter 103 is connected to the second control lead 422 of the line drive signal enhancement circuit 101.

In this way, the shift register 102 can output the first initial scan signal, and the first initial scan signal can be loaded into the first control terminal IN1 of the line drive signal enhancement circuit 101. The inverter 103 can generate an inverted second initial scan signal according to the first initial scan signal, and the second initial scan signal can be applied to the second control terminal IN2 of the line drive signal enhancement circuit 101. Therefore, the two control terminals of the line drive signal enhancement circuit 101 are respectively loaded with two different initial scan signals, and output the first scan signal and the second scan signal under the control of the two different initial scan signals, so as to scan the pixel driving circuit. In this way, the line drive signal enhancement circuit 101 can generate two inverted scan signals formed by the first power supply voltage V1 and the second power supply voltage V2 according to the first initial scan signal output by the shift register 102, thereby improving the driving capability of the scan signal.

Other embodiments of the present disclosure will readily occur to those skilled in the art upon consideration of the specification and practice of the contents disclosed herein. The present application is intended to cover any variations, uses, or adaptations of the present disclosure that follow the general principle of the present disclosure and include common knowledge or techniques in the technical field not disclosed by the present disclosure. The specification and examples are to be regarded as exemplary only, with the true scope and spirit of the present disclosure being defined by the appended claims.

The invention claimed is:

1. A line drive signal enhancement circuit, comprising:

a control unit, having a first control terminal and a second control terminal, for inputting a first power supply voltage to one of a first node and a second node, and inputting a second power supply voltage to the other of the first node and the second node, under the control of the first control terminal and the second control terminal;

a first output unit, connected to the first node and a first output terminal, for outputting one of the first power supply voltage and the second power supply voltage to the first output terminal under the control of the first node;

a second output unit, connected to the second node and a second output terminal, for outputting the other of the first power supply voltage and the second power supply voltage to the second output terminal under the control of the second node.

2. The line drive signal enhancement circuit according to claim 1, wherein the control unit comprises:

a first control unit, having the first control terminal and the second control terminal, for outputting the first power supply voltage to the first node or the second node under the control of the first control terminal ad the second control terminal;

a second control unit, connected to the first node and the second node, for outputting the second power supply voltage to the second node in response to the first power supply voltage applied to the first node, and for outputting the second power supply voltage to the first node in response to the first power supply voltage applied to the second node.

3. The line drive signal enhancement circuit according to claim 2, wherein the second control unit has at least four transistors.

4. The line drive signal enhancement circuit according to claim 2, wherein the first control unit comprises:

a first transistor, having a first terminal for loading the first power supply voltage, a second terminal connected to the first node, and a control terminal serving as the first control terminal, wherein the first transistor is used for outputting the first power supply voltage to the first node under the control of the control terminal of the first transistor; and a second transistor, having a first terminal for loading the first power supply voltage, a second terminal connected to the second node, and a control terminal serving as the second control terminal, wherein the second transistor is used for outputting the first power supply voltage to the second node under the control of the control terminal of the second transistor, wherein the first transistor and the second transistor are of the same type;

the second control unit comprises:

a third transistor, having a control terminal connected to the first node, a first terminal for loading the second power supply voltage, and a second terminal connected to the second node, wherein the third transistor is used for outputting the second power supply voltage to the second node under the control of the first power supply voltage loaded to the first node;

a fourth transistor, having a control terminal connected to the first node, a first terminal for loading the second power supply voltage, and a second terminal connected to the second node, wherein the fourth transistor is used for outputting the second power supply voltage to the second node under the control of the first power supply voltage loaded to the first node;

a fifth transistor, having a control terminal connected to the second node, a first terminal for loading the second power supply voltage, and a second terminal connected to the first node, wherein the fifth transistor is used for outputting the second power supply voltage to the first node under the control of the first power supply voltage loaded to the second node; and a sixth transistor, having a control terminal connected to the second node, a first terminal for loading the second power supply voltage, and a second terminal connected to the first node, wherein the sixth transistor is used for outputting the second power supply voltage to the first node under the control of the first power supply voltage loaded to the second node, wherein the third transistor, the fourth transistor, the fifth transistor, and the sixth transistor are of the same type.

5. The line drive signal enhancement circuit according to claim 1, wherein the first output unit comprises:

a seventh transistor, having a control terminal connected to the first node, a first terminal for loading the first power supply voltage, and a second terminal serving as the first output terminal;

an eighth transistor, having a control terminal connected to the first node, a first terminal for loading the first power supply voltage, and a second terminal connected to the first output terminal;

a ninth transistor, having a control terminal connected to the first node, a first terminal for loading the second power supply voltage, and a second terminal connected to the first output terminal; and a tenth transistor, having a control terminal connected to the first node, a first terminal for loading the second power supply voltage, and a second terminal connected to the first output terminal, wherein the second output unit comprises:

an eleventh transistor, having a control terminal connected to the second node, a first terminal for loading the second power supply voltage, and a second terminal serving as the first output terminal;

a twelfth transistor, having a control terminal connected to the second node, a first terminal for loading the second power supply voltage, and a second terminal connected to the second output terminal;

a thirteenth transistor, having a control terminal connected to the second node, a first terminal for loading the first power supply voltage, and a second terminal connected to the second output terminal; and a fourteenth transistor, having a control terminal connected to the second node, a first terminal for loading the first power supply voltage, and a second terminal connected to the second output terminal, wherein each of the seventh transistor, the eighth transistor, the thirteenth transistor, and the fourteenth transistor is turned on in response to one of the first power supply voltage and the second power supply voltage applied to the control terminal thereof, and wherein each of the ninth transistor, the tenth transistor, the eleventh transistor, and the twelfth transistor is turned on in response to the other of the first power supply voltage and the second power supply voltage applied to the control terminal thereof.

6. A shift register unit, comprising a shift register, an inverter and a line drive signal enhancement circuit, wherein the shift register is used for outputting an initial scan signal to an input terminal of the inverter and the first control terminal of the line drive signal enhancement circuit; and an output terminal of the inverter is connected to the second control terminal of the line drive signal enhancement circuit, wherein the line drive signal enhancement circuit comprises:

a control unit, having a first control terminal and a second control terminal, for inputting a first power supply voltage to one of a first node and a second node, and inputting a second power supply voltage to the other of the first node and the second node, under the control of the first control terminal and the second control terminal;

a first output unit, connected to the first node and the first output terminal, for outputting one of the first power supply voltage and the second power supply voltage to the first output terminal under the control of the first node;

a second output unit, connected to the second node and the second output terminal, for outputting the other of the first power supply voltage and the second power supply voltage to the second output terminal under the control of the second node.

7. A display panel, wherein the display panel comprises a driving backplane and a display layer stacked on the driving backplane, wherein the driving backplane comprises a semiconductor substrate, a gate insulation layer, a gate layer, an insulation medium layer, and a metal wiring layer, the display panel comprises a display area and a peripheral area surrounding the display area, and a plurality of line drive signal enhancement areas is arranged in the peripheral area;

in each of the line drive signal enhancement areas, the driving backplane is provided with a line drive signal enhancement circuit comprising a first transistor, a second transistor, a third transistor, a fourth transistor, a fifth transistor, a sixth transistor, a seventh transistor, an eighth transistor, a ninth transistor, a tenth transistor, an eleventh transistor, a twelfth transistor, a thirteenth transistor, and a fourteenth transistor, wherein the first transistor and the second transistor are of the same type, the seventh transistor, the eighth transistor, the thirteenth transistor, and the fourteenth transistor are of the same type, the ninth transistor, the tenth transistor, the eleventh transistor, and the twelfth transistor are of the same type which is different from the type of the seventh transistor, the third transistor, the fourth transistor, the fifth transistor, and the sixth transistor are of the same type, the semiconductor substrate is formed with an active region of each transistor, the active region of each transistor comprises a channel region, and a source and a drain on both sides of the channel region, the gate layer is formed with a gate of each transistor, the gate insulation layer isolates the gate and the channel region of each transistor, and the insulation medium layer covers the gate layer;

in one of the line drive signal enhancement areas, the metal wiring layer is provided with a connection lead, a first power supply lead, a second power supply lead, a first control lead, a second control lead, a first output lead, and a second output lead, wherein the connection lead is electrically connected to the source, the drain and the gate of each transistor through a conductive pillar located in the insulation medium layer, and wherein the connection lead causes the gate of the first transistor to be electrically connected with the first control lead, causes the gate of the second transistor to be electrically connected with the second control lead, causes the source of the first transistor, the source of the second transistor, the source of the seventh transistor, the source of the eighth transistor, the source of the thirteenth transistor, and the source of the fourteenth transistor to be electrically connected with the first power supply lead, causes the sources of the third transistor, the fourth transistor, the fifth transistor and the sixth transistor, and the sources of the ninth transistor, the tenth transistor, the eleventh transistor and the twelfth transistor to be electrically connected with the second power supply lead, causes the drains of the seventh transistor, the eighth transistor, the ninth transistor and the tenth transistor to be electrically connected with the first output lead, causes the drains of the eleventh transistor, the twelfth transistor, the thirteenth transistor and the fourteenth transistor to be electrically connected with the second output lead, causes the drain of the first transistor, the drain of the fifth transistor, the drain of the sixth transistor, the gate of the third transistor, the gate of the fourth transistor, the gates of the seventh transistor, the eighth transistor, the ninth transistor, and the tenth transistor to be electrically connected with each other, and causes the drain of the second transistor, the drain of the third transistor, the drain of the fourth transistor, the gate of the fifth transistor, the gate of the sixth transistor, and the gates of the eleventh transistor, the twelfth transistor, the thirteenth transistor and the fourteenth transistor to electrically connected with each other.

8. The display panel according to claim 7, wherein the first transistor, the second transistor, the seventh transistor, the eighth transistor, the thirteenth transistor, and the fourteenth transistor are all N-type transistors; and the third transistor, the fourth transistor, the fifth transistor, the sixth transistor, the ninth transistor, the tenth transistor, the eleventh transistor, and the twelfth transistor are all P-type transistors.

9. The display panel according to claim 8, wherein each of the line drive signal enhancement areas comprises a P-type substrate region and an N-type substrate region, the P-type substrate region is located at a side in a first direction of the N-type substrate region, the first direction is a direction away from the display area, the N-type transistor is formed in the P-type substrate region, and the P-type transistor is formed in the N-type substrate region.

10. The display panel according to claim 9, wherein the N-type substrate region comprises an N-type auxiliary doped region, and a first active region and a second active region respectively surrounded by the N-type auxiliary doped region, wherein the second active region is located at a side in a first direction of the first active region;

the first active region comprises a first sub-active region and a second sub-active region arranged in sequence along the first direction, wherein the ninth transistor and the eleventh transistor are located in the first sub-active region, and the tenth transistor and the twelfth transistor are located in the second sub-active region;

the second active region comprises a third sub-active region and a fourth sub-active region arranged in sequence along a second direction, wherein the second direction is perpendicular to the first direction and parallel to a plane where the semiconductor substrate is located, the fifth transistor and the sixth transistor are located in the third sub-active region, and the third transistor and the fourth transistor are located in the fourth sub-active region.

11. The display panel according to claim 10, wherein the P-type substrate region comprises a P-type auxiliary doped region, a third active region and a fourth active region, the fourth active region is located at a side in the first direction of the third active region;

the third active region is surrounded by the P-type auxiliary doped region, and comprises a fifth sub-active region and a sixth sub-active region arranged in sequence along the first direction, wherein the seventh transistor and the thirteenth transistor are located in the fifth sub-active region, and the eighth transistor and the fourteenth transistor are located in the sixth sub-active region; and the fourth active region comprises a seventh sub-active region and an eighth sub-active region arranged in sequence along the second direction and respectively surrounded by the P-type auxiliary doped region, wherein the first transistor is located in the seventh sub-active region, and the second transistor is located in the eighth sub-active region.

12. The display panel according to claim 11, wherein the insulation medium layer comprises a first dielectric layer, a second dielectric layer and a third dielectric layer sequentially stacked on the gate layer, wherein the metal wiring layer comprises a first metal wiring layer between the first dielectric layer and the second dielectric layer, a second metal wiring layer between the second dielectric layer and the third dielectric layer, and a third metal wiring layer on a surface of the third dielectric layer away from the semiconductor substrate;

the conductive pillar comprises a first conductive pillar penetrating the first dielectric layer, a second conductive pillar penetrating the second dielectric layer, and a third conductive pillar penetrating the third dielectric layer, wherein the first metal wiring layer is connected with the semiconductor substrate and the gate layer through the first conductive pillar, the second metal wiring layer is connected with the first metal wiring layer through the second conductive pillar, and the third metal wiring layer is connected with the second metal wiring layer through the third conductive pillar;

the first metal wiring layer comprises a part of the connection lead, wherein the connection lead located on the first metal wiring layer comprises a first connection lead, a second connection lead, a third connection lead, a fourth connection lead, a fifth connection lead, and a sixth connection lead, and further a gate connection line, a source connection line and a drain connection line corresponding to each of the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, and the fourteenth transistor, wherein the gate connection line corresponding to each transistor is connected to the gate of the transistor, wherein the source connection line corresponding to each transistor is connected to the source of the transistor, and wherein the drain connection line corresponding to each transistor is connected to the drain of the transistor;

the source connection line corresponding to the ninth transistor and the source connection line corresponding to the eleventh transistor are connected to the first connection lead;

the source connection line corresponding to the tenth transistor comprises a first sub-connection line and a second sub-connection line, wherein the source connection line corresponding to the twelfth transistor comprises a first sub-connection line and a second sub-connection line, wherein the first sub-connection line of the source connection line corresponding to the tenth transistor, the first sub-connection line of the source connection line corresponding to the twelfth transistor, the source connection line corresponding to the fifth transistor, and the source connection line corresponding to the fourth transistor are connected to the second connection lead;

the drain connection line corresponding to the third transistor, the drain connection line corresponding to the fourth transistor, the gate connection line corresponding to the fifth transistor, and the gate connection line corresponding to the sixth transistor are connected to the third connection lead;

the drain connection line corresponding to the fifth transistor, the drain connection line corresponding to the sixth transistor, the gate connection line corresponding to the third transistor, and the gate connection line corresponding to the fourth transistor are connected to the fourth connection lead;

the source connection line corresponding to the eighth transistor comprises a first sub-connection line and a second sub-connection line, and the source connection line corresponding to the fourteenth transistor comprises a first sub-connection line and a second sub-connection line, wherein the first sub-connection line of the source connection line corresponding to the eighth transistor, the first sub-connection line of the source connection line corresponding to the fourteenth transistor, the source connection line corresponding to the seventh transistor, the source connection line corresponding to the thirteenth transistor, the source connection line corresponding to the first transistor, and the source connection line corresponding to the second transistor are connected to the fifth connection lead;

the source connection line corresponding to the third transistor and the source connection line corresponding to the sixth transistor are connected to the sixth connection lead;

the second metal wiring layer comprises a first control lead, a second control lead, a first output lead, a second output lead, and a part of the connection lead, wherein the connection lead located on the second metal wiring layer comprises a seventh connection lead, an eighth connection lead, a ninth connection lead, a tenth connection lead, an eleventh connection lead, a twelfth connection lead, a thirteenth connection lead, a fourteenth connection lead, and a fifteenth connection lead;

the first connection lead and the second connection lead are connected to the seventh connection lead, and the first connection lead and the second connection lead are connected to the eighth connection lead;

the fifth connection lead is connected to the ninth connection lead and the tenth connection lead;

the gate connection line corresponding to the ninth transistor, the gate connection line corresponding to the tenth transistor, the drain connection line corresponding to the fifth transistor, the drain connection line corresponding to the sixth transistor, the gate connection line corresponding to the seventh transistor, the gate connection line corresponding to the eighth transistor, and the drain connection line corresponding to the first transistor are connected to the eleventh connection lead;

the gate connection line corresponding to the eleventh transistor, the gate connection line corresponding to the twelfth transistor, the drain connection line corresponding to the third transistor, the drain connection line corresponding to the fourth transistor, the gate connection line corresponding to the thirteenth transistor, the gate connection line corresponding to the fourteenth transistor, and the drain connection line corresponding to the second transistor are connected to the twelfth connection lead;

the first connection lead, the source connection line corresponding to the ninth transistor, the source connection line corresponding to the eleventh transistor, the second sub-connection line of the source connection line corresponding to the tenth transistor, the second sub-connection line of the source connection line corresponding to the twelfth transistor, and the sixth connection lead are connected to the thirteenth connection lead;

the source connection line corresponding to the seventh transistor, the second sub-connection line of the source connection line corresponding to the eighth transistor, the source connection line corresponding to the thirteenth transistor, the second sub-connection line of the source connection line corresponding to the fourteenth transistor, and the fifth connection lead are connected to the fourteenth connection lead;

the fifth connection lead is connected to the fifteenth connection lead;

the drain connection line corresponding to the seventh transistor, the drain connection line corresponding to the eighth transistor, the drain connection line corresponding to the ninth transistor, and the drain connection line corresponding to the tenth transistor are connected to the first output lead;

the drain connection line corresponding to the eleventh transistor, the drain connection line corresponding to the twelfth transistor, the drain connection line corresponding to the thirteenth transistor, and the drain connection line corresponding to the fourteenth transistor are connected to the second output lead;

the gate connection line corresponding to the first transistor is connected to the first control lead, and the gate connection line corresponding to the second transistor is connected to the second control lead;

the third metal wiring layer comprises a first power supply lead for loading a first power supply voltage, and a second power supply lead for loading a second power supply voltage, wherein the ninth connection lead, the tenth connection lead, the fourteenth connection lead, and the fifteenth connection lead are connected to the first power supply lead, and wherein the seventh connection lead, the eighth connection lead, and the thirteenth connection lead are connected to the second power supply lead.

13. The display panel according to claim 12, wherein in each of the line drive signal enhancement areas, the source connection line and the drain connection line corresponding to each transistor extend along the first direction, and the gate of each transistor extends along the first direction.

14. The display panel according to claim 13, wherein the first connection lead comprises a first sub-lead, a second sub-lead and a third sub-lead connected in sequence, wherein the first sub-lead of the first connection lead and the third sub-lead of the first connection lead extend along the first direction and at least partially overlap with the N-type auxiliary doped region, wherein the second sub-lead of the first connection lead extends along the second direction and at least partially overlaps with the N-type auxiliary doped region, wherein the first sub-lead of the first connection lead, the second sub-lead of the first connection lead and the third sub-lead of the first connection lead are all connected with the N-type auxiliary doped region, and wherein the first sub-active region is located in a space surrounded by the first connection lead;

the source connection line corresponding to the ninth transistor comprises a first sub-connection line and a second sub-connection line respectively located at both sides of the gate corresponding to the ninth transistor and extending along the first direction, and the source connection line corresponding to the eleventh transistor comprises a first sub-connection line and a second sub-connection line respectively located at both sides of the gate corresponding to the eleventh transistor and extending along the first direction, wherein a side in a direction opposite to the second direction of the first sub-connection line of the source connection line corresponding to the ninth transistor is connected to the first sub-lead of the first connection line, wherein a side in the second direction of the first sub-connection line of the source connection line corresponding to the eleventh transistor is connected to the third sub-lead of the first connection line, and wherein the second sub-connection line of the source connection line corresponding to the ninth transistor is the same lead as the second sub-connection lead of the source connection line corresponding to the eleventh transistor, and extends in a direction opposite to the first direction to connect with the second sub-lead of the first connection lead; and the seventh connection lead is connected to the first sub-lead of the first connection lead, the eighth connection lead is connected to the third sub-lead of the first connection lead, and the thirteenth connection lead is connected to the second sub-lead of the first connection lead.

15. The display panel according to claim 14, wherein the second connection lead comprises a first sub-lead, a third sub-lead and a fourth sub-lead connected in sequence, and further a second sub-lead, wherein the first sub-lead of the second connection lead and the fourth sub-lead of the second connection lead extend along the first direction, and at least partially overlap with the N-type auxiliary doped region, wherein the second sub-lead of the second connection lead and the third sub-lead of the second connection lead extend along the second direction, and at least partially overlap with the N-type auxiliary doped region, and wherein the first sub-lead, the second sub-lead, the third sub-lead, and the fourth sub-lead of the second connection lead are all connected to the N-type auxiliary doped region;

the second sub-active region is located in a space surrounded by the first sub-lead of the second connection lead, the second sub-lead of the second connection lead, and the fourth sub-lead of the second connection lead, and the second active region is located in a space surrounded by the first sub-lead of the second connection lead, the second sub-lead of the second connection lead, the third sub-lead of the second connection lead, and the fourth sub-lead of the second connection lead;

the first sub-connection line of the source connection line corresponding to the tenth transistor extends along the first direction, and has a side in a direction opposite to the first direction connected to the first sub-lead of the second connection lead; the first sub-connection line of the source connection line corresponding to the twelfth transistor extends along the first direction, and has a side in the first direction connected to the fourth sub-lead of the second connection line; and the second sub-connection line of the source connection line corresponding to the tenth transistor and the second sub-connection line of the source connection line corresponding to the twelfth transistor are the same lead and extend along the first direction.

16. The display panel according to claim 15, wherein the fifth connection lead comprises a first sub-lead, a second sub-lead, a third sub-lead, and a fourth sub-lead connected in sequence, and further a fifth sub-lead and a sixth sub-lead;

the first sub-lead, the third sub-lead, and the sixth sub-lead of the fifth connection lead all extend along the first direction, and at least partially overlap with the P-type auxiliary doped region, wherein the sixth sub-lead of the fifth connection lead is located between the first sub-lead and the third sub-lead, and has two ends respectively connected to the fifth sub-lead and the fourth sub-lead;

the second sub-lead, the fourth sub-lead, and the fifth sub-lead of the fifth connection lead all extend along the second direction, and at least partially overlap with the P-type auxiliary doped region, wherein the fifth sub-lead of the fifth connection lead is located between the second sub-lead and the fourth sub-lead, and has two ends respectively connected to the first sub-lead and the third sub-lead, and wherein the first sub-lead, the second sub-lead, the third sub-lead, the fourth sub-lead, the fifth sub-lead, and the sixth sub-lead of the fifth connection lead are all connected to the P-type auxiliary doped region;

the third active region is located in a space surrounded by the first sub-lead, the second sub-lead, the third sub-lead, and the fifth sub-lead of the fifth connection lead, wherein the seventh sub-active region is located in a space surrounded by the first sub-lead, the fifth sub-lead, the sixth sub-lead, and the fourth sub-lead of the fifth connection lead, and wherein the eighth sub-active region is located in a space surrounded by the sixth sub-lead, the fifth sub-lead, the third sub-lead, and the fourth sub-lead of the fifth connection lead;

the source connection line corresponding to the seventh transistor comprises a first sub-connection line and a second sub-connection line respectively located on both sides of the gate corresponding to the seventh transistor and extending along the first direction, and wherein the source connection line corresponding to the thirteenth transistor comprises a first sub-connection line and a second sub-connection line respectively located on both sides of the gate corresponding to the thirteenth transistor and extending along the first direction, wherein a side in a direction opposite to the second direction of the first sub-connection line of the source connection line corresponding to the seventh transistor is connected to the first sub-lead of the fifth connection line, wherein a side in the second direction of the first sub-connection line of the source connection line corresponding to the thirteenth transistor is connected to the third sub-lead of the fifth connection lead, wherein the second sub-connection line of the source connection line corresponding to the seventh transistor and the second sub-connection line of the source connection line corresponding to the thirteenth transistor are the same lead, and extend along the first direction to connect with the second sub-lead of the fifth connection lead;

a side in a direction opposite to the second direction of the first sub-connection line of the source connection line corresponding to the eighth transistor is connected to the first sub-lead of the fifth connection lead, and a side in the second direction of the first sub-connection line of the source connection line corresponding to the fourteenth transistor is connected to the third sub-lead of the fifth connection lead, wherein the second sub-connection line of the source connection line corresponding to the eighth transistor and the second sub-connection line of the source connection line corresponding to the fourteenth transistor are the same lead;

the source connection line corresponding to the first transistor comprises a first sub-connection line and a second sub-connection line respectively located at both sides of the gate corresponding to the first transistor and extending along the first direction, wherein a side in a direction opposite to the second direction of the first sub-connection line of the source connection line corresponding to the first transistor is connected to the first sub-lead of the fifth connection lead, and wherein a side in the second direction of the second sub-connection line of the source connection line corresponding to the first transistor is connected to the sixth sub-lead of the fifth connection lead; and the source connection line corresponding to the second transistor comprises a first sub-connection line and a second sub-connection line respectively located at both sides of the gate corresponding to the second transistor and extending along the first direction, wherein a side in the second direction of the first sub-connection line of the source connection line corresponding to the second transistor is connected to the third sub-lead of the fifth connection lead, and wherein a side in a direction opposite to the second direction of the second sub-connection line of the source connection line corresponding to the second transistor is connected to the sixth sub-lead of the fifth connection lead.

17. The display panel according to claim 16, wherein the third connection lead, the fourth connection lead, and the sixth connection lead are located in a space surrounded by the first sub-lead of the second connection lead, the second sub-lead of the second connection lead, the third sub-lead of the second connection lead, and the fourth sub-lead of the second connection lead, wherein the third connection lead and the fourth connection lead extend along the second direction, and the sixth connection lead extends along the first direction;

a side in the second direction of the source connection line corresponding to the sixth transistor is connected to the sixth connection lead, and a side in a direction opposite to the second direction of the source connection line corresponding to the third transistor is connected to the sixth connection lead;

the drain connection line corresponding to the fifth transistor and the drain connection line corresponding to the sixth transistor are the same lead, and have an end connected to an end of the fourth connection lead, and the gate connection line corresponding to the third transistor and the gate connection line corresponding to the fourth transistor are the same lead, and have an end connected to the other end of the fourth connection lead; and the drain connection line corresponding to the third transistor and the drain connection line corresponding to the fourth transistor are the same lead, and have an end connected to an end of the third connection lead, and the gate connection line corresponding to the fifth transistor and the gate connection line corresponding to the sixth transistor are the same lead, and have an end connected to the other end of the third connection lead.

18. The display panel according to claim 17, wherein the seventh connection lead extends along the first direction, and is connected to the first sub-lead of the first connection lead and the first sub-lead of the second connection lead;

the eighth connection lead extends along the first direction and is connected to the third sub-lead of the first connection lead and the fourth sub-lead of the second connection lead;

the ninth connection lead extends along the first direction and is electrically connected with the first sub-lead of the fifth connection lead;

the tenth connection lead extends along the first direction and is connected with the third sub-lead of the fifth connection lead;

the drain connection line corresponding to the fifth transistor and the drain connection line corresponding to the first transistor are located on the same straight line, and have an extension axis, an orthographic projection on the semiconductor substrate of which coincides with an orthographic projection on the semiconductor substrate of an extension axis of the eleventh connection lead;

the drain connection line corresponding to the third transistor and the drain connection line corresponding to the second transistor are located on the same straight line, and have an extension axis, an orthographic projection on the semiconductor substrate of which coincides with an orthographic projection on the semiconductor substrate of an extension axis of the twelfth connection lead;

an orthographic projection on the semiconductor substrate of an extension axis of the thirteenth connection lead, an orthographic projection on the semiconductor substrate of an extension axis of the second sub-connection line of the source connection line corresponding to the ninth transistor, an orthographic projection on the semiconductor substrate of an extension axis of the second sub-connection line of the source connection line corresponding to the tenth transistor, and an orthographic projection on the semiconductor substrate of an extension axis of the sixth connection lead coincidence with each other; and an orthographic projection on the semiconductor substrate of an extension axis of the second sub-connection line of the source connection line corresponding to the seventh transistor, an orthographic projection on the semiconductor substrate of an extension axis of the second sub-connection line of the source connection line corresponding to the eighth transistor, an orthographic projection on the semiconductor substrate of an extension axis of the sixth sub-lead of the fifth connection lead, an orthographic projection on the semiconductor substrate of an extension axis of the fourteenth connection lead, and an orthographic projection on the semiconductor substrate of an extension axis of the fifteenth connection lead coincide with each other.

19. The display panel according to claim 12, wherein the first power supply lead covers the third active region and the fourth active region, and the second power supply lead covers the first active region and the second active region.

20. The display panel according to claim 7, wherein the display panel is further provided with a pixel driving circuit in the display area, wherein the pixel driving circuit comprises a data writing unit, a storage capacitor, and a driving transistor;

the data writing unit has a first control electrode and a second control electrode, wherein the first control electrode of the data writing unit is connected to the first output lead, the second control electrode of the data writing unit is connected to the second output lead, an input terminal of the data writing unit is connected with a data line of the display panel, and an output terminal of the data writing unit is connected with the third node;

a first electrode plate of the storage capacitor is connected to the third node, and a second electrode plate of the storage capacitor is used for loading a first driving voltage; and a control terminal of the driving transistor is connected to the third node, an output terminal of the driving transistor is connected to a light-emitting element of the display panel, and an input terminal of the driving transistor is capable of loading a second driving voltage.

* * * * *